United States Patent
Suez et al.

(10) Patent No.: US 12,466,796 B2
(45) Date of Patent: Nov. 11, 2025

(54) PROCESS FOR PREPARING 5-(FLUORO-4-IMINO-3-METHYL)-1-TOSYL-3,4 DIHYDROPYRIMIDINE-(1H)-ONE AND DERIVATIVES OF THE COMPOUND

(71) Applicant: Adama Makhteshim Ltd., Beer Sheva (IL)

(72) Inventors: Gal Suez, Beer Sheva (IL); Samaa Alasibi, Hura (IL); Yaakov Mines, Beer Sheva (IL)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 820 days.

(21) Appl. No.: 17/762,557

(22) PCT Filed: Sep. 23, 2020

(86) PCT No.: PCT/IB2020/058893
§ 371 (c)(1),
(2) Date: Mar. 22, 2022

(87) PCT Pub. No.: WO2021/059160
PCT Pub. Date: Apr. 1, 2021

(65) Prior Publication Data
US 2023/0143040 A1    May 11, 2023

Related U.S. Application Data

(60) Provisional application No. 62/904,482, filed on Sep. 23, 2019.

(51) Int. Cl.
C07D 239/47    (2006.01)
C07C 273/18    (2006.01)

(52) U.S. Cl.
CPC ...... *C07D 239/47* (2013.01); *C07C 273/1863* (2013.01)

(58) Field of Classification Search
CPC .................................................. C07D 239/47
See application file for complete search history.

(56) References Cited

U.S. PATENT DOCUMENTS

| | | | |
|---|---|---|---|
| 2,774,760 | A  | 12/1956 | Whitehead |
| 8,263,603 | B2 | 9/2012  | Boebel |
| 8,318,758 | B2 | 11/2012 | Boebel |
| 8,470,839 | B2 | 6/2013  | Boebel |
| 8,552,020 | B2 | 10/2013 | Boebel |
| 8,658,660 | B2 | 2/2014  | Boebel |
| 8,916,579 | B2 | 12/2014 | Boebel |
| 9,000,002 | B2 | 4/2015  | Boebel |
| 9,006,259 | B2 | 4/2015  | Boebel |
| 9,271,497 | B2 | 3/2016  | Lorsbach |
| 9,321,734 | B2 | 4/2016  | Lorsbach |
| 9,526,245 | B2 | 12/2016 | Owen |
| 9,532,570 | B2 | 1/2017  | Owen |
| 9,538,753 | B2 | 1/2017  | Owen |
| 9,622,474 | B2 | 4/2017  | Lorsbach |
| 9,642,368 | B2 | 5/2017  | Lorsbach |
| 9,840,475 | B2 | 12/2017 | Lorsbach |
| 9,840,476 | B2 | 12/2017 | Choy |
| 9,850,215 | B2 | 12/2017 | Choy |
| 9,862,686 | B2 | 1/2018  | Boebel |
| 9,908,855 | B2 | 3/2018  | Lorsbach |
| 10,045,533 | B2 | 8/2018 | Owen |
| 10,045,534 | B2 | 8/2018 | Owen |
| 10,051,862 | B2 | 8/2018 | Owen |
| 10,059,703 | B2 | 8/2018 | Lorsbach |
| 10,426,165 | B2 | 10/2019 | Owen |

(Continued)

FOREIGN PATENT DOCUMENTS

| | | |
|---|---|---|
| CN | 103992278 B | 7/2016 |
| WO | WO 2023/166485 A1 | 9/2023 |

(Continued)

OTHER PUBLICATIONS

International Search Report issued Dec. 4, 2020 in connection with PCT International Application No. PCT/IB2020/058893.

Notification of Transmittal of the International Search Report and the Written Opinion of the International Searching Authority, or the Declaration issued Dec. 4, 2020 in connection with PCT International Application No. PCT/IB2020/058893.

Tee, O. S. et al., "Mechanisms of Bromination of Uracil Derivatives. 6. Cytosine and N-Substituted Derivatives". The Journal of Organic Chemistry, 1982, vol. 47(6), pp. 1018-1023.

Whitehead, C. W. and Traverso, J. J., "Synthesis of Cytosines". Journal of the American Chemical Society, 1955, vol. 77(22), pp. 5867-5872.

(Continued)

*Primary Examiner* — Golam M Shameem
(74) *Attorney, Agent, or Firm* — Gary J. Gershik

(57) ABSTRACT

The present invention provides a process for preparing a compound having the formula (I):

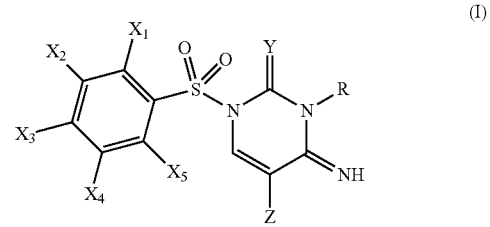

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S; and
and Z is a halogen.

14 Claims, 1 Drawing Sheet

(56) References Cited

U.S. PATENT DOCUMENTS

| | | |
|---|---|---|
| 10,426,166 B2 | 10/2019 | Owen |
| 10,426,167 B2 | 10/2019 | Owen |
| 10,919,864 B2 | 2/2021 | Choy |
| 11,632,954 B2 * | 4/2023 | Grabarnick ............ A01N 43/54 514/274 |
| 12,127,560 B2 | 10/2024 | Owen |
| 2015/0183749 A1 | 7/2015 | Choy et al. |
| 2021/0378235 A1 | 12/2021 | Shabtai |
| 2022/0104489 A1 | 4/2022 | Klittich |
| 2022/0104490 A1 | 4/2022 | Owen |
| 2022/0110323 A1 | 4/2022 | Owen |
| 2022/0248673 A1 | 8/2022 | Shabtai |
| 2023/0104954 A1 | 4/2023 | Alasibi |
| 2023/0292746 A1 | 9/2023 | Yardeni |
| 2024/0172750 A1 | 5/2024 | Rosenmund |
| 2024/0237649 A1 | 7/2024 | Giaffreda |
| 2024/0351990 A1 | 10/2024 | Giaffreda |

FOREIGN PATENT DOCUMENTS

| | | |
|---|---|---|
| WO | WO 2023/228148 A1 | 11/2023 |
| WO | WO 2024/184859 A1 | 9/2024 |
| WO | WO 2024/189563 A1 | 9/2024 |
| WO | WO 2024/214047 A1 | 10/2024 |

OTHER PUBLICATIONS

Written Opinion of the International Searching Authority issued Dec. 4, 2020 in connection with PCT International Application No. PCT/IB2020/058893.

International Preliminary Report on Patentability, including Written Opinion of the International Searching Authority, issued Mar. 15, 2022 in connection with PCT International Application No. PCT/IB2020/058893.

* cited by examiner

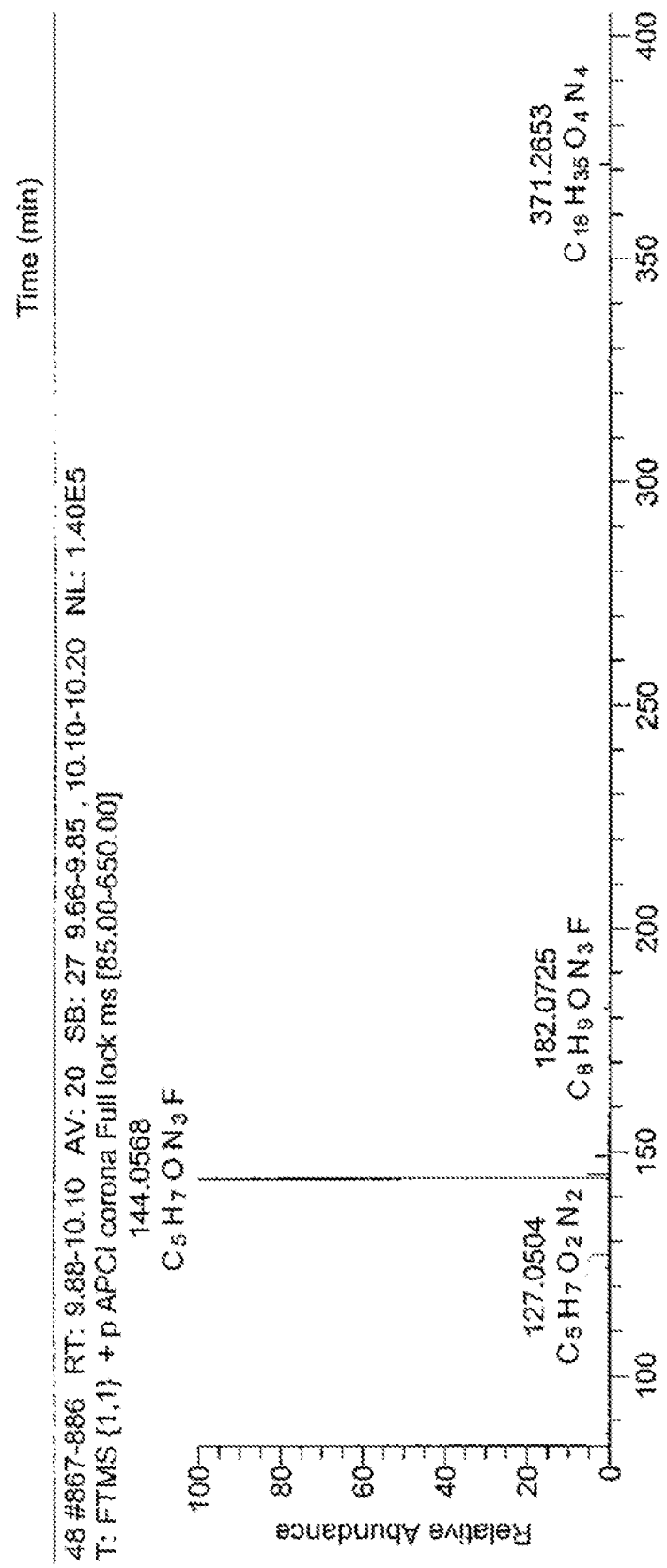

PROCESS FOR PREPARING 5-(FLUORO-4-IMINO-3-METHYL)-1-TOSYL-3,4 DIHYDROPYRIMIDINE-(1H)-ONE AND DERIVATIVES OF THE COMPOUND

CROSS-REFERENCE TO RELATED APPLICATIONS

This application is a § 371 national stage of PCT International Application No. PCT/IB2020/058893, filed Sep. 23, 2020, claiming the benefit of U.S. Provisional Application No. 62/904,482, filed Sep. 23, 2019, the entire contents of each of which are hereby incorporated by reference into the subject application.

Throughout this application various publications are referenced. The disclosures of these documents in their entireties are hereby incorporated by reference into this application in order to more fully describe the state of the art to which this invention pertains.

TECHNICAL FIELD

The present subject matter relates to an efficient procedure for preparing 5-(fluoro-4-imino-3-methyl)-1-tosyl-3,4-dihydro-pyrimidine-(1h)-one and derivatives thereof including synthesis of intermediates of the process.

BACKGROUND

The compound 5-(fluoro-4-imino-3-methyl)-1-tosyl-3,4-dihydro-pyrimidine-(1h)-one has the structure:

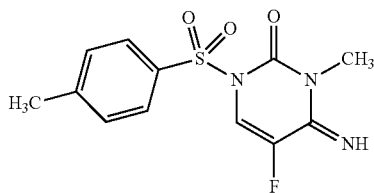

5-(Fluoro-4-imino-3-methyl)-1-tosyl-3,4 dihydropyrimidine-(1h)-one is a systemic fungicide which provides control of variety of pathogens in economically important crops including, but not limited to the causal agent of leaf blotch in wheat, *Septoria tritici* (SEPTTR).

Different manufacturing processes are known from the literature, including those described in WO2015/103144, WO2015/103142, CN 103992278, CN101597264, JP58185569, JP58162579, Whitehead, C. et al 1953 and Whitehead, C. et al 1955.

However, there is a need to develop a more efficient synthesis pathway by improving the different steps of the process and there is a need to improve each step of the complete reaction in high yield, conversion and purity.

SUMMARY OF THE INVENTION

The present invention provides a process for preparing a compound having the formula (I):

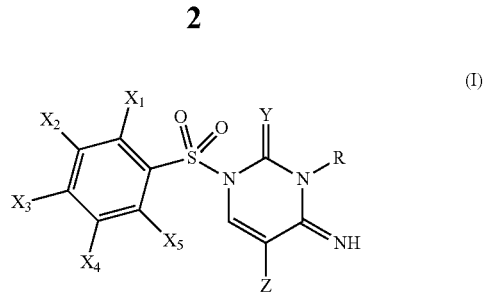

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;
Y is O or S;
and Z is a halogen,
comprising reacting an alkyl-urea or thiourea of the formula RNH(C=Y)$NH_2$ with a trialkyl orthoformate in the presence of a cyanoacyl derivative having the formula R'C(O)$CH_2$CN, wherein R' is OH, O—R" or S—R", wherein R" is alkyl, or with a cyanoacetaldehyde dialkyl acetal, under conditions sufficient to obtain the compound of formula (III),

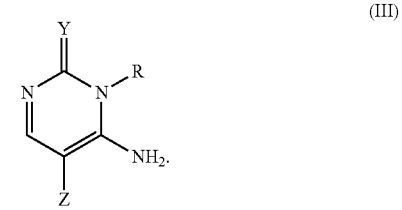

The present invention provides a process for preparing a compound having the formula (I):

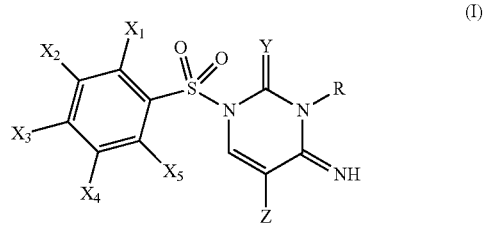

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;
Y is O or S;
and Z is a halogen,
comprising reacting an alkyl-urea or thiourea of the formula RNH(C=Y)$NH_2$ with a trialkyl orthoformate in the presence of cyanoacyl derivative having the formula R'C(O)

CH$_2$CN, wherein R' is OH, O—R" or S—R", wherein R" is alkyl, or with a cyanoacetaldehyde dialkyl acetal, under conditions sufficient to obtain the compound of formula (II),

(II)

BRIEF DESCRIPTION OF THE DRAWINGS

FIG. 1. LCMS of compound III (M+H) m/z 144.0568.

DETAILED DESCRIPTION OF THE INVENTION

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains.

The term "a" or "an" as used herein includes the singular and the plural, unless specifically stated otherwise. Therefore, the terms "a," "an," or "at least one" can be used interchangeably in this application.

Throughout the application, descriptions of various embodiments use the term "comprising"; however, it will be understood by one of skill in the art, that in some specific instances, an embodiment can alternatively be described using the language "consisting essentially of" or "consisting of". In each such instance, the terms "comprising," "consisting essentially of," and "consisting of" are intended to have the same meaning as each such term would have when used as the transition phrase of a patent claim.

For purposes of better understanding the present teachings and in no way limiting the scope of the teachings, unless otherwise indicated, all numbers expressing quantities, percentages, or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In this regard, used of the term "about" herein specifically includes ±10% from the indicated values in the range. In addition, the endpoints of all ranges directed to the same component or property herein are inclusive of the endpoints, are independently combinable, and include all intermediate points and ranges.

The present invention to provide a process, which is suitable for industrial use, highly efficient, low-cost, environmentally friendly.

The present invention provides a process for preparing a compound having the formula (I):

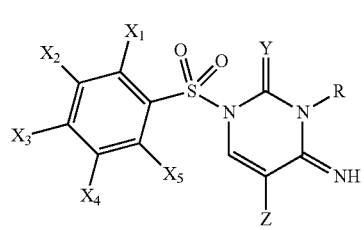

(I)

wherein
R is alkyl or alkylaryl;
each of X$_1$, X$_2$, X$_3$, X$_4$ and X$_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$ with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (III),

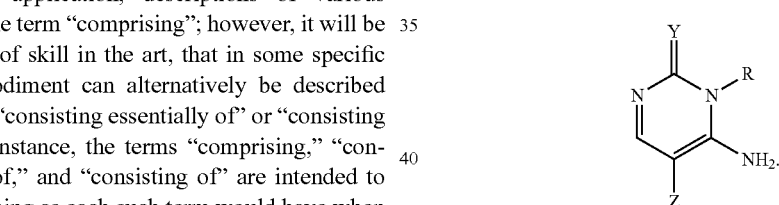

(III)

The present invention provides a process for preparing a compound having the formula (I):

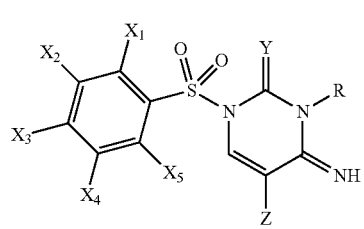

(I)

wherein
R is alkyl or alkylaryl;
each of X$_1$, X$_2$, X$_3$, X$_4$ and X$_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen, comprising reacting an alkyl-urea or thiourea of the formula RNH(C=Y)NH$_2$ with a trialkyl orthoformate in the presence of cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (II),

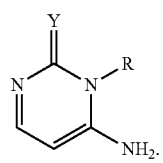

(II)

In some embodiments, the process further comprising reacting the compound of formula (II) with a halogenating agent under conditions sufficient to obtain the compound of formula (III) having the structure

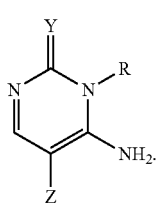

(III)

In some embodiments, the process wherein the cyanoacyl derivative is cyanoacetic acid, thiocyanoacetic acid, an alkyl cyanoacetate or an alkyl thiocyanoacetate.

In some embodiments, the process wherein the cyanoacetaldehyde dialkyl acetal is cyanoacetaldehyde dimethyl acetal, cyanoacetaldehyde diethyl acetal, cyanoacetaldehyde dipropyl acetal or cyanoacetaldehyde dibutyl acetal.

In some embodiments, the process comprising reacting the compound of formula (II) with a fluorinating agent under conditions sufficient to obtain the compound of formula (III) having the structure

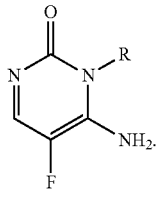

(III)

In some embodiments, the process further comprising the step wherein the compound of formula (III) is reacted with a compound having the following structure:

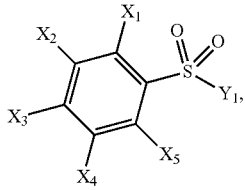

wherein Y$_1$ is halogen, imidazole, or

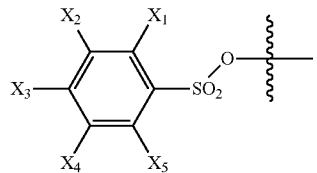

under conditions sufficient to obtain the compound of formula (I).

In some embodiments, the process for preparing a compound having the formula (I) comprising the steps of:
(i) reacting an alkyl-urea of the formula RNH(C=Y)NH$_2$ with a trialkyl orthoformate in the presence of cyanoacetic acid; and
(ii) adding a base to the reaction mixture under conditions sufficient to obtain the compound of formula (II),

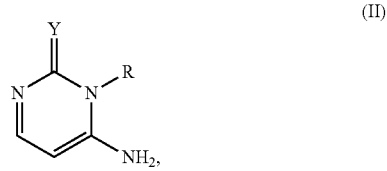

(II)

wherein at least one of steps (i) and (ii) is carried out in the presence of at least one suitable solvent.

In some embodiments, the process for preparing a compound having the formula (I) comprising the steps of:
(i) reacting an alkyl-urea of the formula RNH(C=Y)NH$_2$ with a trialkyl orthoformate in the presence of cyanoacetic acid,
(ii) adding a base to the reaction mixture under conditions sufficient to obtain the compound of formula (II),

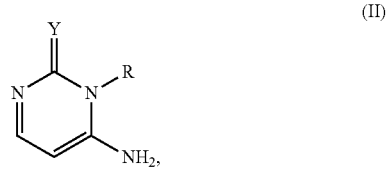

(II)

and
(iii) reacting the compound of formula (II) with a halogenating agent, under conditions sufficient to obtain the compound of formula (III),

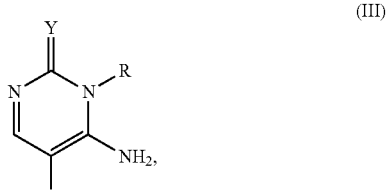

(III)

wherein at least one of steps (i), (ii) and (iii) is carried out in the presence of at least one suitable solvent.

In some embodiments, the process for preparing a compound having the formula (I) comprising the steps of:
(i) reacting an alkyl-urea of the formula RNH(C=Y)NH$_2$, wherein R is alkyl or alkylaryl, with a trialkyl orthoformate in the presence of a cyanoacyl derivative having the formula R'C(O)CH$_2$CN, wherein R' is O—R" or S—R", wherein R" is alkyl;
(ii) adding a base to the reaction mixture under conditions sufficient to obtain the compound of formula (II),

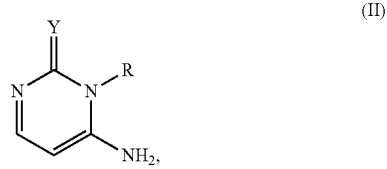

wherein at least one of steps (i) and (ii) is carried out in the presence of at least one suitable solvent.

In some embodiments, the process for preparing a compound having the formula (I) comprising the steps of:
(i) reacting an alkyl-urea of the formula RNH(CY)NH$_2$, wherein R is alkyl or alkylaryl, with a trialkyl orthoformate in the presence of a cyanoacyl derivative having the formula R'C(O)CH$_2$CN, wherein R' is O—R" or S—R", wherein R" is alkyl;
(ii) adding a base to the reaction mixture under conditions sufficient to obtain the compound of formula (II),

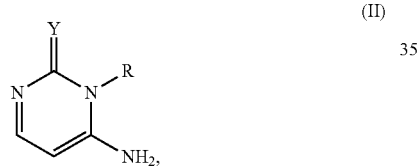

and
(iii) reacting the compound of formula (II) with a halogenating agent, under conditions sufficient to obtain the compound of formula (III),

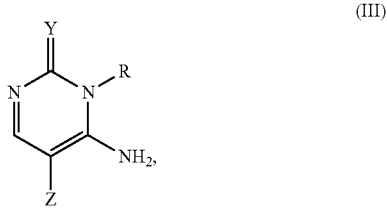

wherein at least one of steps (i), (ii) and (iii) is carried out in the presence of at least one suitable solvent.

In some embodiments, the process wherein step (i), or step (ii), or step (iii), or steps (i) and (ii), or steps (ii) and (iii), or steps (i) and (iii), or steps (i), (ii) and (iii) is/are carried out in presence of a suitable solvent. In some embodiments, the suitable solvent in which the above steps are carried out are the same.

In some embodiments, the process wherein the suitable solvent is dimethylformamide, acetonitrile diglyme, dimethylacetate, N-methylpyrrolidone or dimethylacetamide.

In some embodiments, the process wherein steps (i) and (ii) are carried out in separate pots. In some embodiments, the process wherein steps (i) and (ii) are carried out in the same pot and (iii) is carried out in a separate pot. In some embodiments, the process wherein steps (i) and (ii) are carried out in one-pot. In some embodiments, the process, wherein steps (i), (ii) and (iii) are carried out in one-pot.

In some embodiments, the process wherein the base is DABCO 1,4-diazabicyclo[2.2.2]octane (DABCO), 1,8-Diazabicyclo[5.4.0]undec-7-ene (DBU), a metal carbonate or a metal alkoxide. In some embodiments, the process wherein the base is dissolved in the at least one suitable solvent prior to addition to the reaction mixture.

In some embodiments, the process comprising the following steps:
(i) reacting an alkyl-urea of the formula RNH(C=Y)NH$_2$ with a trialkyl orthoformate in the presence of cyanoacetic acid to form the compound of formula (V),

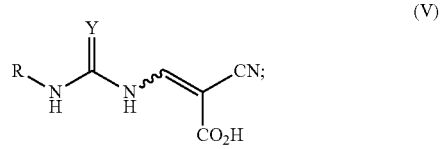

(iia) adding a base to the reaction mixture of step (i) under conditions sufficient to obtain the compound of formula (IV),

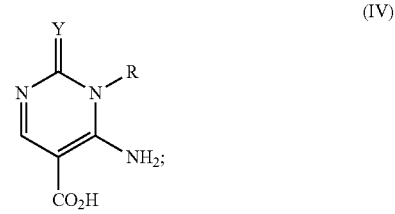

(iib) heating the product obtained in step (iia) under conditions sufficient to obtain the compound of formula (II),

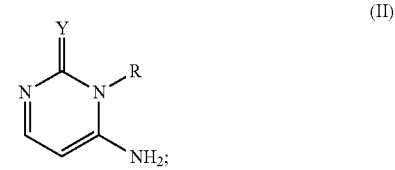

and
(iii) reacting the compound of formula (II) with a halogenating agent under conditions sufficient to obtain the compound of formula (III),

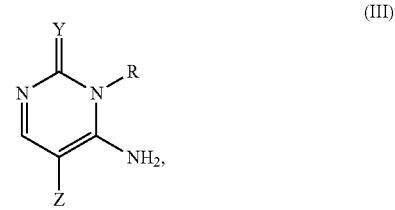

wherein at least one of steps (i), (iia) and (iib) is carried out in the presence of at least one suitable solvent.

In some embodiments, the process comprising the following steps:

(ia) reacting a trialkyl orthoformate in the presence of cyanoacetic acid to form the compound of formula (IX),

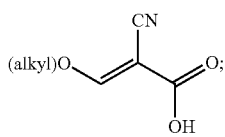

(ib) reacting the compound of formula (IX) with an alkylurea of the formula RNH(C=Y)NH$_2$ to form the compound of formula (V),

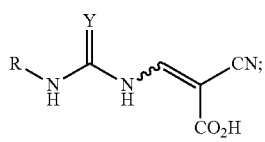

(iia) adding a base to the reaction mixture of step (ia) under conditions sufficient to obtain the compound of formula (IV),

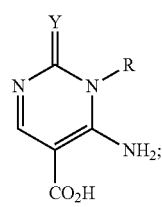

(iib) heating the product obtained in step (iia) under conditions sufficient to obtain the compound of formula (II),

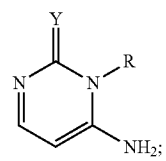

and (iii) reacting the compound of formula (II) with a halogenating agent under conditions sufficient to obtain the compound of formula (III),

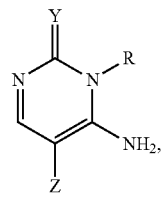

wherein at least one of steps (ia), (ib), (iia) and (iib) is carried out in the presence of at least one suitable solvent.

In some embodiments, the process comprising the following steps:

(ia) reacting a trialkyl orthoformate in the presence of cyanoacetic acid to form the compound of formula (IX),

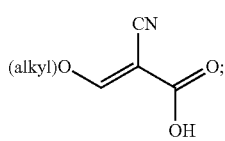

(ib) reacting the compound of formula (IX) with an alkylurea of the formula RNH(C=Y)NH$_2$, wherein R is alkyl or alkylaryl, to form the compound of formula (V),

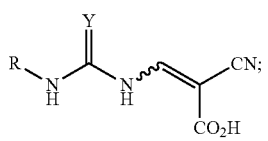

(ic) heating the product obtained in step (ib) under conditions sufficient to obtain the compound of formula (VI),

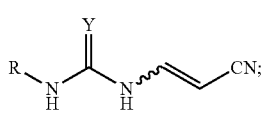

(ii) adding a base to the reaction mixture of step (ic) under conditions sufficient to obtain the compound of formula (II),

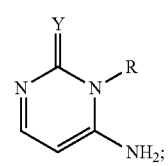

and (iii) reacting the compound of formula (II) with a halogenating agent under conditions sufficient to obtain the compound of formula (III),

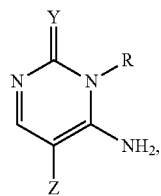

(III)

wherein at least one of steps (ia), (ib), (ic) and (ii) is carried out in the presence of at least one suitable solvent.

In some embodiments, the process comprising the following steps:

(ia) reacting an alkyl-urea of the formula RNH(CO)NH$_2$, wherein R is alkyl or alkylaryl, with a trialkyl orthoformate in the presence of cyanoacetic acid to form the compound of formula (V),

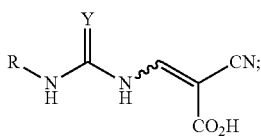

(V)

(ib) heating the product obtained in step (ia) under conditions sufficient to obtain the compound of formula (VI),

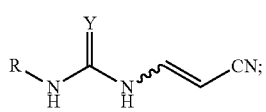

(VI)

(ii) adding a base to the reaction mixture of step (ib) under conditions sufficient to obtain the compound of formula (II),

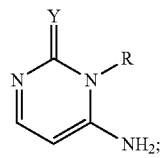

(II)

and (iii) reacting the compound of formula (II) with a halogenating agent under conditions sufficient to obtain the compound of formula (III),

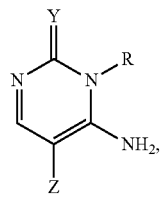

(III)

wherein at least one of steps (ia), (ib), (ic) and (ii) is carried out in the presence of at least one suitable solvent.

In some embodiments, the process wherein the decarboxylation step (ib), (ic), (iia) or (iib) is conducted neat or in the presence of a second suitable solvent.

In some embodiments, the process wherein the second suitable solvent is sulfolane.

In some embodiments, the process comprising the following steps:

(ia) reacting an alkyl-urea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, to obtain compound of the formula (Va) or (Vb),

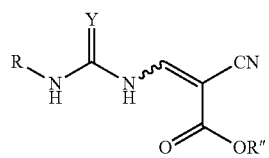

(Va)

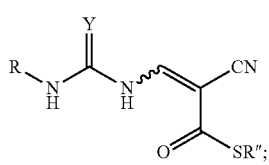

(Vb)

(ib) acidic hydrolysis of the product of step (ia) to form the corresponding acid to form the compound of formula (V),

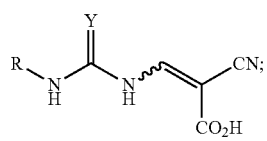

(V)

(iia) adding a base to the acid product of step (ib) under conditions sufficient to obtain the compound of formula (IV),

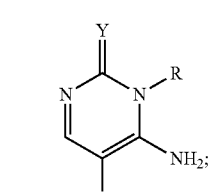

(IV)

(iib) heating the product obtained in step (iia) under conditions sufficient to obtain the compound of formula (II),

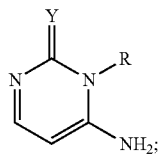
(II)

and (iii) reacting the compound of formula (II) with a halogenating agent under conditions sufficient to obtain the compound of formula (III),

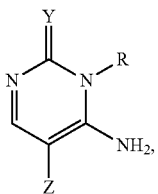
(III)

wherein at least one of steps (ia), (ib), (iia) and (iib) is carried out in the presence of at least one suitable solvent.

In some embodiments, the process comprising the following steps:

(ia) reacting a trialkyl orthoformate in the presence of a cyanoacyl derivative having the formula R'C(O)CH$_2$CN, wherein R' is O—R" or S—R", wherein R" is alkyl, to obtain compound of the formula (IXa) or (IXb),

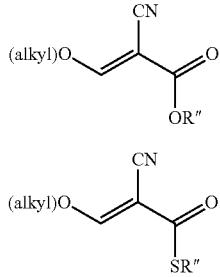
(IXa)

(IXb)

(ib) reacting the compound of formula (IXa) or (IXb) with an alkyl-urea of the formula RNH(C=Y)NH$_2$ to obtain compound of the formula (Va) or (Vb),

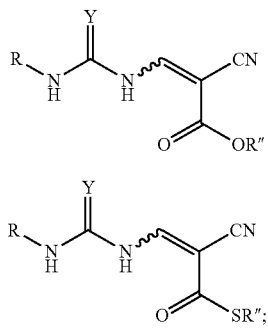
(Va)

(Vb)

(ic) acidic hydrolysis of the product of step (ib) to form the compound of formula (V),

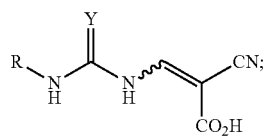
(V)

(iia) adding a base to the acid product of step (ic) under conditions sufficient to obtain the compound of formula (IV),

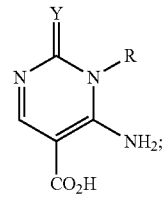
(IV)

(iib) heating the product obtained in step (iia) under conditions sufficient to obtain the compound of formula (II),

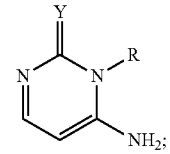
(II)

and (iii) reacting the compound of formula (II) with a halogenating agent under conditions sufficient to obtain the compound of formula (III),

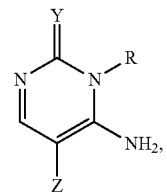
(III)

wherein at least one of steps (ia), (ib), (ic), (iia) and (iib) is carried out in the presence of at least one suitable solvent.

In some embodiments, the process comprising the following steps:

(ia) reacting an alkyl-urea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, to obtain compound of the formula (Va) or (Vb),

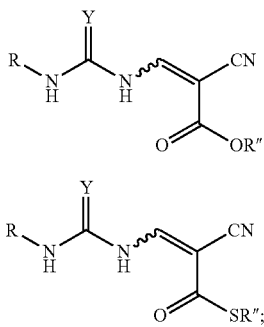

(Va)

(Vb)

(ib) acidic hydrolysis of the product of step (ia) to form the corresponding acid to form the compound of formula (V),

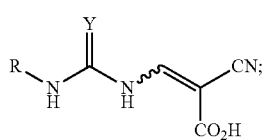

(V)

(ic) heating the product obtained in step (ib) under conditions sufficient to obtain the compound of formula (VI),

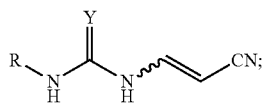

(VI)

(ii) adding a base to the reaction mixture of step (ic) under conditions sufficient to obtain the compound of formula (II),

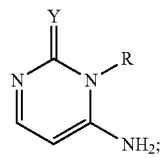

(II)

and
(iii) reacting the compound of formula (II) with a halogenating agent under conditions sufficient to obtain the compound of formula (III),

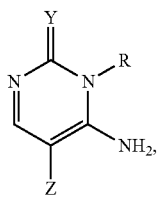

(III)

wherein at least one of steps (ia), (ib), (ic) and (ii) is carried out in the presence of at least one suitable solvent.

In some embodiments, the process comprising the following steps:

(ia) reacting a trialkyl orthoformate in the presence of a cyanoacyl derivative having the formula R'C(O)CH$_2$CN, wherein R' is O—R" or S—R", wherein R" is alkyl, to obtain compound of the formula (IXa) or (IXb),

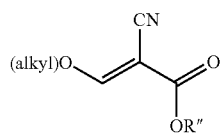

(IXa)

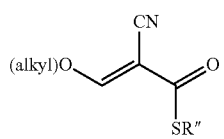

(IXb)

(ib) reacting the compound of formula (IXa) or (IXb) with an alkyl-urea of the formula RNH(C=Y)NH$_2$ to obtain compound of the formula (Va) or (Vb),

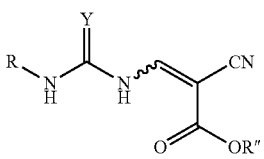

(Va)

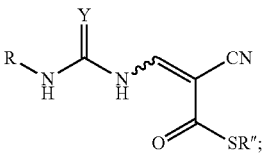

(Vb)

(ic) acidic hydrolysis of the product of step (ib) to form the corresponding acid to form the compound of formula (V),

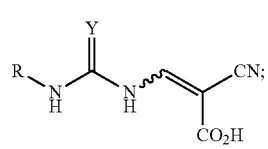

(V)

(id) heating the product obtained in step (ic) under conditions sufficient to obtain the compound of formula (VI),

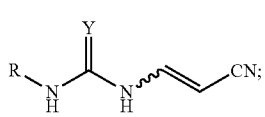

(VI)

(ii) adding a base to the reaction mixture of step (id) under conditions sufficient to obtain the compound of formula (II),

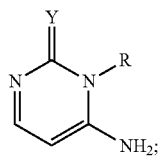
(II)

and (iii) reacting the compound of formula (II) with a halogenating agent under conditions sufficient to obtain the compound of formula (III),

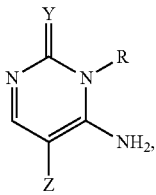
(III)

wherein at least one of steps (ia), (ib), (ic), (id) and (ii) is carried out in the presence of at least one suitable solvent.

In some embodiments, the process comprising the following steps:

(i) reacting an alkyl-urea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, to obtain compound of the formula (Va) or (Vb),

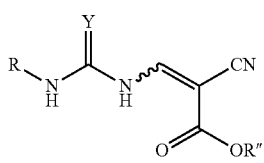
(Va)

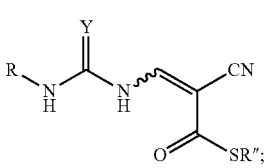
(Vb)

(iia) adding a base to the acid product of step (i) under conditions sufficient to obtain the compound of formula (IVa) or (IVb),

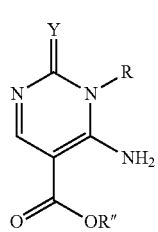
(IVa)

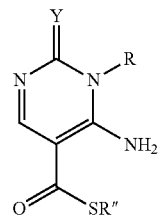
(IVb)

(iib) acidic hydrolysis of the product of step (iia) to the corresponding acid to form the compound of formula (IV),

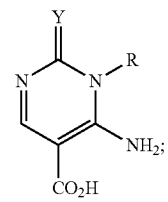
(IV)

(iic) heating the product obtained in step (iib) under conditions sufficient to obtain the compound of formula (II),

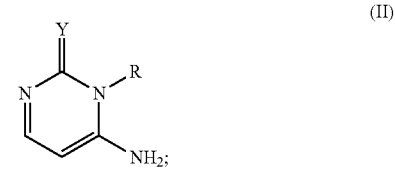
(II)

and (iii) reacting the compound of formula (II) with a halogenating agent under conditions sufficient to obtain the compound of formula (III),

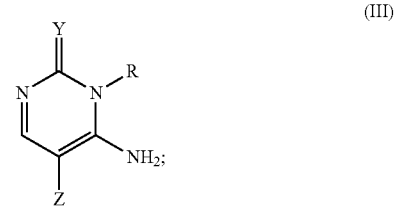
(III)

wherein at least one of steps (i), (iia), (iib) and (iic) is carried out in the presence of at least one suitable solvent.

In some embodiments, the process comprising the following steps:

(ia) reacting a trialkyl orthoformate in the presence of a cyanoacyl derivative having the formula R'C(O)CH$_2$CN, wherein R' is O—R" or S—R", wherein R" is alkyl, to obtain compound of the formula (IXa) or (IXb),

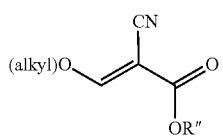

(IXa)

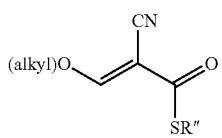

(IXb)

(ib) reacting the compound of formula (IXa) or (IXb) with an alkyl-urea of the formula RNH(C=Y)NH$_2$ to obtain compound of the formula (Va) or (Vb),

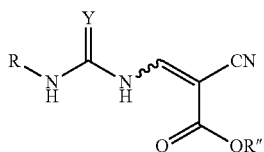

(Va)

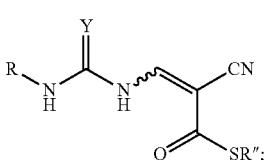

(Vb)

(iia) adding a base to the acid product of step (ib) under conditions sufficient to obtain the compound of formula (IVa) or (IVb),

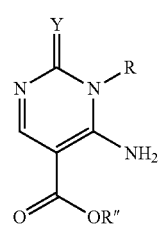

(IVa)

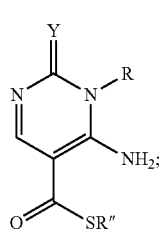

(IVb)

(iib) acidic hydrolysis of the product of step (iia) to the corresponding acid to form the compound of formula (IV),

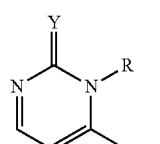

(IV)

(iic) heating the product obtained in step (iib) under conditions sufficient to obtain the compound of formula (II), (II)

and (iii) reacting the compound of formula (II) with a halogenating agent under conditions sufficient to obtain the compound of formula (III), (III)

wherein at least one of steps (i), (ib), (iia), (iib) and (iic) is carried out in the presence of at least one suitable solvent.

In some embodiments, the process wherein the decarboxylation step (ic), (id), (iib) or (iic) is conducted neat or in the presence of a second suitable solvent. In some embodiments, the process wherein the second suitable solvent is sulfolane.

In some embodiments, the process for preparing a compound having the formula (I) comprising the steps of:
(i) reacting an alkyl-urea of the formula RNH(C=Y)NH$_2$ with a trialkyl orthoformate in the presence of a cyanoacetaldehyde dialkyl acetal; and
(ii) adding a base to the reaction mixture under conditions sufficient to obtain the compound of formula (II), (II)

wherein at least one of steps (i) and (ii) is carried out in the presence of at least one suitable solvent.

In some embodiments, the process for preparing a compound having the formula (I) comprising the steps of:

(i) reacting an alkyl-urea of the formula RNH(C=S)NH$_2$ with a trialkyl orthoformate in the presence of a cyanoacetaldehyde dialkyl acetal;

(ii) adding a base to the reaction mixture under conditions sufficient to obtain the compound of formula (II),

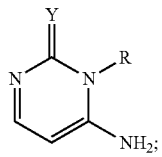
(II)

and (iii) reacting the compound of formula (II) with a halogenating agent, under conditions sufficient to obtain the compound of formula (III),

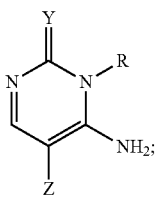
(III)

wherein at least one of steps (i), (ii) and (iii) is carried out in the presence of at least one suitable solvent.

In some embodiments, the process comprising:

(i) reacting an alkyl-urea of the formula RNH(C=Y)NH$_2$ with a trialkyl orthoformate in the presence of a cyanoacetaldehyde dialkyl acetal to form the compound of formula (V);

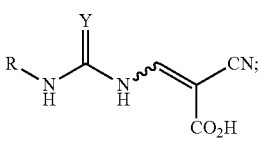
(V)

(iia) adding a base to the reaction mixture of step (i) under conditions sufficient to obtain the compound of formula (IV),

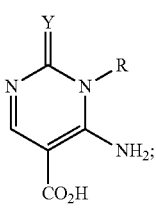
(IV)

(iib) heating the product obtained in step (iia) under conditions sufficient to obtain the compound of formula (II),

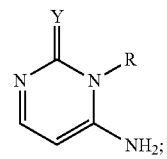
(II)

and (iii) reacting the compound of formula (II) with a halogenating agent under conditions sufficient to obtain the compound of formula

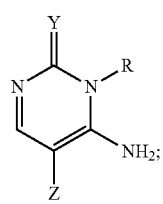
(III)

wherein at least one of steps (i), (iia) and (iib) is carried out in the presence of at least one suitable solvent.

In some embodiments, the process comprising the following steps:

(ia) reacting an alkyl-urea of the formula RNH(C=Y)NH$_2$ with a trialkyl orthoformate in the presence of cyanoacetic acid to form the compound of formula (V),

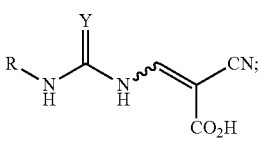
(V)

(ib) heating the product obtained in step (ia) under conditions sufficient to obtain the compound of formula (VI),

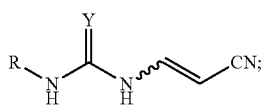
(VI)

(ii) adding a base to the reaction mixture of step (ib) under conditions sufficient to obtain the compound of formula (II),

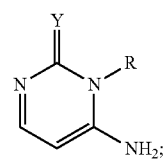
(II)

and (iii) reacting the compound of formula (II) with a halogenating agent under conditions sufficient to obtain the compound of formula (III),

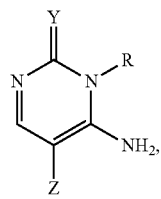

(III)

wherein at least one of steps (ia), (ib) and (ii) is carried out in the presence of at least one suitable solvent.

In some embodiments, the process wherein the decarboxylation step (ib) or (iib) is conducted neat or in the presence of a second suitable solvent. In some embodiments, the process wherein the second suitable solvent is sulfolane.

In some embodiments, the process for preparing a compound having the formula (I) comprising reacting the compound of formula (VIII) with

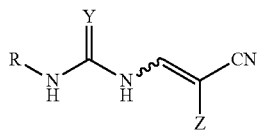

(VIII)

with a base under conditions sufficient to obtain the compound of formula (III).

In some embodiments, the process for preparing a compound having the formula (I) comprising the steps of:
(ia) reacting an alkyl-urea of the formula $RNH(C=Y)NH_2$ with a trialkyl orthoformate to obtain the compound having the structure:

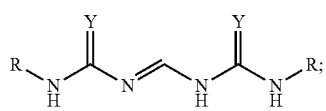

(VII)

(ib) reacting the compound of the formula (VII) with a haloacetonitrile under conditions sufficient to form the compound of the formula (VIII):

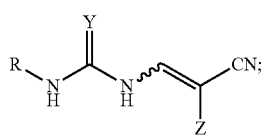

(VIII)

(ii) adding a base to the reaction mixture under conditions sufficient to obtain the compound of formula (III),
wherein at least one of step (ia), (ib) and (ii) is carried out in the presence of at least one suitable solvent.

In some embodiments, the process wherein step (ia) and (ib) is carried out in presence of a suitable solvent. In some embodiments, the process wherein step (ii) is carried out in presence of a suitable solvent. In some embodiments, the process wherein step (ia), (ib) and (ii) are each carried out in presence the same suitable solvent.

In some embodiments, the process wherein the suitable solvent is acetonitrile dimethylformamide, diglyme, dimethylacetate, N-methylpyrrolidone or dimethylacetamide In some embodiments, the process wherein steps (ia), (ib) and (ii) are carried out in one-pot.

In some embodiments, the process comprising the following steps:
(ia) reacting an alkyl-urea of the formula $RNH(C=Y)NH_2$ with a trialkyl orthoformate in the presence of cyanoacetic acid under conditions sufficient to obtain the compound of the formula (V),

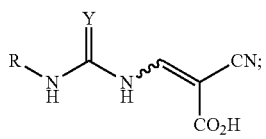

(V)

(ib) adding a halogenating agent to the reaction mixture of step (ia) under conditions sufficient to obtain the compound of formula (VIII),

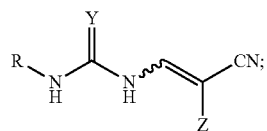

(VIII)

(ii) adding a base to the reaction mixture of step (ib) under condition sufficient to obtain the compound of formula (III),
wherein at least one of step (ia), (ib) and (ii) is carried out in the presence of at least one suitable solvent.

In some embodiments, the process comprising the following steps:
(ia) reacting an alkyl-urea of the formula $RNH(C=Y)NH_2$ with a trialkyl orthoformate in the presence of cyanoacetic acid under conditions sufficient to obtain the compound of formula (V),

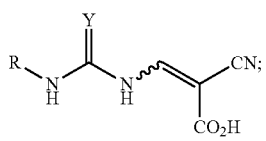

(V)

(ib) heating the product obtained in step (ia) in the presence of a third suitable solvent under conditions sufficient to obtain the compound of formula (VI);

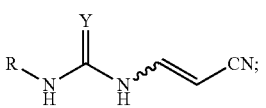

(VI)

(ic) adding a halogenating agent to the reaction mixture of step (ib) under conditions sufficient to obtain the compound of formula (VIII),

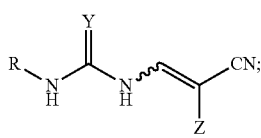

(VIII)

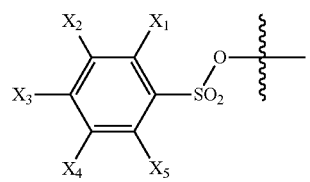

(ii) adding a base to the reaction mixture of step (ic) under conditions sufficient to obtain the compound of formula (III), wherein at least one of steps (ia), (ib), (ic) and (ii) is carried out in the presence of at least one suitable solvent.

In some embodiments, the process wherein the suitable solvent is acetonitrile dimethylformamide, diglyme, dimethylacetate, N-methylpyrrolidone or dimethylacetamide In some embodiments, the process wherein the suitable solvent used in step (ib) and/or step (ii) is methanol, n-butanol or diglyme.

In some embodiments, the process wherein steps (ia), (ib) and (ii) are carried out in one-pot; or the steps (ia), (ib), (ic) are carried out in one-pot and step (ii) is carried out in a separate pot.

In some embodiments, the process wherein the base is 1,4-diazabicyclo[2.2.2]octane (DABCO), 1,8-diazabicyclo [5.4.0]undec-7-ene (DBU), a metal carbonate or a metal alkoxide.

In some embodiments, the process wherein the halogenating step (iii) is conducted in one step. In some embodiments, the process wherein the one step process is direct fluorination. In some embodiments, the process wherein the halogenating step (iii) is conducted in two steps. In some embodiments, the process wherein the two step process is (iiia) chlorination, bromination or iodination followed by (iiib) halogen exchange to fluorine.

In some embodiments, the process wherein at least one of step (iiia) or (iiib) is conducted in a suitable solvent.

In some embodiments, the process wherein the halogenating agent is a fluorinating agent. In some embodiments, the process wherein the fluorinating agent is 1-chloromethyl-4-fluoro-1,4-diazoniabicyclo[2.2.2]octane bis(tetrafluoroborate) or fluorine gas.

In some embodiments, the process wherein fluorinating step is carried out in the presence of formic acid, hydrofluoric acid, acetic acid or mixtures thereof.

In some embodiments, the process further comprising the step wherein the compound of formula (III) is reacted with a compound having the following structure:

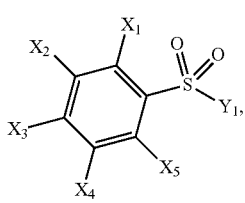

wherein $Y_1$ is halogen, imidazole, or under conditions sufficient to obtain the compound of formula (I).

In some embodiments, the process wherein R is alkyl. In some embodiments, the process wherein R is methyl. In some embodiments, the process wherein in the compound of formula (I) $X_1$, $X_2$, $X_4$ and $X_5$ are each H and $X_3$ is alkyl. In some embodiments, the process wherein $X_1$, $X_2$, $X_4$ and $X_5$ are each H and $X_3$ is methyl. In some embodiments, the process wherein Z is fluorine. In some embodiments, the process wherein Y is oxygen.

In some embodiments, the process wherein the compound of formula (I) produced has the structure:

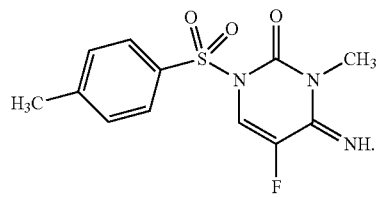

The present invention also provides a process for preparing a compound of the formula (II):

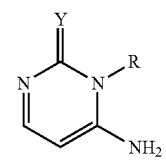

(II)

wherein
R is alkyl or alkylaryl,
comprising reacting an alkyl-urea or thiourea of the formula RNH(C=Y)NH$_2$ with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal.

In some embodiments, the process comprising the following steps:
(i) reacting an alkyl-urea of the formula RNH(C=Y)NH$_2$ with a trialkyl orthoformate in the presence of cyanoacetic acid to form the compound of formula (V),

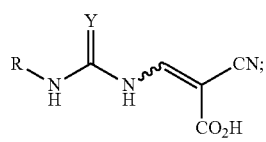

(V)

(ii) adding a base to the reaction mixture of step (i) under conditions sufficient to obtain the compound of formula (IV),

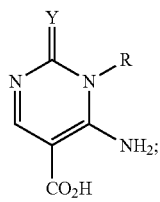
(IV)

(iia) heating the product obtained in step (ii) under conditions sufficient to obtain the compound of formula (II), wherein at least one of steps (i) and (ii) is carried out in the presence of at least one suitable solvent.

In some embodiments, the process comprising the following steps:

(ia) reacting a trialkyl orthoformate in the presence of cyanoacetic acid to form the compound of formula (IX),

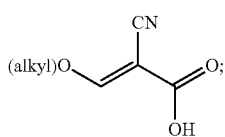
(IX)

(ib) reacting the compound of formula (IX) with an alkyl-urea of the formula RNH(C=Y)NH$_2$ to form the compound of formula (V),

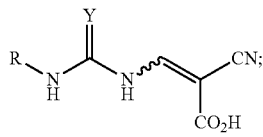
(V)

(iia) adding a base to the reaction mixture of step (ib) under conditions sufficient to obtain the compound of formula (IV),

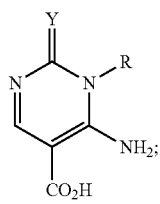
(IV)

(iib) heating the product obtained in step (iia) under conditions sufficient to obtain the compound of formula (II),
wherein at least one of steps (ia), (ib), (iia) and (iib) is carried out in the presence of at least one suitable solvent.

In some embodiments, the process comprising the following steps:

(ia) reacting a trialkyl orthoformate in the presence of cyanoacetic acid to form the compound of formula (IX),

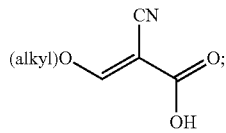
(IX)

(ib) reacting the compound of formula (IX) with an alkyl-urea of the formula RNH(C=S)NH$_2$ to form the compound of formula (V),

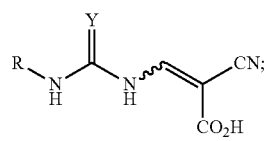
(V)

(ic) heating the product obtained in step (ib) under conditions sufficient to obtain the compound of formula (VI),

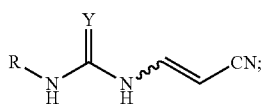
(VI)

(ii) adding a base to the reaction mixture of step (ic) under conditions sufficient to obtain the compound of formula (II), wherein at least one of steps (ia), (ib), (ic) and (ii) is carried out in the presence of at least one suitable solvent.

In some embodiments the process comprising the following steps:

(ia) reacting an alkyl-urea of the formula RNH(C=Y)NH$_2$ with a trialkyl orthoformate in the presence of cyanoacetic acid to form the compound of formula (V),

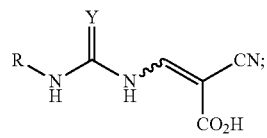
(V)

(ib) heating the product obtained in step (ia) under conditions sufficient to obtain the compound of formula (VI),

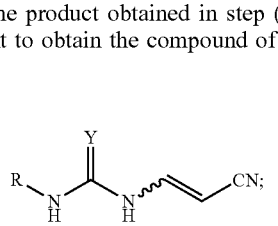
(VI)

(ii) adding a base to the reaction mixture of step (ib) under conditions sufficient to obtain the compound of formula (II), wherein at least one of steps (ia), (ib), (ic) and (ii) is carried out in the presence of at least one suitable solvent.

In some embodiments the process wherein the decarboxylation step (ib), (ic), (iia) or (iib) is conducted neat or in the presence of a second suitable solvent.

In some embodiments the process wherein the second suitable solvent is sulfolane.

In some embodiments the process comprising the following steps:

(ia) reacting an alkyl-urea of the formula RNH(C=Y)NH₂ with a trialkyl orthoformate in the presence of a cyanoacyl derivative having the formula R'C(O)CH₂CN, wherein R' is O—R" or S—R", wherein R" is alkyl, to obtain compound of the formula (Va) or (Vb),

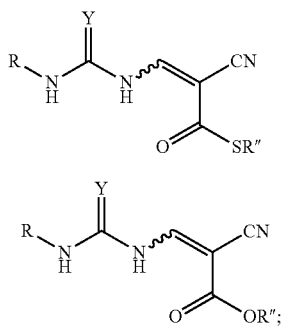

(ib) acidic hydrolysis of the product of step (ia) to form the corresponding acid to form the compound of formula (V),

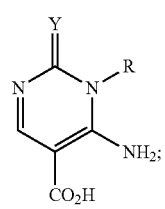

(iia) adding a base to the acid product of step (ib) under conditions sufficient to obtain the compound of formula (IV),

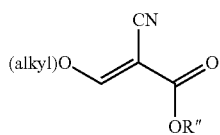

(iib) heating the product obtained in step (iia) under conditions sufficient to obtain the compound of formula (II), wherein at least one of steps (ia), (ib), (iia) and (iib) is carried out in the presence of at least one suitable solvent.

In some embodiments the process comprising the following steps:

(ia) reacting a trialkyl orthoformate in the presence of a cyanoacyl derivative having the formula R'C(O)CH₂CN, wherein R' is O—R" or S—R", wherein R" is alkyl, to obtain compound of the formula (IXa) or (IXb),

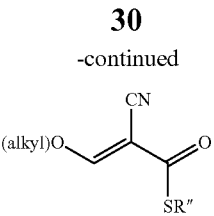

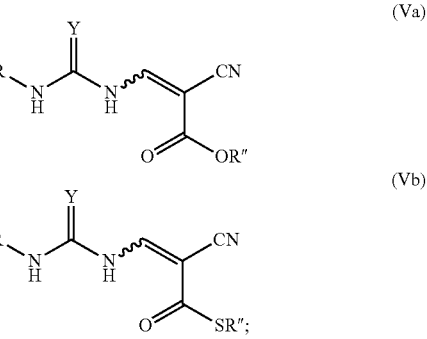

(ib) reacting the compound of formula (IXa) or (IXb) with an alkyl-urea of the formula RNH(C=Y)NH₂ to obtain compound of the formula (Va) or (Vb),

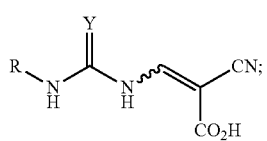

(ic) acidic hydrolysis of the product of step (ib) to form the corresponding acid to form the compound of formula (V),

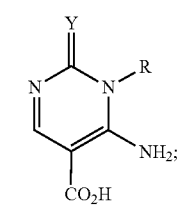

(iia) adding a base to the acid product of step (ic) under conditions sufficient to obtain the compound of formula (IV), (IV)

(iib) heating the product obtained in step (iia) under conditions sufficient to obtain the compound of formula (II), wherein at least one of steps (ia), (ib), (ic), (iia) and (iib) is carried out in the presence of at least one suitable solvent.

In some embodiments the process comprising the following steps:

(ia) reacting an alkyl-urea of the formula RNH(C=Y)NH₂ with a trialkyl orthoformate in the presence of a cyanoacyl derivative having the formula R'C(O)CH₂CN, wherein R' is O—R" or S—R", wherein R" is alkyl, to obtain compound of the formula (Va) or (Vb),

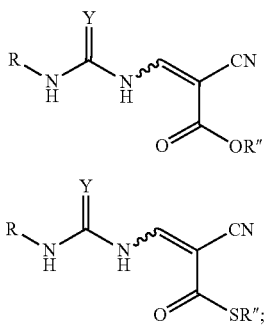

(ib) acidic hydrolysis of the product of step (ia) to form the corresponding acid to form the compound of formula (V),

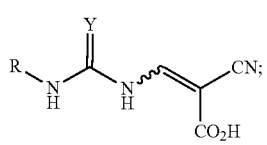

(ic) heating the product obtained in step (ib) under conditions sufficient to obtain the compound of formula (VI),

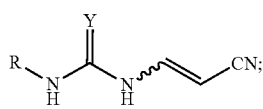

(ii) adding a base to the reaction mixture of step (ic) under conditions sufficient to obtain the compound of formula (II),

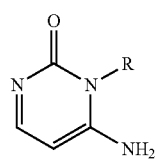

and
(iii) reacting the compound of formula (II) with a halogenating agent under conditions sufficient to obtain the compound of formula (III),

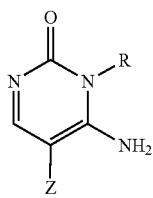

wherein at least one of steps (ia), (ib), (ic) and (ii) is carried out in the presence of at least one suitable solvent.

In some embodiments the process comprising the following steps:
(ia) reacting a trialkyl orthoformate in the presence of a cyanoacyl derivative having the formula R'C(O)CH$_2$CN, wherein R' is O—R" or S—R", wherein R" is alkyl, to obtain compound of the formula (IXa) or (IXb),

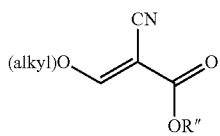

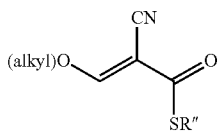

(ib) reacting the compound of formula (IXa) or (IXb) with an alkyl-urea of the formula RNH(C=Y)NH$_2$ to obtain compound of the formula (Va) or (Vb),

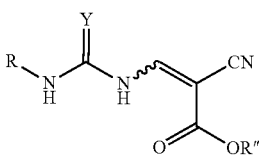

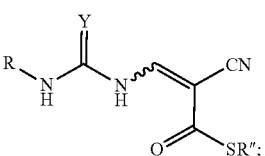

(ic) acidic hydrolysis of the product of step (ib) to form the corresponding acid to form the compound of formula (V),

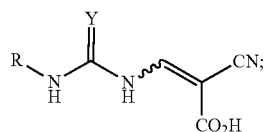

(id) heating the product obtained in step (ic) under conditions sufficient to obtain the compound of formula (VI),

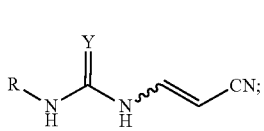

(ii) adding a base to the reaction mixture of step (id) under conditions sufficient to obtain the compound of formula (II), wherein at least one of steps (ia), (ib), (ic), (id) and (ii) is carried out in the presence of at least one suitable solvent.

In some embodiments the process comprising the following steps:

(i) reacting an alkyl-urea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, to obtain compound of the formula (Va) or (Vb),

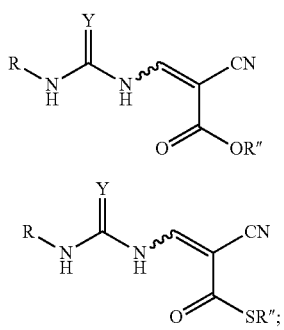

(iia) adding a base to the acid product of step (i) under conditions sufficient to obtain the compound of formula (IVa) or (IVb),

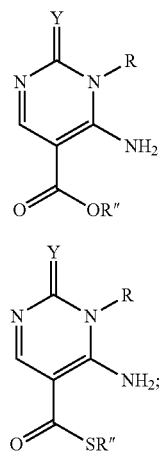

(iib) acidic hydrolysis of the product of step (iia) to the corresponding acid to form the compound of formula (IV),

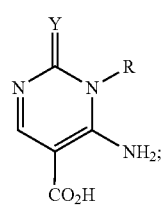

(iic) heating the product obtained in step (iib) under conditions sufficient to obtain the compound of formula (II), wherein at least one of steps (i), (iia), (iib) and (iic) is carried out in the presence of at least one suitable solvent.

In some embodiments the process comprising the following steps:
(ia) reacting a trialkyl orthoformate in the presence of a cyanoacyl derivative having the formula R'C(O)CH$_2$CN, wherein R' is O—R" or S—R", wherein R" is alkyl, to obtain compound of the formula (IXa) or (IXb),

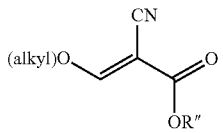

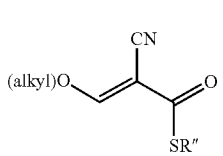

(ib) reacting the compound of formula (IXa) or (IXb) with an alkyl-urea of the formula RNH(C=Y)NH$_2$ to obtain compound of the formula (Va) or (Vb),

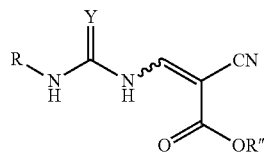

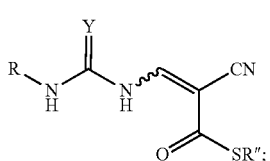

(iia) adding a base to the acid product of step (ib) under conditions sufficient to obtain the compound of formula (IVa) or (IVb),

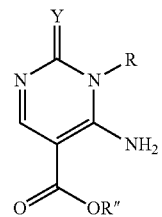

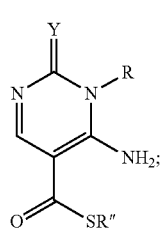

(iib) acidic hydrolysis of the product of step (iia) to the corresponding acid to form the compound of formula (IV),

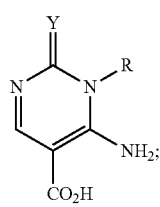

(iic) heating the product obtained in step (iib) under conditions sufficient to obtain the compound of formula (II),
wherein at least one of steps (i), (ib), (iia), (iib) and (iic) is carried out in the presence of at least one suitable solvent.

In some embodiments the process comprising the following steps of:
(ia) reacting an alkyl-urea of the formula RNH(C=YY=)NH₂ with a trialkyl orthoformate under conditions sufficient to obtain the following compound of the formula (VII):

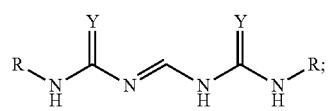

(ib) reacting the compound of the formula (VII) with cyanoacetic acid under conditions sufficient to form the compound of the formula (V):

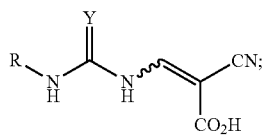

(iia) adding a base to the reaction mixture under conditions sufficient to obtain the compound of formula (IV):

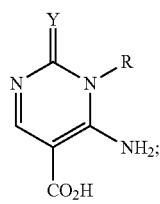

and
(iib) heating the product obtained in step (iia) neat or in the presence of a second suitable solvent under conditions sufficient to obtain the compound of formula (II),
wherein at least one of steps (ia), (ib), (iia) and (iib) is carried out in the presence of at least one suitable solvent.

In some embodiments the process wherein the decarboxylation step (ic), (id), (iib) or (iic) is conducted neat or in the presence of a second suitable solvent.

In some embodiments, the process wherein the second suitable solvent is sulfolane. In some embodiments the process wherein the suitable solvent is dimethylformamide, acetonitrile diglyme, dimethylacetate, N-methylpyrrolidone or dimethylacetamide. In some embodiments the process wherein the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments the process wherein each step in the process is conducted in separate pots. In some embodiments the process wherein the process is conducted in one-pot.

In some embodiments the process wherein R is methyl.

The present invention also provides a process for preparing the compound having the structure:

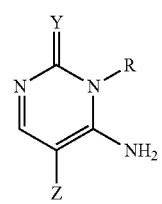

wherein R is alkyl or alkylaryl, which comprises preparing the compound of formula (II) according to the process of the present invention.

The present invention also provides a process for preparing the compound having the structure:

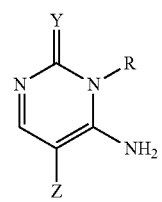

wherein R is alkyl or alkylaryl, which comprises (a) preparing the compound of formula (II) according to the process of the present invention; and (b) reacting the compound of formula (II) with a halogenating agent under conditions sufficient to obtain the compound of formula (III).

The present invention also provides a process for preparing the compound having the structure:

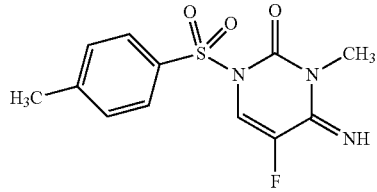

which comprises preparing the compound of formula (II), wherein R₁ is methyl, according to the process of the present invention.

The present invention also provides a process for preparing a compound of the formula (III):

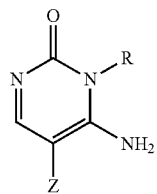

(III)

wherein
R is alkyl or alkylaryl,
comprising the process of the present invention to form the compound of formula (II) and further comprising adding a halogenating agent to the reaction mixture under conditions sufficient to obtain the compound of formula (III).

In some embodiments the process wherein the halogenating step is conducted in one step. In some embodiments the process wherein the one step process is direct fluorination. In some embodiments the process wherein the halogenating step is conducted in two steps. In some embodiments the process wherein the two step process is chlorination, bromination or iodination followed by halogen exchange to fluorine.

In some embodiments the process wherein at least one of the steps is conducted in a suitable solvent.

In some embodiments the process wherein the halogenating agent is a fluorinating agent. In some embodiments the process wherein the fluorinating agent is 1-chloromethyl-4-fluoro-1,4-diazoniabicyclo[2.2.2]octane bis(tetrafluoroborate) or fluorine gas. In some embodiments the process wherein fluorinating step is carried out in the presence of formic acid, hydrofluoric acid, acetic acid or mixtures thereof.

The present inventions yet further provides a process for preparing the compound having the structure:

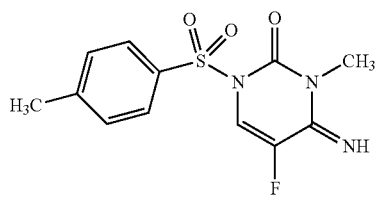

which comprises (a) preparing the compound of formula (III), wherein $R_1$ is methyl, according to the process of the present invention.

The present inventions yet further provides a process for preparing a compound having the formula (I) having the structure:

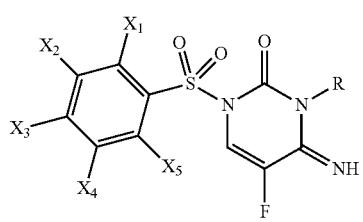

(I)

which comprises preparing the compound of formula (III) according to the process of the present invention.

The present inventions yet further provides a process for preparing a compound of the formula (V):

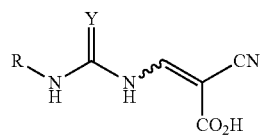

(V)

wherein
R is alkyl or alkylaryl; and
Y is O or S,
comprising reacting an alkyl-urea or thiourea of the formula $RNH(C{=}Y)NH_2$ with a trialkyl orthoformate in the presence of a cyanoacyl derivative having the formula $R'C(O)CH_2CN$, wherein R' is OH, O—R" or S—R", wherein R" is alkyl, or with a cyanoacetaldehyde dialkyl acetal.

In some embodiments the process comprising reacting an alkyl-urea of the formula $RNH(C{=}Y)NH_2$, wherein R is alkyl or alkylaryl, with a trialkyl orthoformate in the presence of cyanoacetic acid to form the compound of formula (V),
wherein the reaction is carried out in the presence of at least one suitable solvent or neat.

In some embodiments the process comprising reacting an alkyl-urea of the formula $RNH(C{=}Y)NH_2$, wherein R is alkyl or alkylaryl, with a trialkyl orthoformate in the presence of cyanoacetic acid to form the compound of formula (V).

In some embodiments the process comprising the following steps:
(ia) reacting a trialkyl orthoformate in the presence of cyanoacetic acid to form the compound of formula (IX),

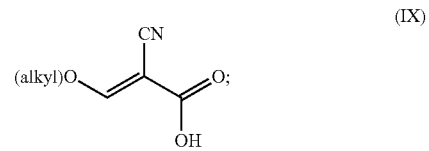

(IX)

and
(ib) reacting the compound of formula (IX) with an alkyl-urea of the formula $RNH(C{=}Y)NH_2$ to form the compound of formula (V),
wherein at least one of steps (ia) and (ib) is carried out in the presence of at least one suitable solvent.

In some embodiments the process comprising the following steps:
(ia) reacting a trialkyl orthoformate in the presence of a cyanoacyl derivative having the formula $R'C(O)CH_2CN$, wherein R' is O—R" or S—R", wherein R" is alkyl, to obtain compound of the formula (IXa) or (IXb),

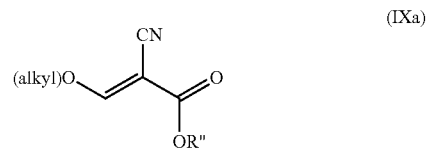

(IXa)

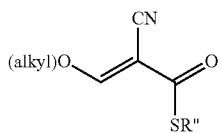
(IXb)

(ib) reacting the compound of formula (IXa) or (IXb) with an alkyl-urea of the formula RNH(C=Y)NH$_2$ to obtain compound of the formula (Va) or (Vb),

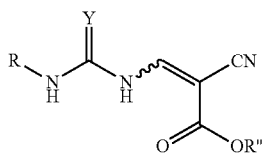
(Va)

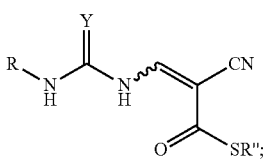
(Vb)

and (ic) acidic hydrolysis of the product of step (ib) to form the corresponding acid to form the compound of formula (V), wherein at least one of steps (ia), (ib) and (ic) is carried out in the presence of at least one suitable solvent.

In some embodiment, the process comprising the following steps:

(ia) reacting an alkyl-urea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, to obtain compound of the formula (Va) or (Vb),

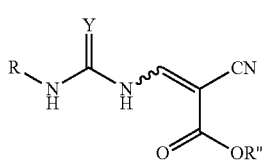
(Va)

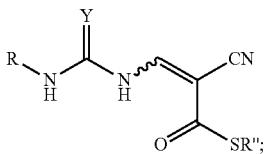
(Vb)

and (ib) acidic hydrolysis of the product of step (ia) to form the corresponding acid to form the compound of formula (V),

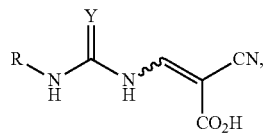
(V)

wherein at least one of steps (ia) and (ib) is carried out in the presence of at least one suitable solvent.

In some embodiments the process comprising reacting an alkyl-urea of the formula RNH(C=Y)NH$_2$ with a trialkyl orthoformate in the presence of a cyanoacetaldehyde dialkyl acetal to form the compound of formula (V);

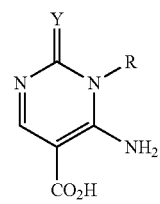
(V)

wherein the reaction is carried out in the presence of at least one suitable solvent or neat.

The present inventions yet further provides a process for preparing a compound of the formula (IV):

(IV)

wherein
R is alkyl or alkylaryl; and
Y is S or O,
comprising the process of the present invention to form the compound of formula (II) and further comprising adding a base to the reaction mixture under conditions sufficient to obtain the compound of formula (IV).

In some embodiments the process wherein the base is ammonium chloride, 1,4-diazabicyclo[2.2.2]octane (DABCO), 1,8-Diazabicyclo[5.4.0]undec-7-ene (DBU), a metal carbonate or a metal alkoxide The present inventions yet further provides a process for preparing the compound having the structure:

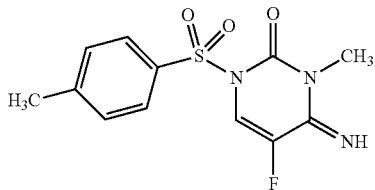

which comprises (a) preparing the compound of formula (IV), wherein R$_1$ is methyl, according to the process of the present invention.

The present inventions yet further provides a process for preparing a compound having the formula (I) having the structure:

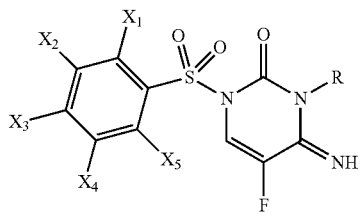

(I)

which comprises preparing the compound of formula (IV) according to the process of the present invention.

The present inventions yet further provides a process for preparing the compound having the structure:

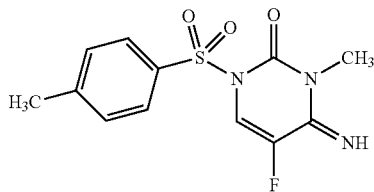

which comprises (a) preparing the compound of formula (V), wherein $R_1$ is methyl, according to the process of the present invention.

The present inventions yet further provides a process for preparing a compound having the formula (I) having the structure:

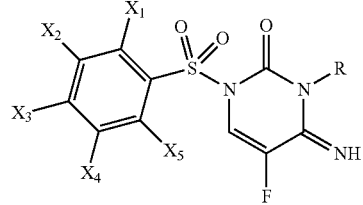

(I)

which comprises preparing the compound of formula (III) according to the process of the present invention.

The present inventions yet further provides a process for preparing a compound having the structure:

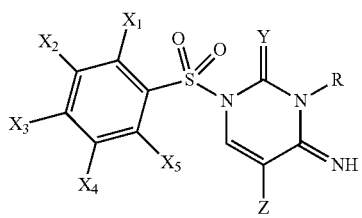

(I)

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting the compound of formula (III) having the structure:

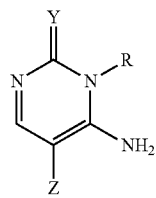

(III)

with a compound having the following structure in the presence of a base,

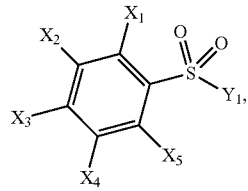

wherein $Y_1$ is halogen, imidazole, or

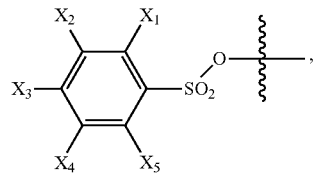

under conditions sufficient to obtain the compound of formula (I).

In some embodiments the process wherein the base has a pKa of less than or equal to 10.5. In some embodiments the process wherein the base is a tertiary amine. In some embodiments the process wherein the reaction is a one-phase reaction. In some embodiments the process wherein the reaction is conducted in the presence of a solvent. In some embodiments the process wherein the solvent is cyclopentyl methyl ether (CPME) or methyl tetrahydrofuran.

In some embodiments the process wherein the reaction is a multi-phasic reaction.

In some embodiments, the combination of the solvent and the base consist of a one-phase system. In some embodiments, the combination of the solvent and the base consist of a multi-phase system.

In some embodiments the process wherein the reaction is conducted in the presence of at least two solvents. In some embodiments the process wherein the solvents are water and one of cyclopentyl methyl ether (CPME) or methyl tetrahydrofuran.

In some embodiments the process wherein the base is tetrahexylammonium bromide or tetrabutylammonium bromide.

In some embodiments the process wherein the compound has the following structure:

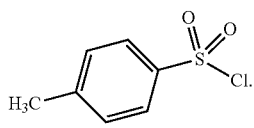

In some embodiments the process wherein the compound of formula (I) has the following structure:

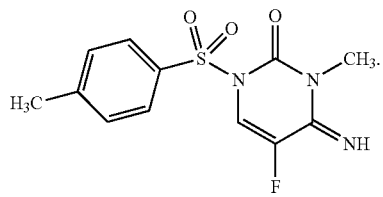 [SMILES: Cc1ccc(S(=O)(=O)n2cc(F)c(=N)n(C)c2=O)cc1]

In some embodiments the process wherein the compound of formula (I) has the following structure:

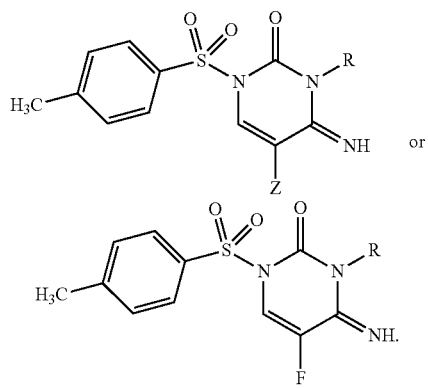

In some embodiments the process wherein the compound of formula (V) has the following structure:

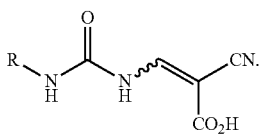

In some embodiments the process wherein the compound of formula (Va) has the following structure:

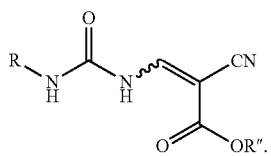

In some embodiments the process wherein the compound of formula (Vb) has the following structure:

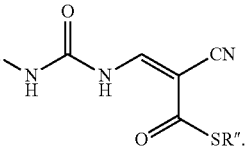

In some embodiments the process wherein the compound of formula (IV) has the following structure:

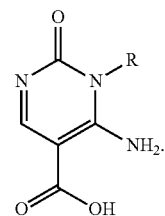

In some embodiments the process wherein the compound of formula (IVa) has the following structure:

In some embodiments the process wherein the compound of formula (IVb) has the following structure:

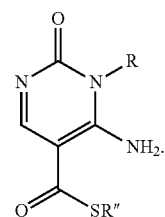

In some embodiments the process wherein the compound of formula (VI) has the following structure:

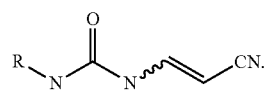

In some embodiments the process wherein the compound of formula (II) has the following structure:

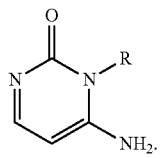

In some embodiments the process wherein the compound of formula (II) has the following structure:

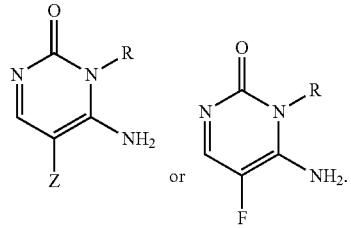

In some embodiments the process wherein the below compound of formula (IIa) is formed as an intermediate in the synthesis of (III) from (II), (IIa) has the following structure:

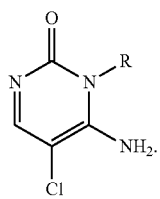

In some embodiments the process wherein the compound of formula (VII) has the following structure:

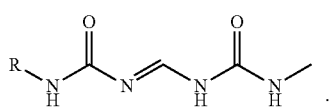

In some embodiments the process wherein the compound of formula (VIII) has the following structure:

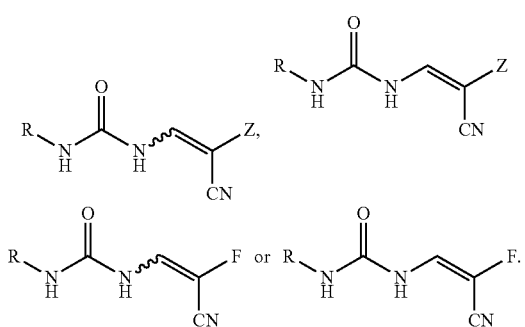

The present invention provides the use of an alkyl-urea or alkyl thiourea of the formula $RNH(C=Y)NH_2$ for preparing the compound having the formula:

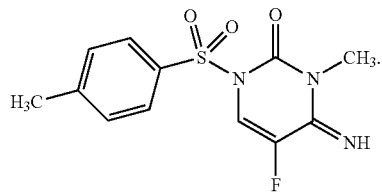 [SMILES: Cc1ccc(S(=O)(=O)n2cc(F)c(=N)n(C)c2=O)cc1]

The present invention provides the use of an alkyl-urea or alkyl thiourea of the formula $RNH(C=Y)NH_2$ for preparing the compound having the formula:

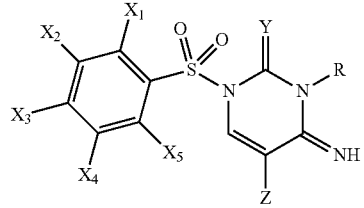

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S; and

Z is a halogen.

Preparation of Compound (I)

The present invention provides a process for preparing a compound having the formula (I):

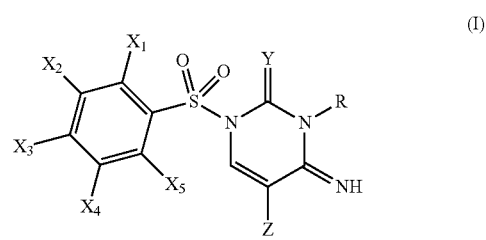

(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S; and

Z is a halogen.

In some embodiments, the compound prepared has the structure:

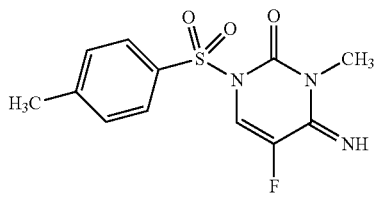

(A) General Synthesis to Compound (I)

The present invention provides a process for preparing a compound having the formula (I):

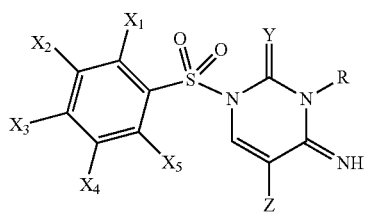

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising reacting an alkyl-urea or thiourea of the formula RNH(C=Y)NH$_2$ with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (III),

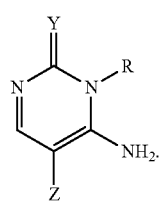

The present invention provides a process for preparing a compound having the formula (I):

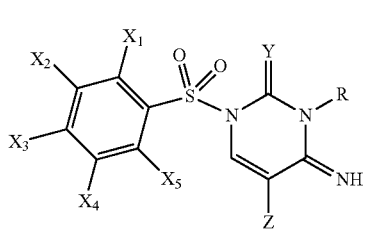

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising reacting an alkyl-urea or thiourea of the formula RNH(C=Y)NH$_2$ with a trialkyl orthoformate in the presence of cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (II),

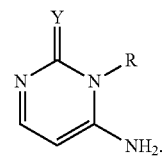

In some embodiments, the process wherein the cyanoacyl derivative is cyanoacetic acid, thiocyanoacetic acid, an alkyl cyanoacetate or an alkyl thiocyanoacetate.

In some embodiments, the process wherein the cyanoacetaldehyde dialkyl acetal is cyanoacetaldehyde dimethyl acetal, cyanoacetaldehyde diethyl acetal, cyanoacetaldehyde dipropyl acetal or cyanoacetaldehyde dibutyl acetal.

In some embodiment the cyanoacyl derivative is HOC(O)CH$_2$CN.

In some embodiment the cyanoacyl derivative is R"SC(O)CH$_2$CN or R"OC(O)CH$_2$CN.

In some embodiments, the above process further comprising the step wherein the compound (II) is halogenated to obtain the compound of formula (III),

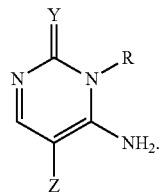

In some embodiments, the above process further comprising the step wherein the compound of formula (III) is reacted with a compound having the following structure:

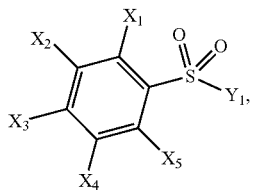

wherein $Y_1$ is halogen, imidazole, or

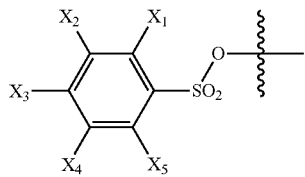

under conditions sufficient to obtain the compound of formula (I).

The present invention also provides a process for preparing a compound having the formula (I):

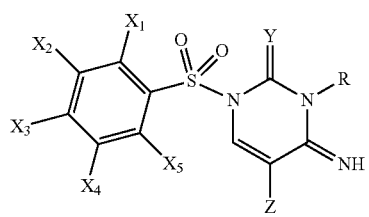

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$, with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (III),

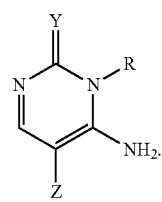

The present invention provides a process for preparing a compound having the formula (I):

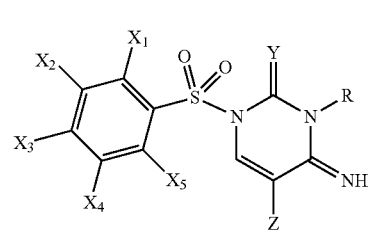

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$, with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (II),

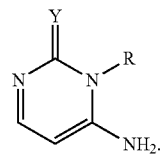

In some embodiments, the above process further comprising the step wherein the compound (II) is halogenated to obtain compound of formula (III),

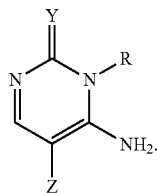

In some embodiments, the process further comprising the step wherein the compound of formula (III) is reacted with a compound having the following structure:

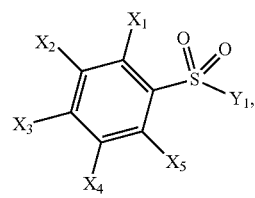

wherein $Y_1$ is halogen, imidazole, or

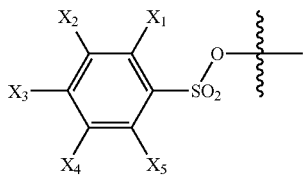

under conditions sufficient to obtain the compound of formula (I).

(B) Synthesis of Compound (I) Via Cyanoacetic Acid, Alkylcyanoacetate or Cyanoacetaldehyde Dialkyl Acetal 1) Preparation of Compound (I) Via Cyanoacetic Acid The present invention provides a process for preparing a compound having the formula (I):

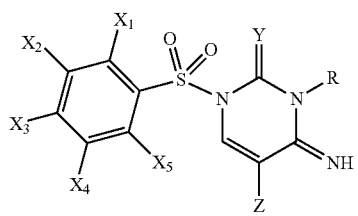

(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising the steps:

(i) reacting an alkyl-urea of the formula RNH(C=Y)NH$_2$ with a trialkyl orthoformate in the presence of cyanoacetic acid to obtain the compound of formula (V);

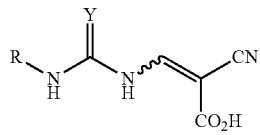

(V)

(iia) adding a base to the reaction mixture of step (i) under conditions sufficient to obtain the compound of formula (IV),

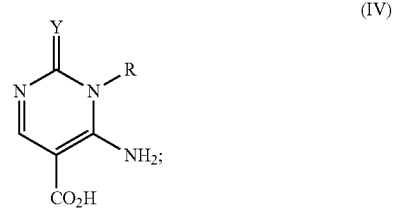

(IV)

(iib) converting product obtained in step (iia) to compound (II) under conditions sufficient to obtain the compound of the formula (II),

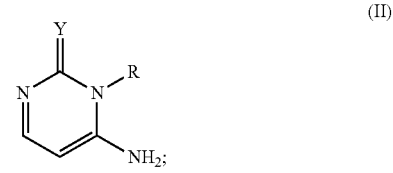

(II)

(iii) halogenation of compound (II) under sufficient conditions to obtain compound (III),

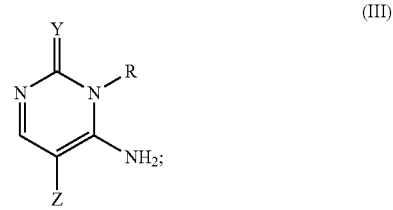

(III)

and (iv) reacting the compound of formula (III) with a compound having the following structure:

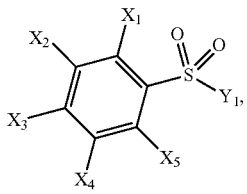

wherein $Y_1$ is halogen, imidazole, or

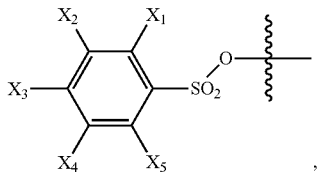

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent.

In some embodiments, the cyclization reaction is conducted prior to the decarboxylation reaction. In some embodiments, compound (II) may be obtained by cyclization of compound (V) to form compound (IV) followed by decarboxylation reaction to obtain (II). In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins. In some embodiments, the decarboxylation reaction to form the compound of the formula (II) from compound (IV) is carried out in a suitable solvent. In some embodiments, the suitable solvent is a solvent with boiling temperature higher than 200° C. For example, the solvent is sulfolane. In some embodiments, when the suitable solvent has a boiling point less than 200° C., the reaction is carried out in presence of base or acid and optionally in the presence of phase transfer catalyst such as tetra butyl ammonium bromide (TBAB). Solvent with boiling point less than 200° C. and suitable for the reaction may be, but is not limited to, dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide. In some embodiments, the acid is ammonium chloride, TsOH, MsOH or any combination thereof.

Conditions suitable for decarboxylation of (IV) to (II) in the presence of base: 1) $NH_4Cl$, DMF at 145° C. 2) DBU, DMF at 130° C.; 3) DMF, DABCO, 110-140° C.; 4) DMA, DABCO 130° C.; 5) DMSO, DABCO 95° C.; 6) DMSO, DBU 130° C.; or 7) $H_2SO_4$ 130° C.

In some embodiments, step (i) is carried out in temperature of 25-50° C.

In some embodiments, at least one of steps (i) and (iia) is carried out in the presence of at least one suitable solvent. Suitable solvents for step (i) include, but are not limited to, DMF, DMA, MCB, butanol, MeOH, $Ac_2O$ or neat (trialkylorthoformate serve as solvent). Suitable solvents for step (ii) include, but are not limited to, MeTHF/EtOH.

In some embodiments, steps (i) and (iia) can be a one-step reaction. In some embodiments, steps (i), (iia) and (iib) can be a one-step reaction. In some embodiments, steps (i), (iia), (iib) and (iii) can be a one-step reaction.

In some embodiments, the cyclization reaction of compound (V) resulted in (IV) or (IVa) or mixture of (IV) and (IVa).

In some embodiments, the hydrolysis of (IVa) to obtain (IV) is conducted during the decarboxylation reaction of (IV) to obtain (II).

In some embodiments, the process further comprises hydrolysis of (IVa) to obtain (IV) prior to decarboxylation reaction of (IV) to obtain (II). In some embodiments the resulting intermediate compounds of the formula (II) and/or (III) are isolated prior to proceeding to the next step. In some embodiments the resulting intermediate compound of the formula (IV) and/or (V), are isolated prior to proceeding to the next step. In some embodiments the resulting intermediate compound of the formula (IV) and/or (V) are not isolated prior to proceeding to the next step.

In some embodiments, the cyclization is a ring-closure to obtain an alkyl cytosine.

In some embodiments, the reaction of the alkylurea and the trialkyl orthoformate is carried out in a suitable solvent.

In some embodiments, the cyclization reaction to form the compound of the formula (IV) from (V) is carried out in a suitable solvent. In some embodiments, the suitable solvent is a polar solvent or a polar aprotic solvent or a polar protic solvent.

Solvents include, but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include, but are not limited to, dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent.

In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV).

In some embodiments, the trialkyl orthoformate is trimethyl orthoformate. In some embodiments, when the trialkyl orthoformate is used as an active reagent in the reaction, it can also function as a solvent (neat reaction).

In some embodiments, the alcohols obtained during the reaction with trialkyl orthoformate is removed. In some embodiments, alcohols obtained during the reaction with trialkyl orthoformate are not removed during the reaction. In some embodiments, alcohols obtained during the reaction with trialkyl orthoformate are not removed prior to the followed reaction.

In some embodiments the decarboxylation of the compound of the formula (IV) or (V) is spontaneous. In some embodiments the decarboxylation is under basic condition.

In some embodiments, the ratio of cyanoacetic acid/trialkyl orthoformate/alkylurea is 1:1:1 to 1:1.65:1.

2) Preparation of Compound (I) Via Cyanoacetic Acid and Intermediate Compound (IX)

The present invention provides a process for preparing a compound having the formula (I):

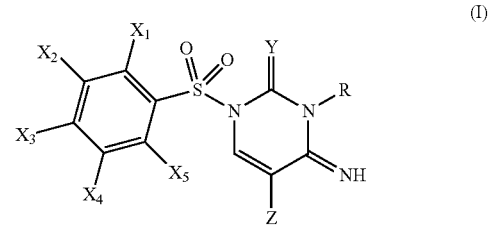

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising (ia) reacting trialkyl orthoformate with cyanoacetic acid to form compound (IX),

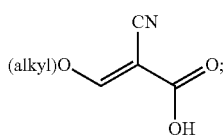
(IX)

(ib) reacting compound (IX) obtained in step (ia) with an alkyl-urea of the formula RNH(C=Y)NH$_2$ to obtain the compound of formula (V),

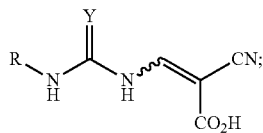
(V)

(iia) adding a base to the reaction mixture of step (ib) under conditions sufficient to obtain the compound of formula (IV),

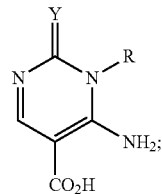
(IV)

(iib) heating the product obtained in step (iia) under conditions sufficient to obtain the compound of the formula (II),

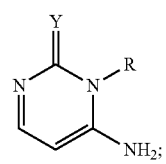
(II)

(iii) halogenation of the compound of formula (II) under sufficient conditions to obtain the compound of formula (III) under sufficient conditions,

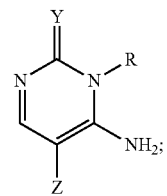
(III)

and (iv) the compound of formula (III) is reacted with a compound having the following structure:

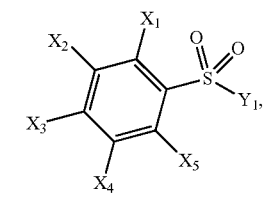

wherein Y$_1$ is halogen, imidazole, or

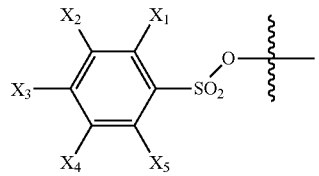

under conditions sufficient to obtain the compound of formula (I).

In some embodiments, at least one of the above steps is conducted in a suitable solvent.

In some embodiments, any of the above steps is conducted in a suitable solvent.

In some embodiments, any of the above steps is conducted neat in the absence of a solvent.

3) Preparation of Compound (I) Via Cyanoacetic Acid and Intermediate Compounds (IX) and (VI)

The present invention provides a process for preparing a compound having the formula (I):

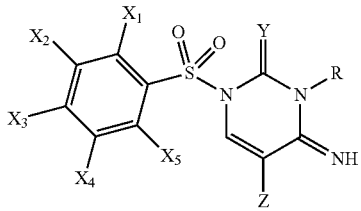
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
and Z is a halogen,
comprising the following steps:
(ia) reacting trialkyl orthoformate with cyanoacetic acid to form compound (IX),

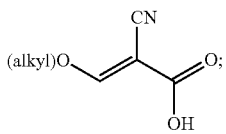

(IX)

(ib) reacting the compound of formula (IX) with an alkyl-urea of the formula RNH(C=Y)NH$_2$ to obtain the compound of (V),

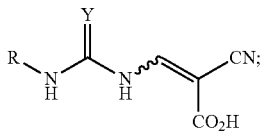

(V)

(ic) heating the product obtained step (ib) under conditions sufficient to obtain the compound of formula (VI),

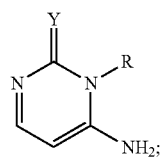

(VI)

(ii) adding a base to the reaction mixture of step (ic) under conditions sufficient to obtain the compound of formula (II),

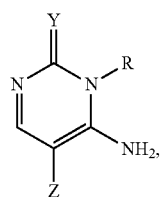

(II)

and
(iii) reacting the compound of formula (II) with a halogenating agent under conditions sufficient to obtain the compound of formula (III),

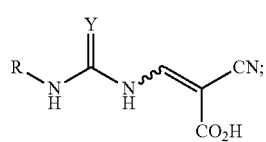

(III)

(iv) the compound of formula (III) is reacted with a compound having the following structure:

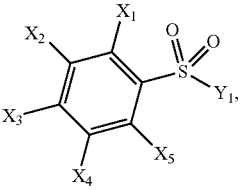

wherein Y$_1$ is halogen, imidazole, or

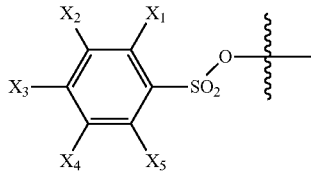

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent.

4) Preparation of Compound (I) Via Cyanoacetic Acid and Intermediate Compound (VI)

The present invention provides a process for preparing a compound having the formula (I):

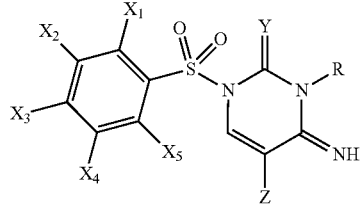

(I)

wherein
R is alkyl or alkylaryl;
each of X$_1$, X$_2$, X$_3$, X$_4$ and X$_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
and Z is a halogen,
comprising the following steps:
(ia) reacting an alkyl-urea of the formula RNH(C=Y)NH$_2$ with a trialkyl orthoformate in the presence of cyanoacetic acid to obtain compound (V),

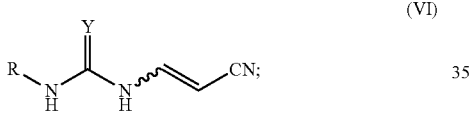

(V)

(ib) heating the product obtained step (ia) under conditions sufficient to obtain the compound of formula (VI),

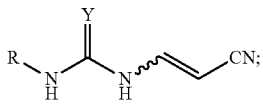

(ii) adding a base to the reaction mixture of step (ib) under conditions sufficient to obtain the compound of formula (II),

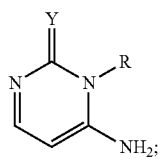

and
(iii) reacting the compound of formula (II) with a halogenating agent under conditions sufficient to obtain the compound of formula (III),

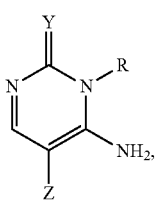

(iv) the compound of formula (III) is reacted with a compound having the following structure:

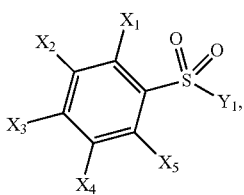

wherein $Y_1$ is halogen, imidazole, or

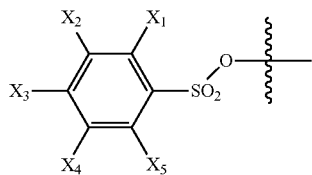

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments of the above process, at least one of steps (ia), (iib) and (ii) is carried out in the presence of at least one suitable solvent. In some embodiments of the above process, at least one of steps (ia), (ib), (ii) and (iii) is carried out in the presence of at least one suitable solvent.

In some embodiments of the above process, N-Methyl-2-pyrrolidone (NMP) is the suitable solvent. In some embodiments, NMP is used as the suitable solvent at a weight ratio of 1:5 to methylurea.

In some embodiments, any one of steps (ia), (iib) and (ii) is performed at 80° C.

In some embodiments, the conversion of the compound of the formula (V) to the compound of the formula (VI) requires heat. In some embodiments, the conversion of the compound of the formula (V) to the compound of the formula (VI) requires refluxing. In some embodiments, the heating or refluxing occurs for at least 30 mins.

In some embodiments, the decarboxylation reaction of compound (V) to form the compound of the formula (VI) is carried out in a suitable solvent. In some embodiments, the suitable solvent for the reaction may be, but is not limited to, dimethylformamide, diglyme, dimethylacetate, N-methylpyrrolidone, dimethylacetamide or any combination thereof.

Base may be but is not limited to organic and non-organic bases. In some embodiments, the base may be, but is not limited to DABCO 1,4-diazabicyclo[2.2.2]octane (DABCO), 1,8-Diazabicyclo[5.4.0]undec-7-ene (DBU), a metal carbonate or a metal alkoxide.

In some embodiments, in step (i) the ratio of cyanoacetic acid/trialkylorthoformate/alkylurea is 1:1:1 to 1:1.65:1. In some embodiments, in step (i) the temperature is 25 to 50° C. In some embodiments, step (i) is conducted neat.

In some embodiments, step (ia) is conducted in a suitable solvent at a MCB, $AC_2O$, DMF, DMA or toluene. Solvent to alkyl urea ratio is 1:3 to 1:5.

Suitable solvents are dimethylformamide, diglyme, dimethylacetate, N-methylpyrrolidone, dimethylacetamide or any combination thereof.

In some embodiments, steps (ia) and (ib) can be a one-step reaction.

In some embodiments the resulting intermediate compound of the formula (II) or (III) is isolated prior to proceeding to the next step. In some embodiments the resulting intermediate compound of the formula (V), (VI), (II), (VII) is isolated prior to proceeding to the next step. In some embodiments the resulting intermediate compound of the formula (V), (VI), (II), (VII) is not isolated prior to proceeding to the next step.

The reaction of the alkylurea and the trialkyl orthoformate in the presence of cyanoacetic acid or a cyanoacetate derivative of the formula $NCCH_2CO_2$(alkyl) includes at least three steps (a) condensation of the alkylurea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IV) from (V) or decarboxylation of compound (V) to form (VI) is carried out in a suitable solvent. In some embodiments, the suitable solvent is a polar solvent or a polar aprotic solvent or a polar protic solvent.

Solvents include but are not limited to THF, Methanol, dimethylformamide, diglyme, dimethylacetate, N-methylpyrrolidone, dimethylacetamide MeTHF or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof. Also MeTHF/EtOH.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV). In some embodiments, when the trialkyl orthoformate is used as an active reagent in the reaction, it can also function as a solvent. Trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) or (V) is spontaneous. In some embodiments the decarboxylation is under basic condition.

In some embodiments, the ratio of cyanoacetic acid/trialkyl orthoformate/alkylurea is 1:1:1 to 1:1.65:1.

In some embodiments during reaction cyclization reaction to form (IV), compounds (IVa) and/or (Va) are also obtained. In some embodiments, the process further comprises hydrolysis of (Va) to obtain (V) prior to cyclization step of (V) to obtain (IV). In some embodiments, the process further comprises cyclization of (Va) to obtain (IVa) followed by hydrolysis of (IVa) to (IV) and decarboxylation of (IV) obtain (II).

In some embodiments, the process further comprises hydrolysis of (IVa) to obtain (IV) prior to decarboxylation step of (IV) to obtain (II).

In some embodiments, the compound of formula (V) is obtained according the present invention processes a mixture with the compound of formula (VI). In some embodiments, compound (V) and/or (VI) are each a mixture of cis and trans isomers.

5) Preparation Via Hydrolysis of Ester Derivative (Va)

The present invention provides a process for preparing a compound having the formula (I):

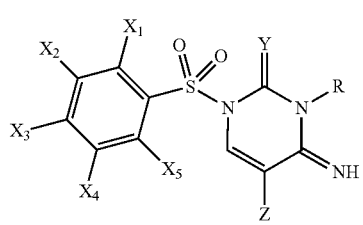

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
and Z is a halogen,
comprising
(ia) reacting an alkyl-urea or thiourea of the formula RNH(C=Y)NH$_2$ with a trialkyl orthoformate in the presence of a cyanoacyl derivative having the formula R'C(O)CH$_2$CN, wherein R' is O—R" or S—R", wherein R" is alkyl, under conditions sufficient to obtain the compound of formula (Va),

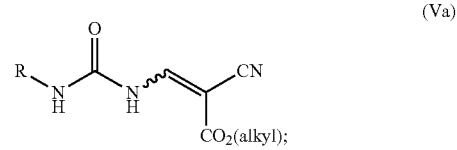

(ib) hydrolysis of the alkyl ureidoacrylate product of step (ia) to obtain compound of the formula (V):

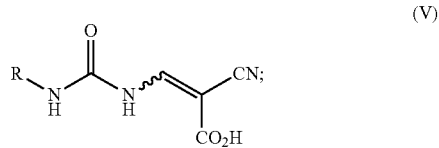

(iia) adding a base to the reaction mixture of step (ib) under conditions sufficient to obtain the compound of formula (IV),

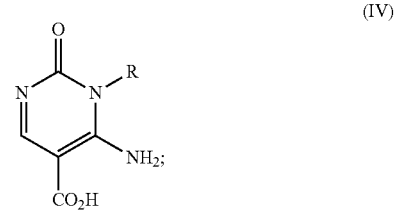

(iib) heating the product obtained in step (iia) neat or in the presence of a second suitable solvent under conditions sufficient to obtain the compound of the formula (II),

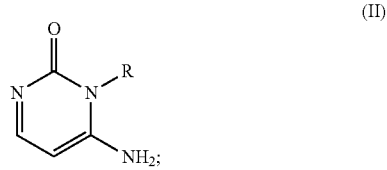

and
(iii) reacting the compound of formula (II) with a halogenating agent under conditions sufficient to obtain the compound of formula (III),

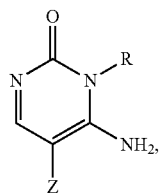
(III)

(iv) the compound of formula (III) is reacted with a compound having the following structure:

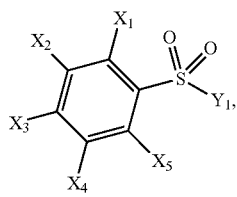

wherein $Y_1$ is halogen, imidazole, or

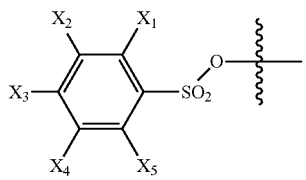

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments of the above process, wherein at least one of steps (ia) and (ib) is carried out in the presence of at least one suitable solvent. In some embodiments of the above process, wherein at least one of steps (ia), (ib), (iia) and (iib) is carried out in the presence of at least one suitable solvent.

6) Preparation Via Hydrolysis of Ester Derivative (IXa)

The present invention provides a process for preparing a compound having the formula (I):

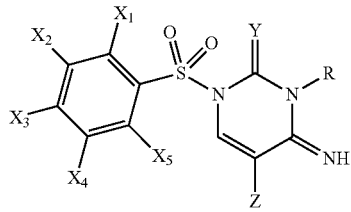
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

and Z is a halogen, (ia) reacting trialkyl orthoformate with the cyanoacetate derivative of the formula R'(CO)CH$_2$CN, wherein R' is O—R", wherein R" is alkyl, to form compound (IXa)

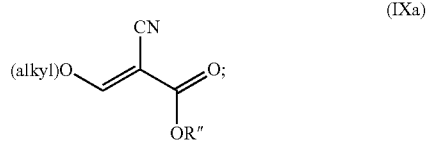
(IXa)

(ib) reacting compound of formula (IXa) obtained in step (ia) with an alkyl-urea of the formula RNH(C=Y)NH$_2$ under conditions sufficient to obtain compound of the formula (Va),

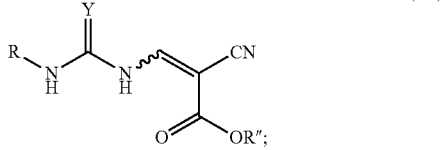
(Va)

(ic) hydrolysis of the alkyl ureidoacrylate product of step (ib) to obtain compound of the formula (V):

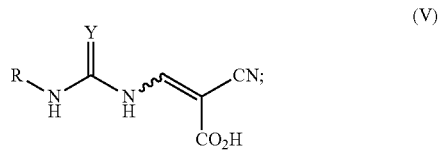
(V)

(iia) adding a base to the reaction mixture of step (ic) under conditions sufficient to obtain the compound of formula (IV),

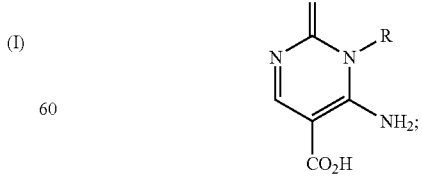
(IV)

(iib) heating the product obtained in step (iia) neat or in the presence of a second suitable solvent under conditions sufficient to obtain the compound of the formula (II),

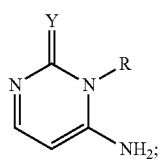

(II)

(iii) reacting the compound of formula (II) with a halogenating agent under conditions sufficient to obtain the compound of formula (III),

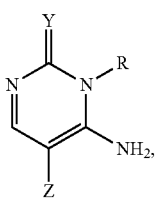

(III)

(iv) reacting the compound of formula (III) is reacted with a compound having the following structure:

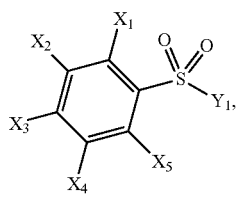

wherein $Y_1$ is halogen, imidazole, or

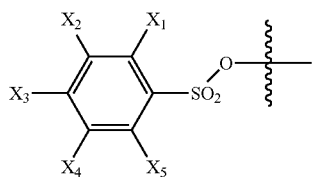

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments of the above process, wherein at least one of steps (ia), (ib), (ic), (iia) and (iib) is carried out in the presence of at least one suitable solvent. In some embodiments of the above process, wherein at least one of steps (ia), (ib), (ic), (iia), (iib) and (iii) is carried out in the presence of at least one suitable solvent.

In some embodiments, conditions for formation of (IXa) are alkylcyanoacetate/trialkylorthoformate in a ratio of 1:1.5 or 1:1.6. In some embodiments, conditions for formation of (IXa) are alkylcyanoacetate/trialkylorthoformate in a ratio of 1:1.5 or 1:1.6 without solvent, at 90-95° C.

Then formation of (Va) by addition of alkylurea at ratio of 1.3 at heat to 75-82° C. Conditions for formation of (Va) are solvents: DMF, neat, MeCN, DMA, xylene, MeTHF at weight ratio of 1:3 to 1:6 VS. alkyl urea. In some embodiments, temperature for reaction is 65 to 100° C.

Ration between alkylorthoformate/cyanoacetic acid ester derivative/alkylurea 1:1:1 or 1.5:1:1.5 or 1.5:1:1 or 1:1.5:1 or 1.1:1:1 or 1.3:1:1.

Conditions for hydrolysis of (Va) to (V) are: solvents: DMA, DMF, DMSO, MeCN, 1:5 to 1:10 weight ratio. Bases LiCl 2-3 equiv. DABCO 0.5-1 equiv., temperature 80-90 degrees. Or dioxane and HCl 32% at 25 degrees.

In some embodiments, the conversion of the compound of the formula (IV) to the compound of the formula (II) requires heat. In some embodiments, the conversion of the compound of the formula (IV) to the compound of the formula (II) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction in step to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of phase transfer catalyst such as tetra butyl ammonium bromide. Solvent with boiling point less than 200° C. and suitable for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide. Acid may be but is not limited to ammonium chloride, 4-toluene sulfonic acid (TsOH), or methane sulfonic acid (MsOH).

In some embodiments, steps (ii) and (iii) can be a one-step reaction. In some embodiments, the step (iii) is one conducted in one step. In some embodiments, the step (iii) is at least two steps.

In some embodiments, the cyclization reaction of compound (V) resulted in (IVa) or (IV) or mixture of (IVa) and (IV). In some embodiments, the process further comprises hydrolysis of (IVa) to obtain (IV) prior to decarboxylation reaction of (IV) to obtain (II). In some embodiments, the process further comprises hydrolysis of (Va) to obtain (V) prior to cyclization reaction of (V) to obtain (IV). In some embodiments the resulting intermediate compound of the formula (II) or (III) is isolated prior to proceeding to the next step. In some embodiments the resulting intermediate compound of the formula (IV) or (V), is isolated prior to proceeding to the next step. In some embodiments the resulting intermediate compound of the formula (IV) or (V), is not isolated prior to proceeding to the next step.

The reaction of the alkyl urea and the trialkyl orthoformate in the presence of a cyanoacetate derivative of the formula $NCCH_2CO_2(alkyl)$ include at least three steps (a) condensation of the alkyl urea and the trialkyl orthoformate, (b) additional condensation with the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IV) from (V) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV).

In some embodiments, when the trialkyl orthoformate is used as an active reagent in the reaction, it can also function as a solvent.

This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) or (V) is spontaneous. In some embodiments the decarboxylation is under basic conditions.

7) Preparation Via Decarboxylation of (V) to (VI)

The present invention provides a process for preparing a compound having the formula (I):

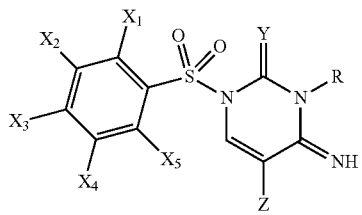

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
and Z is a halogen,
(ia) reacting an alkyl-urea of the formula RNH(C=Y)NH$_2$ with a trialkyl orthoformate in the presence of a cyanoacyl derivative having the formula R'C(O)CH$_2$CN, wherein R' is O—R", wherein R" is alkyl, under conditions sufficient to obtain the compound of formula (Va),

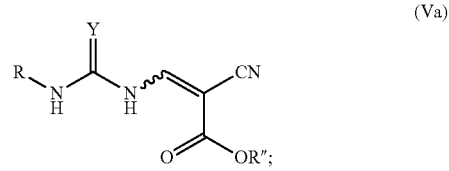

(ib) hydrolysis of the alkyl ureidoacrylate product of step (ia) to obtain compound of the formula (V):

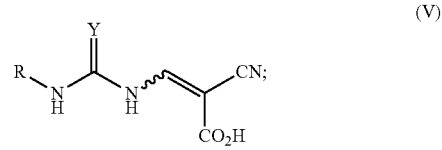

(ic) heating the product obtained step (ib) under conditions sufficient to obtain the compound of formula (VI),

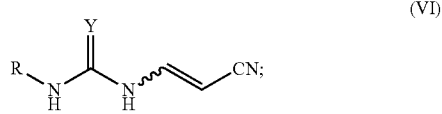

(ii) adding a base to the reaction mixture of step (ic) under conditions sufficient to obtain the compound of formula (II),

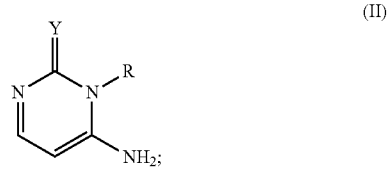

(iii) reacting the compound of formula (II) with a halogenating agent under conditions sufficient to obtain the compound of formula (III),

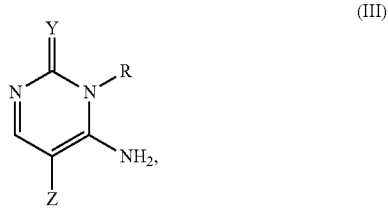

(iv) reacting the compound of formula (III) with a compound having the following structure:

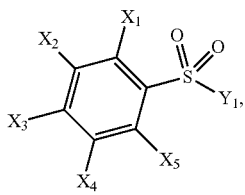

wherein $Y_1$ is halogen, imidazole, or

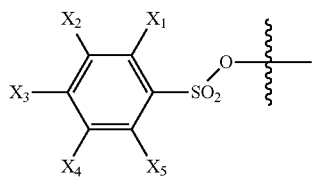

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, wherein at least one of steps (ia), (ib), (ic) and (ii) is carried out in the presence of at least one suitable solvent. In some embodiments, wherein at least one of steps (ia), (ib), (ic), (ii) and (iii) is carried out in the presence of at least one suitable solvent.

8) Preparation Via (IXa) and Decarboxylation of (V) to (VI)

The present invention provides a process for preparing a compound having the formula (I):

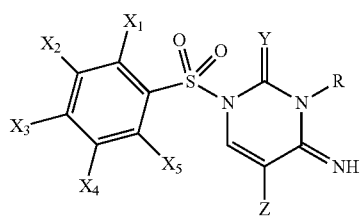

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
and Z is a halogen, (ia) reacting trialkyl orthoformate with cyanoacetate derivative of the formula R'(CO)CH$_2$CN, wherein R' is O—R'', wherein R'' is alkyl, to form compound (IXa)

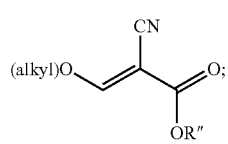

(ib) reacting compound (IXa) with an alkyl-urea of the formula RNH(C=Y)NH$_2$ under conditions sufficient to obtain compound of the formula (Va),

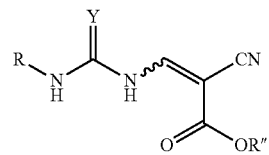

(ic) hydrolysis of the alkyl ureidoacrylate product of step (ib) to obtain compound of the formula (V):

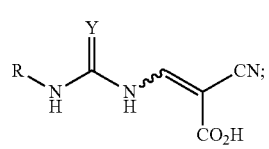

(id) heating the product obtained step (ic) under conditions sufficient to obtain the compound of formula (VI),

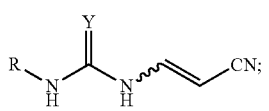

(ii) adding a base to the reaction mixture of step (id) under conditions sufficient to obtain the compound of formula (II),

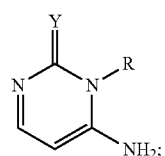

(iii) reacting the compound of formula (II) with a halogenating agent under conditions sufficient to obtain the compound of formula (III),

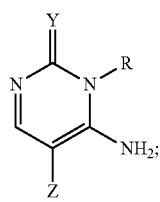
(III)

(iv) the compound of formula (III) is reacted with a compound having the following structure:

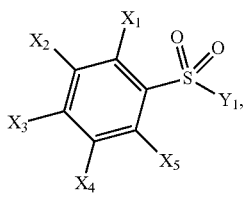

wherein $Y_1$ is halogen, imidazole, or

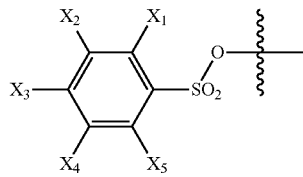

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments of the above process, wherein at least one of steps (ia), (ib), (ic), (id) and (ii) is carried out in the presence of at least one suitable solvent. In some embodiments of the above process, wherein at least one of steps (ia), (ib), (ic), (id), (ii) and (iii) is carried out in the presence of at least one suitable solvent.

In some embodiments, the conversion of the compound of the formula (V) to the compound of the formula (VI) requires heat. In some embodiments, the conversion of the compound of the formula (V) to the compound of the formula (VI) requires refluxing.

In some embodiments, when the suitable solvent for the reaction may be, but is not limited to, dimethylformamide, diglyme, dimethylacetate, N-methylpyrrolidone, dimethylacetamide or any combination thereof.

Base may be, but is not limited to, organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments, steps (ii) and (iii) can be a one-step reaction.

In some embodiments, the process comprises hydrolysis of (Va) to obtain (V) prior to decarboxylation reaction of (V) to obtain (VI).

In some embodiments, the suitable solvent is a polar solvent or a polar aprotic solvent or a polar protic solvent. Solvents include but are not limited to THF, methanol, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (v) is carried out in an absence of solvent.

In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (I).

In some embodiments, when the trialkyl orthoformate is used as an active reagent in the reaction, it can also function as a solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) or (V) is spontaneous. In some embodiments the decarboxylation is under basic condition. In some embodiments, the process further comprises hydrolysis of (Va) to obtain (V) prior to decarboxylation step of (V) to obtain (VI).

In some embodiments, the compound (V) is obtained according to the present invention processes is a mixture with compound (VI). In some embodiments, compound (V) and/or (VI) are mixture of cis and trans isomers.

In some embodiments, the hydrolysis of alkyl ester (Va) to form (V) is conducted under neutral, acidic or basic condition.

In some embodiments, the ester reacted with halogen metal salts, e.g. LiCl in DMF or LiCL in DMF/water, in the presence of polar (protic, aprotic) solvent such as dimethyl sulfoxide (DMSO), dimethylformamide (DMF), dimethylacetamide or acetonitrile.

In some embodiments, the solvent is mixed with water.

The basic conditions include but not limited to sodium hydroxide, DMF, NaOH. Other basic conditions include DABCO/DMF, DABCO/DMA, DABCO/MeCN.

(C) Synthesis of Compound (I) Via Thioalkylcyanoacetate

The present invention provides a process for preparing a compound having the formula (I):

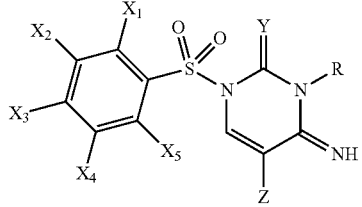
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S;

and Z is a halogen, comprising reacting an alkyl-urea or thiourea of the formula $RNH(C=Y)NH_2$ with a trialkyl orthoformate in the presence of a cyanoacyl derivative having the formula R'C(O)CH₂CN, wherein R' is S—R", wherein R" is alkyl, under conditions sufficient to obtain the compound of formula (III),

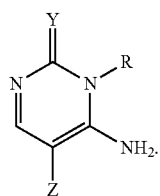
(III)

In some embodiments of the above process further comprising the step wherein the compound of formula (III) is reacted with a compound having the following structure:

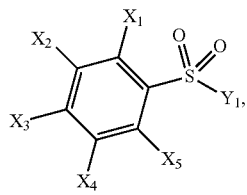

wherein $Y_1$ is halogen, imidazole, or

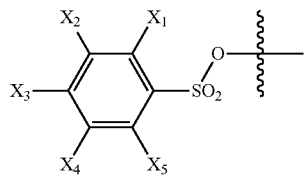

under conditions sufficient to obtain the compound of formula (I) having the structure

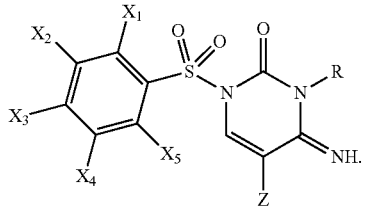
(I)

The present invention provides a process for preparing a compound having the formula (I):

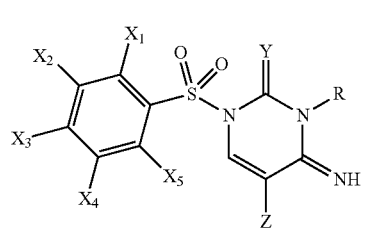
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S;

and Z is a halogen, comprising reacting an alkyl-urea or thiourea of the formula $RNH(C=Y)NH_2$ with a trialkyl orthoformate in the presence of a cyanoacyl derivative having the formula R'C(O)CH₂CN, wherein R' is S—R", wherein R" is alkyl, under conditions sufficient to obtain the compound of formula (III),

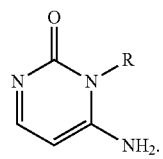
(II)

In some embodiments of the above process comprising reacting the compound of formula (II) with a halogenating agent under conditions sufficient to obtain the compound of formula (III) having the structure

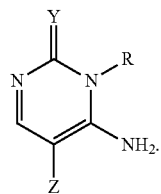

In some embodiments of the above process comprising reacting the compound of formula (II) with a fluorinating agent under conditions sufficient to obtain the compound of formula (III) having the structure

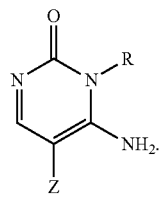

In some embodiments of the above process further comprising the step wherein the compound of formula (III) is reacted with a compound having the following structure:

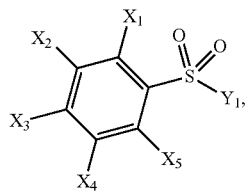

wherein $Y_1$ is halogen, imidazole, or

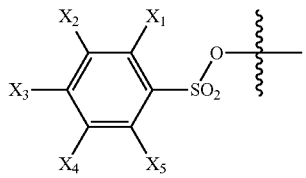

under conditions sufficient to obtain the compound of formula (I) having the structure

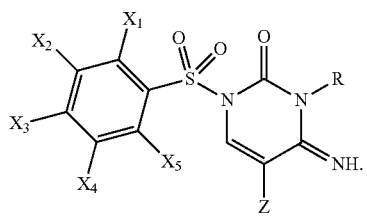

In some embodiments, the above process includes a cyclization and decarboxylation. In some embodiments, the cyclization is conducted prior to the decarboxylation. In some embodiments, the decarboxylation is conducted prior to the cyclization. In some embodiments, compound (II) is obtained by cyclization of compound (V) to form compound (IV) followed by decarboxylation to obtain (II). In some embodiments, compound (II) is obtained by decarboxylation of compound (V) to form compound (VI) followed by cyclization to obtain (II)

9) Preparation Via Thio Ester Compound (Vb)

The present invention provides a process for preparing a compound having the formula (I):

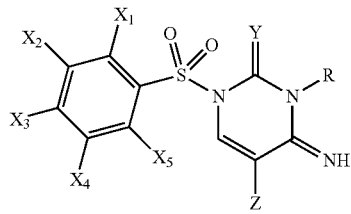

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising the steps:

(ia) reacting an alkyl-urea of the formula RNH(C=Y)NH$_2$ with a trialkyl orthoformate in the presence of a cyanoacyl derivative having the formula R'C(O)CH$_2$CN, wherein R' is S—R", wherein R" is alkyl, under conditions sufficient to obtain the compound of formula (XII),

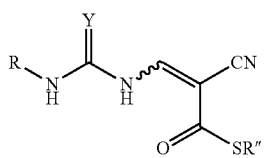

(iia) adding a base to the reaction mixture of step (ia) under conditions sufficient to obtain the compound of formula (IVb),

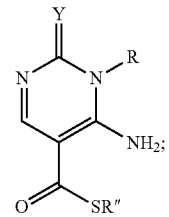

(iib) acidic hydrolysis of the thioester product of step (iia) to obtain compound of the formula (IV):

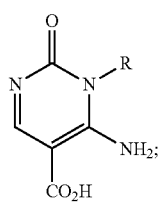

(IV)

(iic) heating the product obtained in step (iib) under conditions sufficient to obtain the compound of the formula (II),

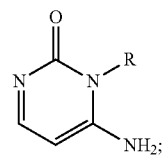

(II)

(iii) reacting the compound of formula (II) with a halogenating agent under conditions sufficient to obtain the compound of formula (III),

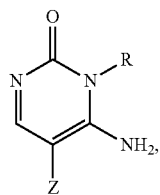

(III)

(iv) reacting the compound of formula (III) with a compound having the following structure:

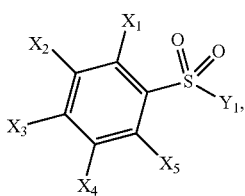

wherein $Y_1$ is halogen, imidazole, or

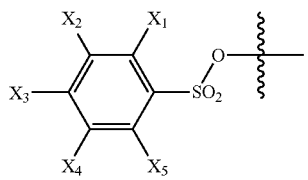

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (iia), (iib), and (iic) is carried out in the presence of at least one suitable solvent. In some embodiments, at least one of steps (ia), (iia), (iib), (iic) and (iii) is carried out in the presence of at least one suitable solvent.

In some embodiments of the above process, the hydrolysis occurs prior to the cyclization.

In some embodiments, the conversion of the compound of the formula (Vb) to the compound of the formula (IVb) requires heat. In some embodiments, the conversion of the compound of the formula (Vb) to the compound of the formula (IVb) requires refluxing. In some embodiments, the conversion of the compound of the formula (IVb) to the compound of the formula (IV) requires heat. In some embodiments, the conversion of the compound of the formula (IVb) to the compound of the formula (V) requires refluxing. In some embodiments, the conversion of the compound of the formula (IV) to the compound of the formula (II) requires heat. In some embodiments, the conversion of the compound of the formula (IV) to the compound of the formula (II) requires refluxing. In some embodiments, the heat or refluxing occurs for at least 30 mins.

In some embodiments, the decarboxylation reaction in step (iic) to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments, the cyclization reaction of compound (Vb) resulted in (IVb) or (IV) or a mixture of (IVb) and (IV). In some embodiments, the process further comprises hydrolysis of (Vb) to obtain (V) prior to cyclization reaction of (V) to obtain (IV). In some embodiments, the process further comprises hydrolysis of (IVa) to obtain (IV) prior to decarboxylation reaction of (IV) to obtain (II). In some embodiments the resulting intermediate compound of the formula (II) or (III) is isolated prior to proceeding to the next step. In some embodiments the resulting intermediate compound of the formula (IV), (IVb) or (Vb) is isolated prior to proceeding to the next step. In some embodiments the resulting intermediate compound of the formula (IV), (IVb) or (Vb) is not isolated prior to proceeding to the next step.

The reaction of the alkyl urea and the trialkyl orthoformate in the presence of cyanoacetic acid or a cyanoacetate derivative of the formula $NCCH_2CO_2$ (alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent.

In some embodiments, the cyclization reaction to form the compound of the formula (IVb) from (Vb) is carried out in a suitable solvent. In some embodiments, the decarboxylation of compound (IV) to form (II) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (Vb) is carried out in a presence of solvent. In some embodiments, the reaction for obtaining compound (Vb) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (Vb) and a different solvent is added to the cyclization step forming the compound of the formula (IVb). In some embodiments, when the trialkyl orthoformate is used as an active reagent in the reaction, it can also function as a solvent.

In some embodiments, the alcohol produced in the reaction is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IVb) or (Vb) is spontaneous. In some embodiments the decarboxylation is under basic condition.

In some embodiments, hydrolysis of the thioester in step (iib) is conducted in the presence of a silver triflate salt. In some embodiments, hydrolysis of the thioester in step (iib) is conducted in THF/water at 70° C.

10) Preparation Via Thio Ester Compound (IXb)

The present invention provides a process for preparing a compound having the formula (I):

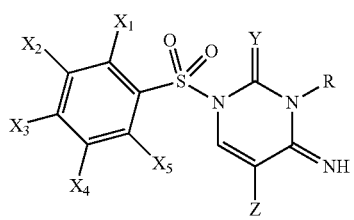

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising
ia) reacting trialkyl orthoformate with a cyanoacyl derivative having the formula R'C(O)CH$_2$CN, wherein R' is S—R", wherein R" is alkyl to form compound (IXb)

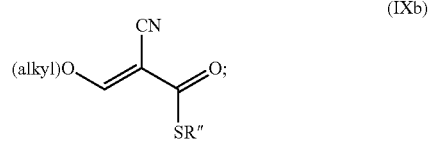

(ib) reacting compound (IXb) with an alkyl-urea of the formula RNH(C=Y)NH$_2$ to obtain the compound of formula (Vb),

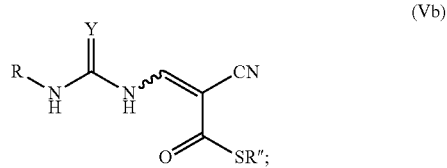

(iia) adding a base to the reaction mixture of step (ib) under conditions sufficient to obtain the compound of formula (IVb),

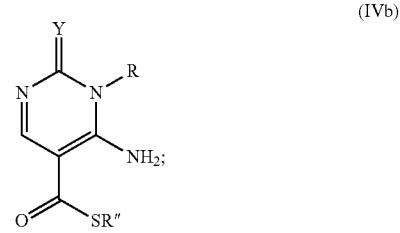

(iib) acidic hydrolysis of the thioester product of step (iia) to obtain compound of the formula (IV):

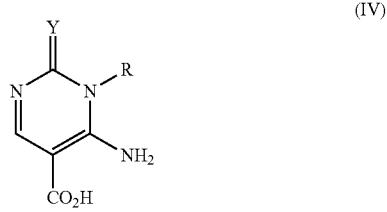

(iic) heating the product obtained in step (iib) under conditions sufficient to obtain the compound of the formula (II),

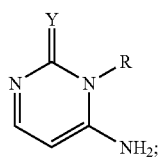

(II)

(iii) halogenation of compound (II) under conditions sufficient to obtain the compound of formula (III)

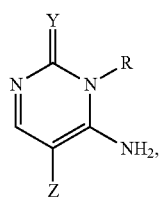

(III)

(iv) reacting the compound of formula (III) with a compound having the following structure:

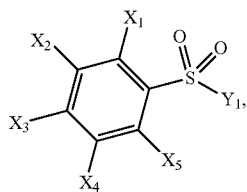

wherein $Y_1$ is halogen, imidazole, or

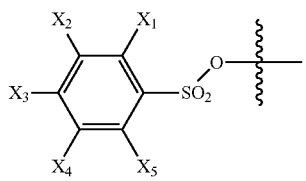

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (iia), (iib) and (iic) is carried out in the presence of at least one suitable solvent. In some embodiments, at least one of steps (ia), (ib), (iia), (iib), (iic) and (iii) is carried out in the presence of at least one suitable solvent.

In some embodiments, step (iib) hydrolysis is conducted before step (iia) cyclization. In some embodiments of the above process, the hydrolysis occurs prior to the cyclization.

In some embodiments, the conversion of the compound of the formula (Vb) to the compound of the formula (IVb) requires heat. In some embodiments, the conversion of the compound of the formula (Vb) to the compound of the formula (IVb) requires refluxing. In some embodiments, the conversion of the compound of the formula (IVb) to the compound of the formula (IV) requires heat. In some embodiments, the conversion of the compound of the formula (IVb) to the compound of the formula (IV) requires refluxing. In some embodiments, the heat or refluxing occurs for at least 30 mins.

In some embodiments, the decarboxylation reaction in step (iic) to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases.

In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments, the cyclization reaction of compound (Vb) resulted in (IVa) or (IV) or a mixture of (IVa) and (IV).

In some embodiments, the process comprises hydrolysis of (IVb) to obtain (IV) prior to decarboxylation reaction of (IV) to obtain (II). In some embodiments, the process further comprises hydrolysis of (IVa) to obtain (IV) prior to decarboxylation reaction of (IV) to obtain (II). In some embodiments the resulting intermediate compound of the formula (II) or (III) is isolated prior to proceeding to the next step.

In some embodiments the resulting intermediate compound of the formula (IV), (IVb) or (Vb) is isolated prior to proceeding to the next step. In some embodiments the resulting intermediate compound of the formula (IV), (IVb) or (Vb) is not isolated prior to proceeding to the next step.

The reaction of the alkyl urea and the trialkyl orthoformate in the presence of cyanoacetic acid or a cyanoacetate derivative of the formula $NCCH_2C(O)$ (S-alkyl) includes at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IVb) from (Vb) is carried out in a suitable solvent. In some embodiments, the decarboxylation of compound (IV) to form (II) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (Vb) is carried out in a presence of solvent. In some embodiments, the reaction for obtaining compound (Vb) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (Vb) and a different solvent is added to the cyclization step forming the compound of the formula (IVb). In some embodiments, when the trialkyl orthoformate is used as an active reagent in the reaction, it can also function as a solvent. Trialkylorthoformate is a reagent that sometimes is used also as solvent (neat reaction). Methanol or ethanol are produced during the reaction and sometimes the alcohol is removed. In some embodiments, the alcohol produced in the reaction is removed from the reaction before adding solvent.

In some embodiments the decarboxylation of the compound of the formula (IV) or (Vb) is spontaneous. In some embodiments the decarboxylation is under basic condition.

In some embodiments, hydrolysis of the thioester in step (iib) is conducted in the presence of a silver triflate salt. In some embodiments, hydrolysis of the thioester in step (iib) is conducted in THF/water at 70° C.

11) Preparation Via Thio Ester Compound (IXb) and Compound (VI)

The present invention provides a process for preparing a compound having the formula (I):

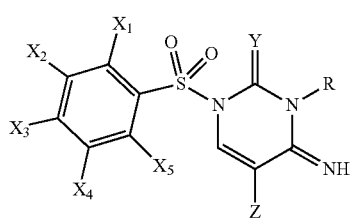
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, (ia) reacting trialkyl orthoformate with a cyanoacyl derivative having the formula R'C(O)CH$_2$CN, wherein R' is S—R", wherein R" is alkyl to form compound (IXb),

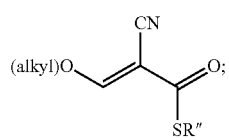
(IXb)

(ib) reacting compound (IXb) with an alkyl-urea of the formula RNH(C=Y)NH$_2$ under conditions sufficient to obtain (Vb),

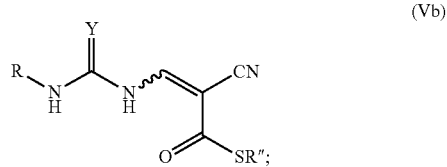
(Vb)

(ic) acidic hydrolysis of the thioester product of step (ib) to obtain compound of the formula (V):

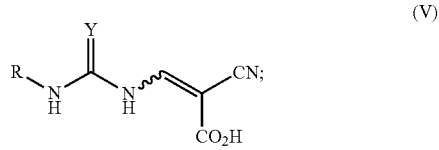
(V)

(id) heating the product obtained step (ic) under conditions sufficient to obtain the compound of formula (VI),

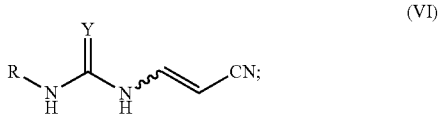
(VI)

(iia) adding a base to the reaction mixture of step (id) under conditions sufficient to obtain the compound of formula (II),

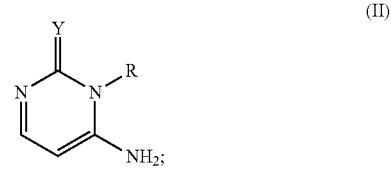
(II)

(iii) reacting the compound of formula (II) with a halogenating agent under conditions sufficient to obtain the compound of formula (III),

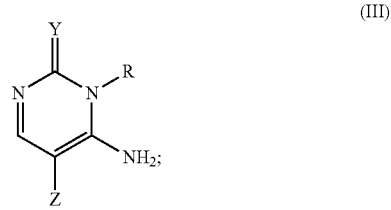
(III)

and (iv) the compound of formula (III) is reacted with a compound having the following structure:

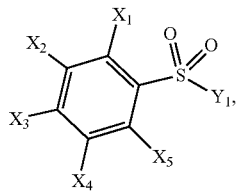

wherein $Y_1$ is halogen, imidazole, or

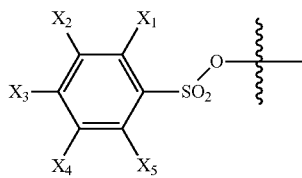

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (ic), (id) and (ii) is carried out in the presence of at least one suitable solvent. In some embodiments, at least one of steps (ia), (ib), (ic), (id), (ii) and (iii) is carried out in the presence of at least one suitable solvent.

In some embodiments, step (ii) can be conducted before step (id). In some embodiments of the above process, the hydrolysis occurs prior to the cyclization.

In some embodiments, the conversion of the compound of the formula (VI) to the compound of the formula (II) requires heat. In some embodiments, the conversion of the compound of the formula (VI) to the compound of the formula (II) requires refluxing. In some embodiments, the conversion of the compound of the formula (V) to the compound of the formula (VI) requires heat. In some embodiments, the conversion of the compound of the formula (V) to the compound of the formula (VI) requires refluxing. In some embodiments, the heat or refluxing occurs for at least 30 mins.

In some embodiments, the decarboxylation reaction in step (id) to form the compound of the formula (VI) from compound (V) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base. In some embodiments, when the suitable solvent for the reaction may be but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo [5.4.0]undec-7-ene (DBU), a metal carbonate or a metal alkoxide.

In some embodiments the suitable solvent is methanol.

In some embodiments the resulting intermediate compound of the formula (II) or (III) is isolated prior to proceeding to the next step. In some embodiments the resulting intermediate compound of the formula (VI), (V) or (Vb) is isolated prior to proceeding to the next step. In some embodiments the resulting intermediate compound of the formula (VI), (V) or (Vb) is not isolated prior to proceeding to the next step.

The reaction of the alkyl urea and the trialkyl orthoformate in the presence of cyanoacetic acid or a cyanoacetate derivative of the formula $NCCH_2C(O)$ (S-alkyl) includes at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (II) from (VI) is carried out in a suitable solvent. In some embodiments, the decarboxylation of compound (V) to form (VI) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (Vb) is carried out in a presence of solvent. In some embodiments, the reaction for obtaining compound (Vb) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (Vb) and a different solvent is added to the cyclization step forming the compound of the formula (II).

In some embodiments, when the trialkyl orthoformate is used as an active reagent in the reaction, it can also function as a solvent.

In some embodiments, the alcohol produced in the reaction is removed from the reaction before adding solvent.

In some embodiments the decarboxylation of the compound of the formula (V) or (Vb) is spontaneous. In some embodiments the decarboxylation is under basic condition.

In some embodiments, hydrolysis of the thioester in step (ic) is conducted in the presence of a silver triflate salt. In some embodiments, hydrolysis of the thioester in step (ic) is conducted in THF/water at 70° C.

12) Preparation Via Thio Ester Compound (Vb) and Compound (VI)

The present invention provides a process for preparing a compound having the formula (I):

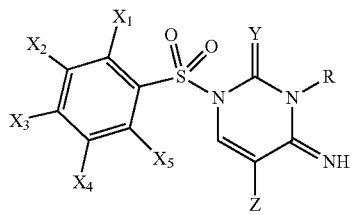
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

and Z is a halogen, comprising the following steps:

(ia) reacting an alkyl-urea of the formula RNH(C═Y)NH$_2$ with a trialkyl orthoformate in the presence of an a cyanoacyl derivative having the formula R'C(O)CH$_2$CN, wherein R' is S—R", wherein R" is alkyl to form compound (Vb),

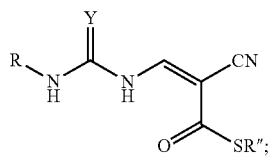
(Vb)

(ib) acidic hydrolysis of the thioester product (Vb) of step (ia) to obtain compound of the formula (V),

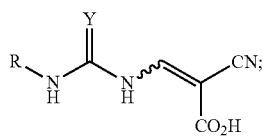
(V)

(ic) heating the product obtained step (ib) under conditions sufficient to obtain the compound of formula (VI),

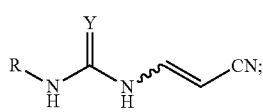
(VI)

(ii) adding a base to the reaction mixture of step (ic) under conditions sufficient to obtain the compound of formula (II),

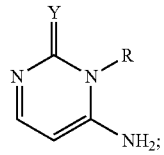
(II)

(iii) reacting the compound of formula (II) with a halogenating agent under conditions sufficient to obtain the compound of formula (III),

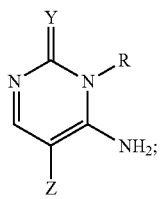
(III)

and (iv) the compound of formula (III) is reacted with a compound having the following structure:

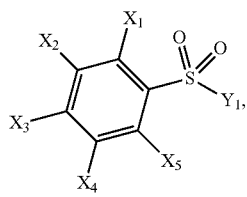

wherein $Y_1$ is halogen, imidazole, or

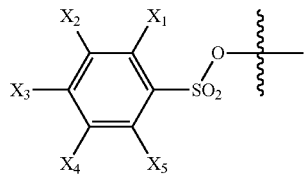

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (ic) and (ii) is carried out in the presence of at least one suitable solvent. In some embodiments, at least one of steps (ia), (ib), (iv), (ii) (iii) is carried out in the presence of at least one suitable solvent. In some embodiments, at least one of the above steps is conducted in a suitable solvent. In some embodiments, any of the above steps is conducted in a suitable solvent. In some embodiments, any of the above steps is conducted neat in the absence of a solvent.

In some embodiments, step (ic) can be conducted before step (ib). In some embodiments of the above process, the hydrolysis occurs prior to the cyclization.

In some embodiments, the conversion of the compound of the formula (VI) to the compound of the formula (II) requires heat. In some embodiments, the conversion of the compound of the formula (VI) to the compound of the formula (II) requires refluxing. In some embodiments, the conversion of the compound of the formula (V) to the compound of the formula (VI) requires heat. In some embodiments, the conversion of the compound of the formula (V) to the compound of the formula (VI) requires refluxing. In some embodiments, the heat or refluxing occurs for at least 30 mins.

In some embodiments, the decarboxylation reaction in step (ic) to form the compound of the formula (VI) from compound (V) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments the suitable solvent is methanol.

In some embodiments, the process further comprises hydrolysis of (Vb) to obtain (V) prior to decarboxylation reaction of (V) to obtain (VI). In some embodiments the resulting intermediate compound of the formula (II) or (III) is isolated prior to proceeding to the next step. In some embodiments the resulting intermediate compound of the formula (V) or (VI) is isolated prior to proceeding to the next step. In some embodiments the resulting intermediate compound of the formula (V) or (VI) is not isolated prior to proceeding to the next step.

The reaction of the alkyl urea and the trialkyl orthoformate in the presence of cyanoacetic acid or a cyanoacetate derivative of NCCH$_2$C(O)(S-alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (II) from (VI) is carried out in a suitable solvent. In some embodiments, the decarboxylation of compound (V) to form (VI) is carried out in a suitable solvent. In some embodiments, the suitable solvent is a polar solvent or a polar aprotic solvent or a polar protic solvent. Solvents include but are not limited to THF, Methanol, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent.

In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (Vb) and a different solvent is added to the cyclization step forming the compound of the formula (II). In some embodiments, when the trialkyl orthoformate is used as an active reagent in the reaction, it can also function as a solvent.

In some embodiments, the alcohol removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (V) is spontaneous. In some embodiments, the decarboxylation is under basic condition.

In some embodiments, hydrolysis of the thioester in step (ib) is conducted in the presence of a silver triflate salt. In some embodiments, hydrolysis of the thioester in step (ib) is conducted in THF/water at 70° C.

In some embodiments, the reaction for obtaining compound II is one-pot reaction.

(D) Synthesis of Compound (I) Via Acetal

13) Preparation Via Acetal

The present invention provides a process for preparing a compound having the formula (I):

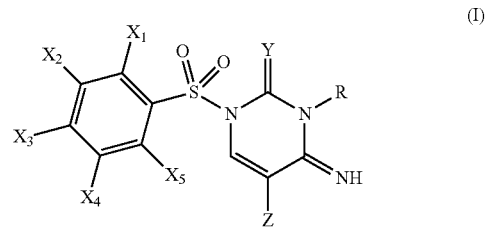

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising reacting an alkyl-urea or thiourea of the formula RNH(C=Y)NH$_2$, with an acetal or ketal derivative of a cyano acyl compound of the formula R'C(O)CH$_2$CN, under conditions sufficient to obtain the compound of formula (III), (III)

The present invention provides a process for preparing a compound having the formula (I):

(I)

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$, with a acetal or ketal derivative of a cyano acyl compound of the formula R'C(O)CH$_2$CN, under conditions sufficient to obtain the compound of formula (II)

(II)

The present invention provides a process for preparing a compound having the formula (I):

(I)

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$ with an cyanoacetaldehyde dialkyl acetal under conditions sufficient to obtain the compound of formula (II), (II)

In some embodiments, the process further comprising the step wherein the compound (II) is halogenated to obtain compound (III).

The present invention provides a process for preparing a compound having the formula (I):

(I)

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;
Y is O or S;
and Z is a halogen,
comprising reacting an alkyl-urea or thiourea of the formula RNH(C=Y)NH$_2$ with an cyanoacetaldehyde dialkyl acetal under conditions sufficient to obtain the compound of formula (III), (III)

In some embodiments, the above process further comprising the step wherein the compound of formula (III) is reacted with a compound having the following structure:

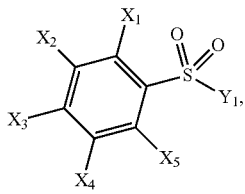

wherein $Y_1$ is halogen, imidazole, or

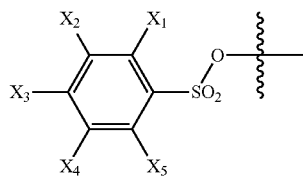

under conditions sufficient to obtain the compound of formula (I).

Conditions suitable for the formation of compound (II) using alkylurea and cyanoacetaldehyde dialkyl acetal are: ratio between starting materials is 1:1, using base NaOBu 1 eq. at butanol at reflux or tBuOK 1.1 eq. in tBuOH at RT and then heat to 110 degrees for cyclization. DBU 1 eq. is also can be used for cyclization.

14) Preparation Via Cyanoacetaldehyde Dialkyl Acetal

The present invention provides a process for preparing a compound having the formula (I):

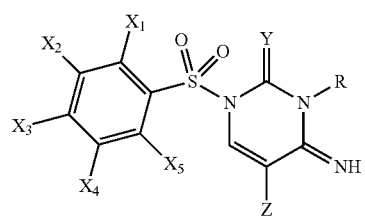

(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S;

and Z is a halogen, comprising (i) reacting an alkyl-urea of the formula $RNH(C=Y)NH_2$ with a cyanoacetaldehyde dialkyl acetal and adding a base to the reaction mixture under conditions sufficient to obtain the compound of formula (II),

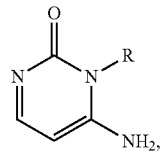

(II)

(ii) reacting the compound of formula (II) with a halogenating agent under conditions sufficient to obtain the compound of formula (III),

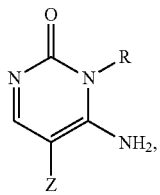

(III)

(iii) reacting the compound of formula (III) with a compound having the following structure:

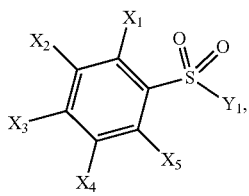

wherein $Y_1$ is halogen, imidazole, or

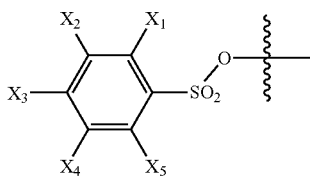

under conditions sufficient to obtain the compound of formula (I).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (i) and (ii) is carried out in the presence of at least one suitable solvent. wherein at least one of steps (i), (ii) and (iii) is carried out in the presence of at least one suitable solvent.

In some embodiments, the conversion of the compound of the formula (IV) to the compound of the formula (II) requires heat. In some embodiments, the conversion of the compound of the formula (IV) to the compound of the formula (II) requires refluxing. In some embodiments, the heat or refluxing occurs for at least 30 mins.

In some embodiments the suitable solvent is methanol.

In some embodiments the resulting intermediate compound of the formula (II) or (III) is isolated prior to proceeding to the next step.

The reaction of the alkyl urea and the trialkyl orthoformate in the presence of cyanoacetic acid or a cyanoacetate derivative of the formula NCCH$_2$CO$_2$(alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent.

In some embodiments, the cyclization reaction to form the compound of the formula (IV) or decarboxylation of compound (IV) to form (II) is carried out in a suitable solvent.

In some embodiments, the suitable solvent is a polar solvent or a polar aprotic solvent or a polar protic solvent. Solvents include but are not limited to THF, Methanol, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (IV) is carried out in a presence of solvent. In some embodiments, the reaction for obtaining compound (IV) is carried out in an absence of solvent.

In some embodiments, the solvent is added parallel to the alkylurea, trialkyl orthoformate and/or cyano acyl derivative.

In some embodiments, the acetal or ketal derivative of the cyano acyl compound has the structure (alkyl-O)$_2$CHCH$_2$CN.

Preparation of Intermediate Compounds (E) Preparation of Compound (V)

The present invention provides a process for preparing a compound having the formula (V):

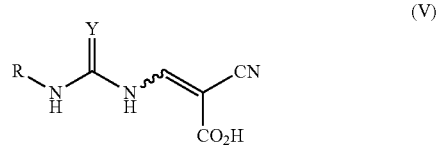

wherein R is alkyl or alkylaryl
comprising reacting an alkyl-urea or thiourea of the formula RNH(C=Y)NH$_2$, with a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (V).

The present invention provides a process for preparing a compound having the formula (V) comprising reacting an alkyl-urea or thiourea of the formula RNH(C=Y)NH$_2$, with an acetal or ketal derivative of a cyano acyl compound of the formula R'C(O)CH$_2$CN, under conditions sufficient to obtain the compound of formula (V).

1) Preparation Compound V Via Cyanoacetic Acid

The present invention provides a process for preparing a compound having the formula (V):

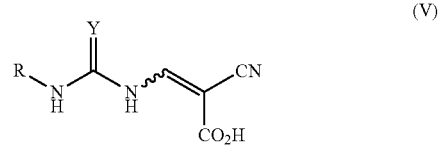

wherein R is alkyl or alkylaryl
comprising reacting an alkyl-urea or thiourea of the formula RNH(C=Y)NH$_2$, with a cyanoacyl derivative having the formula R'C(O)CH$_2$CN, wherein R' is OH, under conditions sufficient to obtain the compound of formula (V).

The present invention provides a process for preparing a compound having the formula

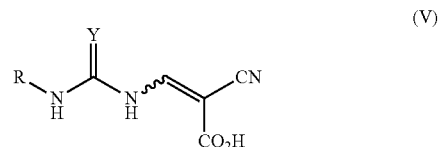

wherein R is alkyl or alkylaryl
comprising reacting an alkyl-urea of the formula RNH(C=Y)NH$_2$ with a trialkyl orthoformate in the presence of cyanoacetic acid to obtain compound (V).

2) Preparation of Compound V Via IX

The present invention provides a process for preparing a compound having the formula (V)

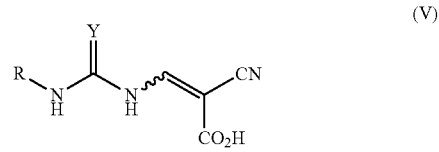

wherein R is alkyl or alkylaryl
comprising
(i) reacting trialkyl orthoformate with cyanoacetic acid to form compound (IX),

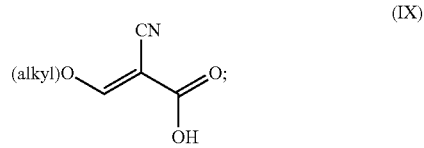

and
(ii) reacting compound (IX) with an alkyl-urea of the formula RNH(C=Y)NH$_2$ to obtain (V).

3) Preparation of Compound (V) Via (Va)

The present invention provides a process for preparing a compound having the formula (V):

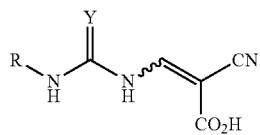

wherein R is alkyl or alkylaryl which comprises (ia) reacting an alkyl-urea of the formula $RNH(C=Y)NH_2$ with a trialkyl orthoformate in the presence of a cyanoacyl derivative having the formula $R'C(O)CH_2CN$, wherein R' is O—R", wherein R" is alkyl, under conditions sufficient to obtain compound of the formula (Va),

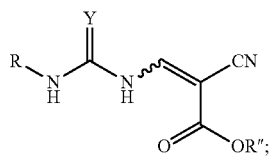

and (ib) hydrolysis of the alkyl ureidoacrylate product of step (ia) to obtain compound of the formula (V):

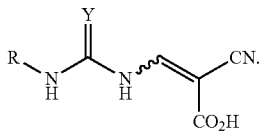

4) Preparation of Compound V Via IXa

The present invention provides a process for preparing a compound having the formula (V):

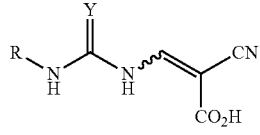

wherein R is alkyl or alkylaryl (ia) reacting trialkyl orthoformate with cyanoacetate derivative of the formula $R'C(O)CH_2CN$, wherein R' is O—R", wherein R" is alkyl, to form compound (IXa),

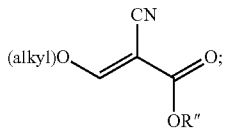

wherein R" is alkyl (ib) reacting compound (IXa) with an alkyl-urea of the formula $RNH(C=Y)NH_2$ under conditions sufficient to obtain compound of the formula (Va),

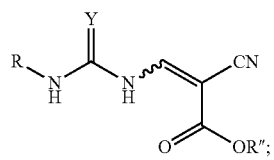

and (ic) acidic hydrolysis of the alkyl ureidoacrylate product of step (ib) to obtain compound of the formula (V).

5) Preparation of Compound V Via Va

The present invention provides a process for preparing a compound having the formula (V):

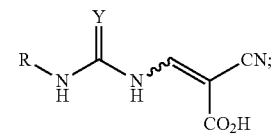

wherein R is alkyl or alkylaryl (ia) reacting an alkyl-urea of the formula $RNH(C=Y)NH_2$ with a trialkyl orthoformate in in the presence of a cyanoacetate derivative of the formula $R'C(O)CH_2CN$, wherein R' is O—R", wherein R" is alkyl, under conditions sufficient to obtain compound of the formula (Va),

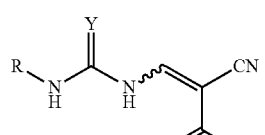

and (ib) acidic hydrolysis of the alkyl ureidoacrylate product of step (ia) to obtain compound of the formula (V).

6) Preparation of Compound V Via IX

The present invention provides a process for preparing a compound having the formula (V):

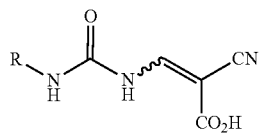
(V)

wherein
R is alkyl or alkylaryl;
(ia) reacting trialkyl orthoformate with cyanoacetate derivative of the formula R'C(O)CH$_2$CN, wherein R' is O—R", wherein R" is alkyl, to form compound (IXa)

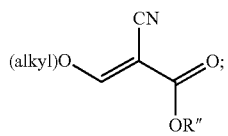
(IXa)

(ib) reacting compound (IXa) with an alkyl-urea of the formula RNH(C=Y)NH$_2$ under conditions sufficient to obtain compound of the formula (Va),

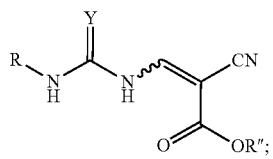
(Va)

(iv) hydrolysis of the alkyl ureidoacrylate product of step (ib) to obtain compound of the formula (V).

In some embodiments, the hydrolysis of alkyl ester (Va) to form (V) is conducted under neutral, acidic or basic condition.

In some embodiments, the ester reacted with halogen metal salts, e.g. LiCl in DMF or LiCL in DMF/water, in the presence of polar (protic, aprotic) solvent such as dimethyl sulfoxide (DMSO), dimethylformamide (DMF), dimethylacetamide or acetonitrile.

In some embodiments, the solvent is mixed with water.

The basic conditions include but not limited to sodium hydroxide, DMF, NaOH. Other basic conditions include DABCO/DMF, DABCO/DMA, DABCO/MeCN.

In some embodiments, the reaction for obtaining compound (V) is a one-pot reaction.

7) Preparation of (V) Via Thio Ester (Vb)

The present invention provides a process for preparing a compound having the formula (V):

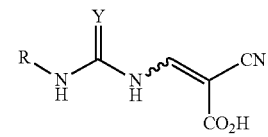
(V)

wherein R is alkyl or alkylaryl
comprising
(ia) reacting an alkyl-urea or thiourea of the formula RNH(C=Y)NH$_2$, with a cyano acyl compound of the formula R'C(O)CH$_2$CN, wherein R' is S—R", wherein R" is alkyl, under conditions sufficient to obtain the compound of formula (Vb),

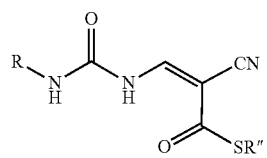
(Vb)

(ib) hydrolysis of the product of step (ia) to obtain compound of the formula (V).

8) Preparation of (V) Via Thio Ester (IXb)

The present invention provides a process for preparing a compound having the formula (V):

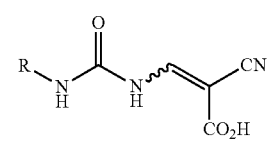
(V)

wherein
R is alkyl or alkylaryl;
comprising the following steps:
(ia) reacting trialkyl orthoformate with a cyanoacyl derivative having the formula R'C(O)CH$_2$CN, wherein R' is S—R", wherein R" is alkyl, or with a cyanoacetaldehyde dialkyl acetal, to form compound (IX),

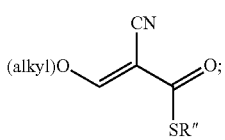
(IXb)

(ib) reacting compound (IXb) with an alkyl-urea of the formula RNH(C═Y)NH₂ to obtain (Vb),

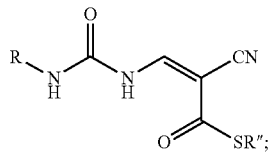

and (ic) hydrolysis of the product of step (ib) to obtain compound of the formula (V).

9) Preparation of (V) Via Acetal

The present invention provides a process for preparing a compound having the formula (V),

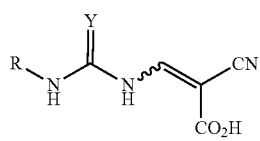

wherein R is alkyl or alkylaryl
comprising reacting an alkyl-urea or thiourea of the formula RNH(C═Y)NH₂, with an acetal or ketal derivative of a cyano acyl compound of the formula R'C(O)CH₂CN, wherein R is H, under conditions sufficient to obtain the compound of formula (V).

In some embodiments, acetal derivative of the cyano acyl compound of the formula R'C(O)CH₂CN is cyanoacetaldehyde dialkyl acetal.

The present invention provides a process for preparing a compound having the formula (V),

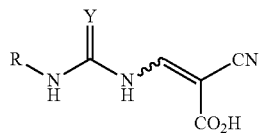

wherein R is alkyl or alkylaryl
comprising reacting an alkyl-urea or thiourea of the formula RNH(C═Y)NH₂ with cyanoacetaldehyde dialkyl acetal under conditions sufficient to obtain the compound of formula (V).

(F) Preparation of Compound (II)

The present invention provides a process for preparing a compound having the formula (II):

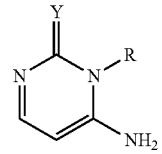

wherein R is alkyl or alkylaryl; and
Y is O or S,
comprising reacting an alkyl-urea or thiourea of the formula RNH(C═Y)NH₂, with a cyanoacyl derivative having the formula R'C(O)CH₂CN, wherein R' is OH, O—R" or S—R", wherein R" is alkyl, or with a cyanoacetaldehyde dialkyl acetal, under conditions sufficient to obtain the compound of formula (II).

In some embodiments of any of the disclosed processes, the reaction for obtaining compound (II) is one-pot reaction.

1) Preparation Compound II Via Cyanoacetic Acid

The present invention provides a process for preparing a compound having the formula (II):

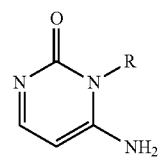

wherein
R is alkyl or alkylaryl,
comprising reacting an alkyl-urea or thiourea of the formula RNH(C═Y)NH₂, with cyano acyl compound of the formula R'C(O)CH₂CN wherein R' is OH, under conditions sufficient to obtain the compound of formula (II).

2) Preparation of Compound (II) Via Cyanoacetic Acid and Compound IV

The present invention provides a process for preparing a compound having the formula (II):

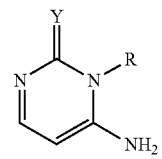

wherein
R is alkyl or alkylaryl; and
Y is O or S,
comprising the steps:
(i) reacting an alkyl-urea of the formula RNH(C═Y)NH₂ with a trialkyl orthoformate in the presence of a cyano acyl compound of the formula R'C(O)CH₂CN wherein R' is OH to obtain compound (V);

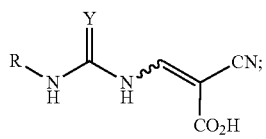

(iia) adding a base to the reaction mixture of step (i) under conditions sufficient to obtain the compound of formula (IV),

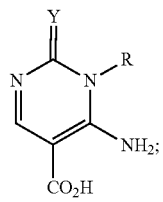

and
(iib) heating the product obtained in step (iia) under conditions sufficient to obtain the compound of the formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (i), (iia) and (iib) is carried out in the presence of at least one suitable solvent.

In some embodiments, compound (Va) is also produced in step (i) and compound (IVa) is also produced in step (iia).

In some embodiments, the decarboxylation reaction to form the compound of the formula (II) from (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

3) Preparation Compound II Via IX

The present invention provides a process for preparing a compound having the formula (II):

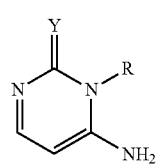

wherein
R is alkyl or alkylaryl; and
Y is O or S, comprising
(ia) reacting trialkyl orthoformate with cyanoacetic acid to form compound (IX),

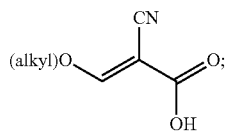

(ib) reacting compound (IX) with an alkyl-urea of the formula $RNH(C=O)NH_2$ to obtain (V),

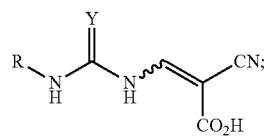

and
(iia) adding a base to the reaction mixture of step (ib) under conditions sufficient to obtain the compound of formula (IV),

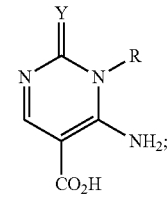

(iib) heating the product obtained in step (iia) neat or in the presence of a second suitable solvent under conditions sufficient to obtain the compound of the formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (iia) and (iib) is carried out in the presence of at least one suitable solvent.

In some embodiments, at least one of steps (ia) and (ib) carried out in the presence of at least one suitable solvent.

In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide. Acid may be but is not limited to ammonium chloride, 4-toluene sulfonic acid (TsOH), or methane sulfonic acid (MsOH).

In some embodiments, the suitable solvent is methanol.

In some embodiments the resulting intermediate compound of the formula (IV) or (V) is isolated prior to proceeding to the next step. In some embodiments the resulting intermediate compound of the formula (IV) or (V) is not isolated prior to proceeding to the next step.

The reaction of the alkyl urea and the trialkyl orthoformate in the presence of cyanoacetic acid or a cyanoacetate derivative of the formula $NCCH_2CO_2(alkyl)$ includes at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IV) from (V) or decarboxylation of compound (V) to form (VI) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV). In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) is spontaneous. In some embodiments the decarboxylation is under basic condition.

In some embodiments, wherein in the process compound IV 3-4 products are converted to the 1-2 product prior to cyclization. This is not clear.

4) Preparation Compound II Via IX and VI

The present invention provides a process for preparing a compound having the formula (II):

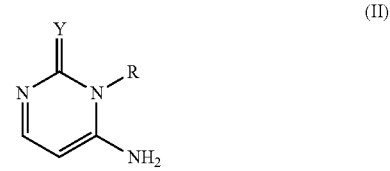

wherein
R is alkyl or alkylaryl; and
Y is O or S,
comprising the following steps:
(ia) reacting trialkyl orthoformate with cyanoacetic acid to form compound (IX),

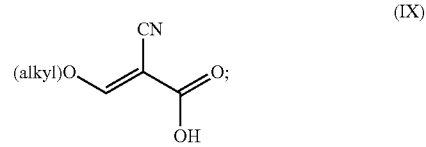

(ib) reacting compound (IX) with an alkyl-urea of the formula $RNH(C=Y)NH_2$ to obtain (V)

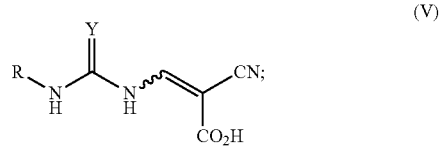

(ic) heating the product obtained step (ib) under conditions sufficient to obtain the compound of formula (VI),

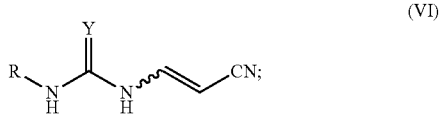

(ii) adding a base to the reaction mixture of step (ic) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib) and (ic) is carried out in the presence of at least one suitable solvent. In some embodiments, at least one of steps (ia), (ib), (ic) and (ii) is carried out in the presence of at least one suitable solvent.

5) Preparation Compound II Via VI

The present invention provides a process for preparing a compound having the formula (II):

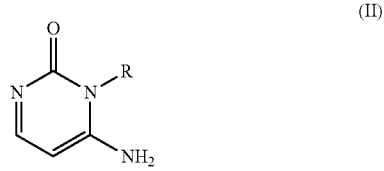

wherein
R is alkyl or alkylaryl; and
Y is O or S,
comprising the following steps:
(ia) reacting an alkyl-urea of the formula $RNH(C=Y)NH_2$ with a trialkyl orthoformate in the presence of cyanoacetic acid to obtain compound (V),

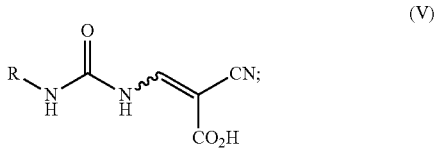

and
(ib) heating the product obtained step (ia) under conditions sufficient to obtain the compound of formula (VI),

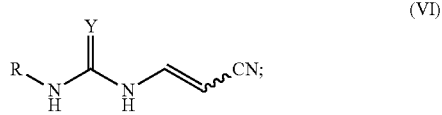

(ic) adding a base to the reaction mixture of step (ib) under conditions sufficient to obtain the compound of formula (II).

In some embodiments, the conversion of the compound of the formula (V) to the compound of the formula (VI) requires heat. In some embodiments, the conversion of the compound of the formula (V) to the compound of the formula (VI) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction to form the compound of the formula (II) from compound (IV) is carried out in a suitable solvent. In some embodiments, the decarboxylation reaction to form the compound of the formula (VI) from compound (V) is carried out in a suitable solvent. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.
In some embodiments the resulting intermediate compound of the formula (V) or (VI) or is isolated prior to proceeding to the next step. In some embodiments the resulting intermediate compound of the formula (V) or (VI) is not isolated prior to proceeding to the next step.

The reaction of the alkyl urea and the trialkyl orthoformate in the presence of cyanoacetic acid or a cyanoacetate derivative of the formula $R'C(O)CH_2CN$ include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent.

In some embodiments, the cyclization reaction to form the compound of the formula (II) from (VI) or decarboxylation of compound (V) to form (VI) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (VI). In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (V) is spontaneous. In some embodiments the decarboxylation is under basic condition.

6) Preparation of II Via Va

The present invention provides a process for preparing a compound having the formula (II):

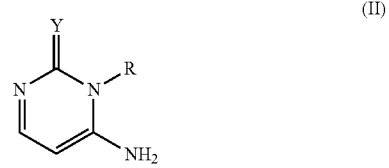

wherein
R is alkyl or alkylaryl; and
Y is O or S, comprising (ia) reacting an alkyl-urea of the formula RNH(C=Y)NH$_2$ with a trialkyl orthoformate in the presence of a cyanoacyl derivative having the formula R'C(O)CH$_2$CN, wherein R' is O—R", wherein R" is alkyl, under conditions sufficient to obtain compound of the formula (Va),

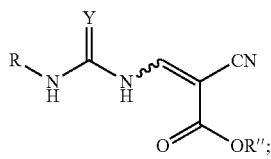

(Va)

(ib) hydrolysis of the alkyl ureidoacrylate product of step (ia) to obtain compound of the formula (V):

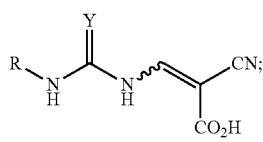

(V)

and (iia) adding a base to the reaction mixture of step (ib) under conditions sufficient to obtain the compound of formula (IV),

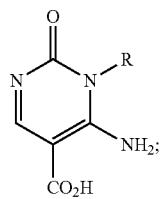

(IV)

(iib) heating the product obtained in step (iia) neat or in the presence of a second suitable solvent under conditions sufficient to obtain the compound of the formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia) and (ib) is carried out in the presence of at least one suitable solvent. In some embodiments, at least one of steps (ia), (ib), (iia) and (iib) is carried out in the presence of at least one suitable solvent.

7) Preparation of II Via IX and Va

The present invention provides a process for preparing a compound having the formula (II):

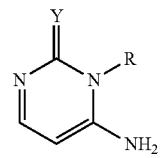

(II)

wherein
R is alkyl or alkylaryl; and
Y is O or S, (ia) reacting trialkyl orthoformate with cyanoacetate derivative of the formula R'C(O)CH$_2$CN, wherein R' is O—R", wherein R" is alkyl, to form compound (IXa),

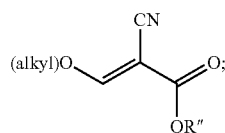

(IXa)

(ib) reacting compound (IXa) with an alkyl-urea of the formula RNH(C=Y)NH$_2$ under conditions sufficient to obtain compound of the formula (Va),

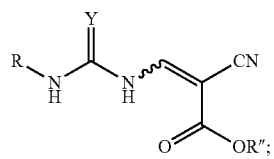

(Va)

(ic) hydrolysis of the alkyl ureidoacrylate product of step (ib) to obtain compound of the formula (V):

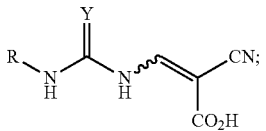

(V)

and
(iia) adding a base to the reaction mixture of step (ic) under conditions sufficient to obtain the compound of formula (IV),

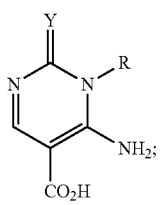

(IV)

(iib) heating the product obtained in step (iia) under conditions sufficient to obtain the compound of the formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib) and (ic) is carried out in the presence of at least one suitable solvent. In some embodiments, at least one of steps (ia), (ib), (ic), (iia) and (iib) is carried out in the presence of at least one suitable solvent.

In some embodiments, the conversion of the compound of the formula (V) to the compound of the formula (VI) requires heat. In some embodiments, the conversion of the compound of the formula (V) to the compound of the formula (VI) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments, the cyclization reaction of compound (V) resulted in (IVa) or (IV) or mixture of (IVa) and (IV).

In some embodiments, the process further comprises hydrolysis of (Va) to obtain (V) prior to decarboxylation reaction of (V) to obtain (IV). In some embodiments, the process further comprises hydrolysis of (IVa) to obtain (IV) prior to decarboxylation reaction of (IV) to obtain (II). In some embodiments the resulting intermediate compound of the formula (II) or (III) is isolated prior to proceeding to the next step. In some embodiments the resulting intermediate compound of the formula (Va), (V) or (IV) is isolated prior to proceeding to the next step. In some embodiments the resulting intermediate compound of the formula (Va), (V) or (IV) is not isolated prior to proceeding to the next step.

The reaction of the alkyl urea and the trialkyl orthoformate in the presence of cyanoacetic acid or a cyanoacetate derivative of the formula NCCH$_2$CO$_2$(alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IV) from (V) or decarboxylation of compound (IV) to form (II) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV).

In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) is spontaneous. In some embodiments the decarboxylation is under basic condition.

8) Preparation of II Via Va and VI

The present invention provides a process for preparing a compound having the formula (II):

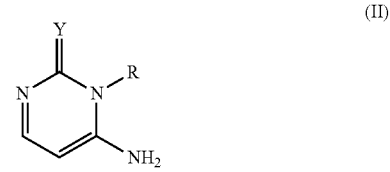

(II)

wherein
R is alkyl or alkylaryl; and
Y is O or S,
(ia) reacting an alkyl-urea of the formula RNH(C=Y)NH$_2$ with a trialkyl orthoformate in in the presence of a cyanoacetate derivative of the formula R'C(O)CH$_2$CN, wherein R' is O—R", wherein R" is alkyl, under conditions sufficient to obtain compound of the

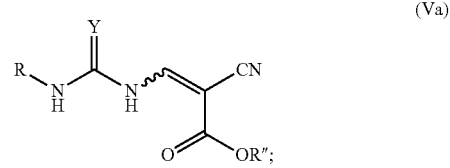

(Va)

(ib) hydrolysis of the alkyl ureidoacrylate product of step (ia) to obtain compound of the formula (V):

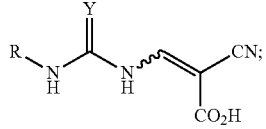
(V)

(ic) heating the product obtained step (ib) under conditions sufficient to obtain the compound of formula (VI),

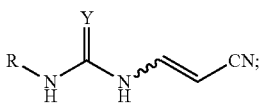
(VI)

(ii) adding a base to the reaction mixture of step (ic) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib) and (ic) is carried out in the presence of at least one suitable solvent. In some embodiments, at least one of steps (ia), (ib), (ic) and (ii) is carried out in the presence of at least one suitable solvent.

9) Preparation of II Via IX and Va

The present invention provides a process for preparing a compound having the formula (II):

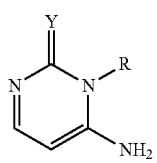
(II)

wherein
R is alkyl or alkylaryl; and
Y is O or S,
comprising
(ia) reacting trialkyl orthoformate with cyanoacetate derivative of the formula R'C(O)CH$_2$CN, wherein R' is O—R", wherein R" is alkyl, to form compound (IXa),

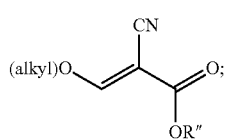
(IXa)

(ib) reacting compound (IXa) with an alkyl-urea of the formula RNH(C=Y)NH$_2$ under conditions sufficient to obtain compound of the formula (Va),

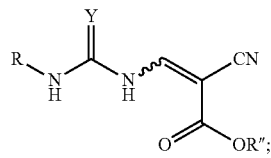
(Va)

(ic) hydrolysis of the alkyl ureidoacrylate product of step (ib) to obtain compound of the formula (V):

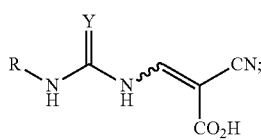
(V)

(id) heating the product obtained step (ic) under conditions sufficient to obtain the compound of formula (VI),

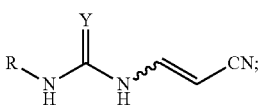
(VI)

and
(ii) adding a base to the reaction mixture of step (id) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (ic) and (id) is carried out in the presence of at least one suitable solvent. In some embodiments, at least one of steps (ia), (ib), (ic), (id) and (ii) is carried out in the presence of at least one suitable solvent.

In some embodiments, the conversion of the compound of the formula (V) to the compound of the formula (VI) requires heat. In some embodiments, the conversion of the compound of the formula (V) to the compound of the formula (VI) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction to form the compound of the formula (VI) from compound (V) is carried out in a suitable solvent. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments, the process further comprises hydrolysis of (Va) to obtain (V) prior to decarboxylation reaction of (V) to obtain (VI). In some embodiments the resulting intermediate compound of the formula (II) or (III) is isolated prior to proceeding to the next step. In some embodiments the resulting intermediate compound of the formula (Va), (V) or (VI) is isolated prior to proceeding to the next step. In some embodiments the resulting intermediate compound of the formula (IVa), (V) or (VI) is not isolated prior to proceeding to the next step.

The reaction of the alkyl urea and the trialkyl orthoformate in the presence of cyanoacetic acid or a cyanoacetate derivative of the formula $NCCH_2CO_2$ (alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (II) from (VI) or decarboxylation of compound (V) to form (VI) is carried out in a suitable solvent. In some embodiments, the suitable solvent is a polar solvent or a polar aprotic solvent or a polar protic solvent. Solvents include but are not limited to THF, methanol, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV). In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (V) is spontaneous. In some embodiments the decarboxylation is under basic condition.

In some embodiments, the hydrolysis of alkyl ester (Va) to form (V) is conducted under neutral, acidic or basic condition.

In some embodiments, the ester reacted with halogen metal salts, e.g. LiCl in DMF or LiCL in DMF/water, in the presence of polar (protic, aprotic) solvent such as dimethyl sulfoxide (DMSO), dimethylformamide (DMF), dimethylacetamide or acetonitrile.

In some embodiments, the solvent is mixed with water.

The basic conditions include but not limited to sodium hydroxide, DMF, NaOH. Other basic conditions include DABCO/DMF, DABCO/DMA, DABCO/MeCN.

In some embodiments, the reaction for obtaining compound (V) is a one-pot reaction.

10) Preparation (II) Via Thio Ester

The present invention provides a process for preparing a compound having the formula (II):

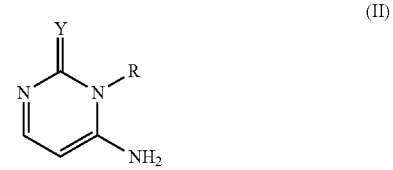

(II)

wherein

R is alkyl or alkylaryl; and

Y is O or S, comprising reacting an alkyl-urea or thiourea of the formula $RNH(C=Y)NH_2$, with cyanoacyl derivative having the formula $R'C(O)CH_2CN$, wherein R' is S—R", wherein R" is alkyl, under conditions sufficient to obtain the compound of formula (II).

11) Preparation (II) Via Thioester (Vb)

The present invention provides a process for preparing a compound having the formula (II):

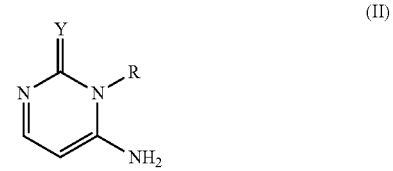

(II)

wherein

R is alkyl or alkylaryl, comprising the steps:

(ia) reacting an alkyl-urea of the formula $RNH(C=Y)NH_2$ with a trialkyl orthoformate in the presence of cyanoacyl derivative having the formula $R'C(O)CH_2CN$, wherein R' is S—R", wherein R" is alkyl to obtain compound (Vb),

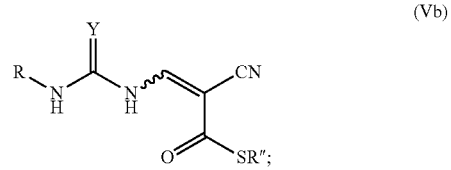

(Vb)

(ib) adding a base to the reaction mixture of step (ia) under conditions sufficient to obtain the compound of formula (IVb),

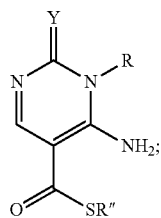

(IVb)

and (ii) heating the product obtained in step (ib) under conditions sufficient to obtain the compound of the formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia) and (ib) is carried out in the presence of at least one suitable solvent. In some embodiments, at least one of steps (ia), (ib) and (ii) is carried out in the presence of at least one suitable solvent.

12) Preparation II Via Thio Ester IXb

The present invention provides a process for preparing a compound having the formula (II):

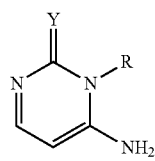

(II)

wherein
R is alkyl or alkylaryl; and
Y is O or S,
comprising
(ia) reacting trialkyl orthoformate with a cyanoacyl derivative having the formula R'C(O)CH$_2$CN, wherein R' is S—R", wherein R" is alkyl,

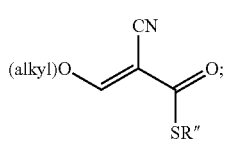

(IXb)

(ib) reacting compound (IXb) with an alkyl-urea of the formula RNH(C=Y)NH$_2$ to obtain (Vb)

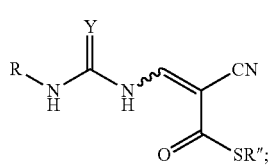

(Vb)

(ic) hydrolysis of the product of step (ib) to obtain compound of the formula (V):

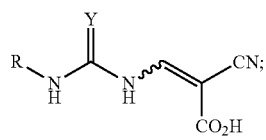

(V)

(id) heating the product obtained in step (ic) under conditions sufficient to obtain the compound of the formula (IV),

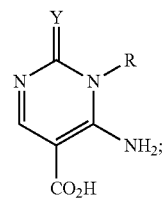

(IV)

and
(ii) heating the reaction mixture of step (id) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (ic) and (id) is carried out in the presence of at least one suitable solvent. In some embodiments, at least one of steps (ia), (ib), (ic), (id) and (ii) is carried out in the presence of at least one suitable solvent.

In some embodiments, hydrolysis of the thioester in step (ic) is conducted in the presence of a silver triflate salt. In some embodiments, hydrolysis of the thioester in step (ic) is conducted in THF/water at 70° C.

In some embodiments, the conversion of the compound of the formula (IV) to the compound of the formula (II) requires heat. In some embodiments, the conversion of the compound of the formula (IV) to the compound of the formula (II) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction in step to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide. Acid may be but is not limited to ammonium chloride, 4-toluene sulfonic acid (TsOH), or methane sulfonic acid (MsOH).

In some embodiments, the suitable solvent is methanol.

In some embodiments, the cyclization reaction of compound (V) resulted in (IVa) or (IV) or mixture of (IVa) and (IV).

In some embodiments, the process comprises hydrolysis of (Vb) to obtain (V) prior to decarboxylation reaction of (IV) to obtain (II). In some embodiments the resulting intermediate compound of the formula (Vb), (V) or (IV) is isolated prior to proceeding to the next step. In some embodiments the resulting intermediate compound of the formula (Vb), (V) or (IV) is not isolated prior to proceeding to the next step.

The reaction of the alkyl urea and the trialkyl orthoformate in the presence of cyanoacetic acid or a cyanoacetate derivative of the formula $NCCH_2CO_2$(alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (IV) from (V) or decarboxylation of compound (IV) to form (II) is carried out in a suitable solvent. In some embodiments, the suitable solvent is a polar solvent or a polar aprotic solvent or a polar protic solvent. Solvents include but are not limited to THF, METHANOL, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (V) is carried out in a presence of solvent. In some embodiments, the reaction for obtaining compound (V) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (V) and a different solvent is added to the cyclization step forming the compound of the formula (IV).

In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) is spontaneous. In some embodiments the decarboxylation is under basic condition.

13) Preparation II Via Thio Ester IXb

The present invention provides a process for preparing a compound having the formula (II):

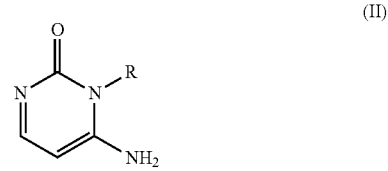

wherein
R is alkyl or alkylaryl; and
Y is O or S,
comprising the following steps:
(ia) reacting trialkyl orthoformate with a cyanoacyl derivative having the formula $R'C(O)CH_2CN$, wherein R' is S—R", wherein R" is alkyl to form compound (IXb),

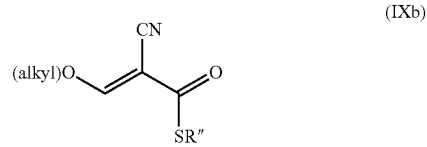

(ib) reacting compound (IXb) with an alkyl-urea of the formula $RNH(C=Y)NH_2$ to obtain (Vb),

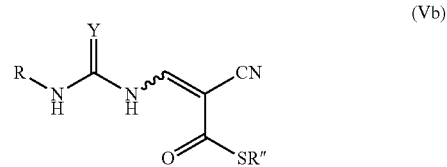

(ic) hydrolysis of the product of step (ib) to obtain compound of the formula (V),

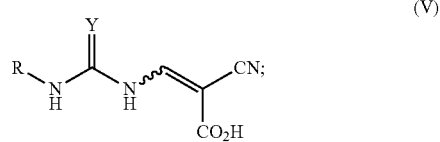

(id) heating the product obtained step (ic) under conditions sufficient to obtain the compound of formula (VI),

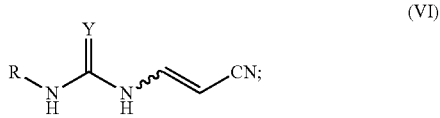

(ii) adding a base to the reaction mixture of step (id) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia), (ib), (ic) and (id) is carried out in the presence of at least one suitable solvent. In some embodiments, at least one of steps (ia), (ib), (ic), (id) and (ii) is carried out in the presence of at least one suitable solvent.

In some embodiments, hydrolysis of the thioester in step (ii) is conducted in the presence of a silver triflate salt. In some embodiments, hydrolysis of the thioester in step (ii) is conducted in THF/water at 70° C.

14) Preparation II Via Thio Ester Vb and VI

The present invention provides a process for preparing a compound having the formula (II):

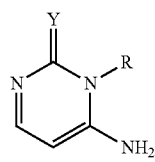

(II)

wherein
R is alkyl or alkylaryl; and
Y is O or S,
comprising the following steps:
(ia) reacting trialkyl orthoformate with an alkyl-urea of the formula RNH(C=Y)NH$_2$ in the presence of a cyanoacyl derivative having the formula R'C(O)CH$_2$CN, wherein R' is S—R'', wherein R'' is alkyl, to obtain compound (Vb),

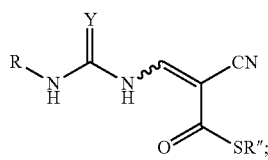

(Vb)

(ib) heating the product obtained step (ia) under conditions sufficient to obtain the compound of formula (VI),

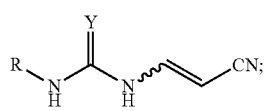

(VI)

(ii) adding a base to the reaction mixture of step (ib) under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (ia) and (ib) is carried out in the presence of at least one suitable solvent. In some embodiments, at least one of steps (ia), (ib) and (ii) is carried out in the presence of at least one suitable solvent.

In some embodiments, hydrolysis of compound (Vb) occurs prior to decarboxylation.

In some embodiments, the conversion of the compound of the formula (Vb) to the compound of the formula (VI) requires heat. In some embodiments, the conversion of the compound of the formula (Vb) to the compound of the formula (VI) requires refluxing. In some embodiments, the heat or refluxing occurs for at least 30 mins.

In some embodiments, the decarboxylation reaction to form the compound of the formula (VI) from compound (V) is carried out in a suitable solvent. In some embodiments, when the suitable solvent for the reaction may ne but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide.

In some embodiments, the suitable solvent is methanol.

In some embodiments the resulting intermediate (Vb) or (VI) is isolated prior to proceeding to the next step. In some embodiments the resulting intermediate compound of the formula (Vb) or (VI) is not isolated prior to proceeding to the next step.

The reaction of the alkyl urea and the trialkyl orthoformate in the presence of cyanoacetic acid or a cyanoacetate derivative of the formula NCCH$_2$CO$_2$ (alkyl) include at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments, the reaction of the alkylurea and the trialkyl orthoformate is carried out in a suitable solvent. In some embodiments, the cyclization reaction to form the compound of the formula (II) from (VI) or decarboxylation of compound (Vb) to form (VI) is carried out in a suitable solvent. In some embodiments, the suitable solvent is a polar solvent or a polar aprotic solvent or a polar protic solvent. Solvents include but are not limited to THF, methanol, dimethylformamide, diglyme, dimethylacetate, N-methylpyrrolidone, dimethylacetamide or any combination thereof.

In some embodiments the process is carried out in one-pot without isolation of each intermediate. In some embodiments, the process is carried out in multiple-pots with isolation of one or more intermediates.

In some embodiments, a suitable solvent is added with the base in the cyclization step. Solvents include but are not limited to dimethylformamide, dimethylacetamide or combination thereof.

In some embodiments, the reaction for obtaining compound (Vb) is carried out in a presence of solvent. In some embodiments, the reaction for obtaining compound (Vb) is carried out in an absence of solvent. In some embodiments, the solvent is added parallel to the alkylurea, trialkyl orthoformate and/or cyano acyl derivative. In some embodiments, a solvent is added parallel to the alkylurea, trialkyl orthoformate and/or cyano acyl derivative forming the compound of the formula (Vb) and a different solvent is added to the cyclization step forming the compound of the formula (II). In some embodiments, when the trialkyl orthoformate is used as an active reagent in the reaction, it can also function as a solvent.

In some embodiments, the alcohol is removed from the reaction before adding solvent. This compound trialkylorthoformate is a reagent that sometimes is used also as solvent (neat reaction). Methanol or ethanol are produced during the reaction and sometimes the alcohol is removed.

In some embodiments the decarboxylation of the compound of the formula (IV) or (V) is spontaneous. In some embodiments the decarboxylation is under basic condition.

15) Preparation of II Via Acetal

The present invention provides a process for preparing a compound having the formula (II):

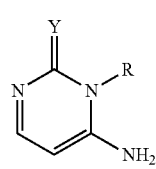

(II)

wherein

R is alkyl or alkylaryl; and

Y is O or S, comprising reacting an alkyl-urea or thiourea of the formula RNH(C=Y)NH$_2$, with a acetal or ketal derivative of a cyano acyl compound of the formula R'COCH$_2$CN, under conditions sufficient to obtain the compound of formula (II).

In some embodiments, the ketal acetal derivative of the cyano acyl compound of the formula R'COCH$_2$CN wherein R is H is cyanoacetaldehyde dialkyl acetal.

The present invention provides a process for preparing a compound having the formula (II):

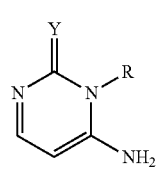

(II)

wherein

R is alkyl or alkylaryl; and

Y is O or S, comprising reacting an alkyl-urea or thiourea of the formula RNH(C=Y)NH$_2$ with cyanoacetaldehyde dialkyl acetal under conditions sufficient to obtain the compound of formula (II).

The present invention provides a process for preparing a compound having the formula (II):

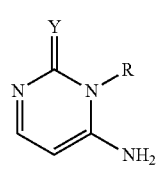

(II)

wherein

R is alkyl or alkylaryl, comprising (i) reacting an alkyl-urea of the formula R'NH(C=Y)NH$_2$ with cyanoacetaldehyde dialkyl acetal; and (ii) adding a base to the reaction mixture under conditions sufficient to obtain the compound of formula (II).

In some embodiments, at least one of the above steps is conducted in a suitable solvent. In some embodiments, any of the above steps is conducted in a suitable solvent. In some embodiments, any of the above steps is conducted neat in the absence of a solvent. In some embodiments, at least one of steps (i) and (ii) is carried out in the presence of at least one suitable solvent.

16) Preparation of II

The process of the present invention to prepare the compound of formula (II) includes a cyclization and decarboxylation reaction. In some embodiments, the cyclization reaction is conducted prior to the decarboxylation reaction. In some embodiments, the decarboxylation reaction is conducted prior to the cyclization reaction.

In some embodiments, the decarboxylation step is conducted in a second suitable solvent or neat.

The process of the present invention includes a cyclization and decarboxylation. In some embodiments, the cyclization is conducted prior to the decarboxylation. In some embodiments, the decarboxylation is conducted prior to the cyclization. In some embodiments, compound (II) is obtained by cyclization of compound (V) to form compound (IV) followed by decarboxylation to obtain (II). In some embodiments, compound (II) is obtained by decarboxylation of compound (V) to form compound (VI) followed by cyclization to obtain (II).

In some embodiments, the conversion of the compound of the formula (V) to the compound of the formula (VI) requires heat.

In some embodiments, the cyclization reaction of compound (Va) resulted in (IVa) or (IV) or mixture of (IVa) and (IV). In some embodiments, the cyclization reaction of compound (Vb) resulted in (IVb) or (IV) or mixture of (IVb) and (IV).

(G) Preparation of Compound III

The present invention provides a process for preparing a compound having the formula (III):

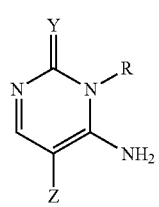

(III)

wherein

R is alkyl or alkylaryl;

Y is O or S; and

Z is a halogen, comprising reacting the compound of formula (VIII) having the structure:

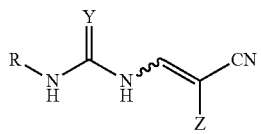 (VIII)

with a base under conditions sufficient to obtain the compound of formula (III).

In some embodiments, the base is NaOMe, Na$_2$CO$_3$ or DABCO.

In some embodiments, the solvent is DMA/water or DMF/water or MeOH.

The present invention provides a process for preparing a compound having the formula (III):

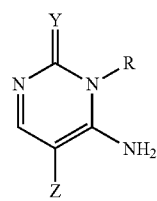 (III)

wherein
R is alkyl or alkylaryl;
Y is O or S;
Z is a halogen,
comprising reacting the compound of formula (II) having the structure:

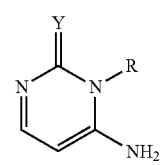 (II)

with a halogenating under conditions sufficient to obtain the compound of formula (III).

In some embodiments of the above process, the halogenation of compound (II) to form compound (III) is conducted in one step. In some embodiments, the one step process is direct fluorination.

In some embodiments, the halogenation of compound (II) to form compound (III) is at least two steps. In some embodiments, the two-step process in the halogenation of compound (II) is chlorination followed by fluorination. In some embodiments, the two-step process in the halogenation of compound (II) is halogenation of a halogen other than fluorine followed by halogen exchange to fluorination. In some embodiments, compound (II) is initially halogenated with chloride than fluorinated to obtain compound (III). In some embodiments compound (II) is initially halogenated with chloride then fluorinated to obtain compound (III). In some embodiments, the fluorinating agent is 1-chloromethyl-4-fluoro-1,4-diazoniabicyclo[2.2.2]octane bis(tetrafluoroborate) or fluorine gas. In some embodiments, wherein fluorinating step is carried out in the presence of formic acid, hydrofluoric acid, acetic acid or mixtures thereof.

In some embodiments of any of the disclosed processes, the reaction for obtaining compound (III) is one-pot reaction.

(H) Preparation of Compound (VI) from (VII)

The present invention provides a process for preparing a compound of formula VI, the process comprising the following steps of:
(ia) reacting compound of the formula (VII):

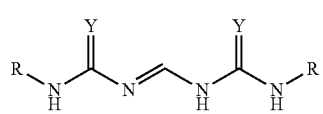 (VII)

with cyanoacetate under conditions sufficient to form the compound of the formula (VI):

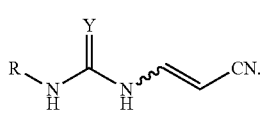 (VI)

(I) Preparation of (IV) from (VII)

The present invention provides a process for preparing a compound of formula IV, the process comprising the following steps of:
(ia) reacting compound of the formula (VII):

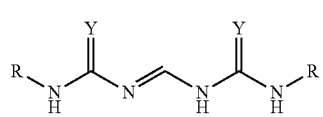 (VII)

with cyanoacetate under conditions sufficient to form the compound of the formula (V):

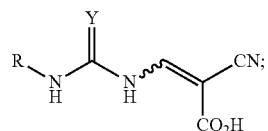 (V)

(iia) adding a base to the reaction mixture under conditions sufficient to obtain the compound of formula (IV):

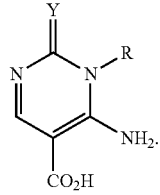

(IV)

(J) Preparation of (II) via (IV)

The present invention provides a process for preparing the compound of the formula (II),
the process comprising reacting the compound having the formula (IV)

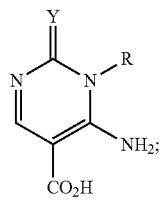

(IV)

in the presence of a base or an acid and at least one solvent to obtain the compound of formula (II)

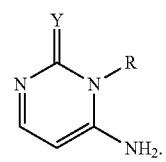

(II)

In some embodiments, the acid is selected from the group consisting of $NH_4Cl$, MsOH, TsOH and any combination thereof. In some embodiments, the acid is $NH_4Cl$. In some embodiments, the base is selected from the group consisting of DABCO, DBU, and any combination thereof.

In some embodiments, the solvent is selected from the group consisting of DMF, DMA, TBAB, NMP, DMSO, ethylene glycol, and any combination thereof, with or without the presence of phase transfer catalyst (PTC).

In some embodiments, the conversion of the compound of the formula (IV) to the compound of the formula (II) requires heat. In some embodiments, the conversion of the compound of the formula (IV) to the compound of the formula (II) requires refluxing. In some embodiments, the conversion of the compound of the formula (V) to the compound of the formula (IV) requires heat. In some embodiments, the conversion of the compound of the formula (V) to the compound of the formula (IV) requires refluxing. In some embodiments, the heat or refluxing occurs for at least 30 mins.

In some embodiments, the decarboxylation reaction in step to form the compound of the formula (II) from compound (IV) is carried out in a suitable solvent. In some embodiments, the suitable solvent is a solvent with boiling temperature higher than 200° C. Solvent with boiling point higher than 200° C. is sulfolane. In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may be but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate, a metal alkoxide, or any combination thereof.

(K) Compound (VIII)

The present invention provides a compound having formula (VIII) as defined hereinabove.

(L) Preparing Compound of the Formula (II)

The present invention provides a method for preparing compound of the formula (II), the method comprising decarboxylation reaction of compound (IV) in a suitable solvent.

In some embodiments, the suitable solvent is a solvent with boiling temperature higher than 200° C. For example, the solvent is sulfolane.

In some embodiments, when the suitable solvent has a boiling point less than 200° C., the reaction is carried out in presence of base or acid and optionally in the presence of a phase transfer catalyst such as tetra butyl ammonium bromide. Solvent with boiling point less than 200° C. and suitable for the reaction may be but is not limited to dimethylformamide, diglyme, dimethylacetate, N-methylpyrrolidone, dimethylacetamide or any combination thereof.

Base may be but is not limited to organic and non-organic bases. In some embodiments, the base is DABCO 1,4-diazabicyclo[2.2.2]octane (DABCO), 1,8-Diazabicyclo[5.4.0]undec-7-ene (DBU), a metal carbonate or a metal alkoxide. Acid may be but is not limited to ammonium chloride, 4-toluene sulfonic acid (TsOH), or methane sulfonic acid (MsOH).

Conditions suitable for decarboxylation of (IV) to (II) in the presence of base: 1) $NH_4Cl$, DMF at 145° C. 2) DBU, DMF at 130° C.; 3) DMF, DABCO, 110-140° C.; 4) DMA, DABCO 130° C.; 5) DMSO, DABCO 95° C.; 6) DMSO, DBU 130° C.; or 7) $H_2SO_4$ 130° C.

(M) Sulfonylation Reaction of Compound III to Prepare Compound I

The present invention provides a process for preparing a compound having the formula (I):

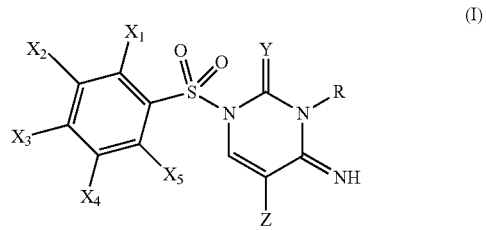

(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

Y is O or S;

and Z is a halogen, comprising reacting the compound of formula (III) having the structure:

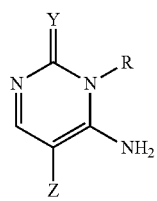

(III)

with a compound having the following structure in the presence of a base,

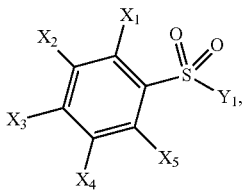

wherein $Y_1$ is halogen, imidazole, or

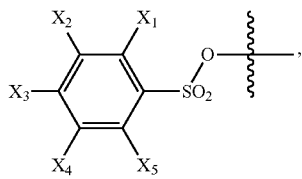

under conditions sufficient to obtain the compound of formula (I).

The present invention provides a process for preparing a compound having the structure:

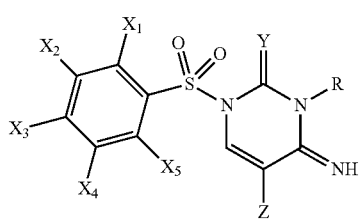

(I)

wherein

R is alkyl or alkylaryl; and each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —$NH_2$, —$NO_2$, —CN or $CF_3$;

comprising reacting the compound of formula (III) having the structure:

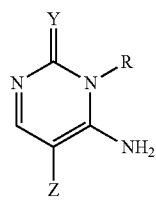

(III)

with a compound having the following structure in the presence of a base and solvent,

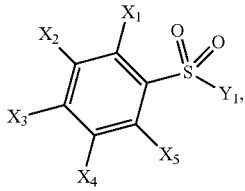

wherein $Y_1$ is halogen, imidazole, or

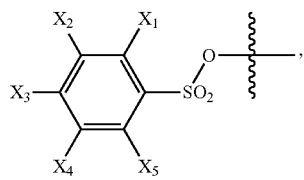

under conditions sufficient to obtain the compound of formula (I).

In some embodiments, the process for tosylation comprises adding a base to the reaction mixture.

In some embodiments, the conversion of the compound of formula (III) to the compound of formula (I) is a multiphasic reaction. In some embodiments, wherein multi-phasic reaction comprises at least two different phases. In some embodiments, wherein multi-phasic reaction comprises liquid and solid. In some embodiments, wherein multi-phasic reaction comprises at least two liquid phases.

In some embodiments the reaction is a one-phase reaction.

In some embodiments, the conversion of the compound of formula (III) to the compound of formula (I) includes a phase transfer catalyst.

In some embodiments, the base has a pKa of less than or equal to 10.5.

In some embodiments, the base is acting also as phase transfer catalyst. In some embodiments, the reaction further comprises phase transfer catalyst.

In some embodiments, the base is organic base. In some embodiments, the base is a tertiary amine base. In some embodiments, the base is an alkali carbonate. In some embodiments, the base is an alkali hydroxide. In some embodiments, the base is selected from the group consisting of triethylamine, potassium carbonate, sodium carbonate, potassium hydroxide, sodium hydroxide, and any combination thereof. In some embodiments, the base is triethylamine. In some embodiments the base is potassium carbonate. In some embodiments, the base is sodium carbonate. In some embodiments, the base is potassium hydroxide. In some embodiments, the base is sodium hydroxide.

In some embodiments, the conversion of the compound of formula (III) to the compound of formula (I) is conducted in an organic solvent. In some embodiments, the conversion of the compound of formula (III) to the compound of formula (I) is conducted in a solvent free of water. In some embodiments the conversion of the compound of formula (III) to the compound of formula (I) is conducted in a solvent which comprises an amount of water. In some embodiments, the conversion of the compound of formula (III) to the compound of formula (I) is conducted in a solvent containing less than 5% of water. In some embodiments, the conversion of the compound of formula (III) to the compound of formula (I) is conducted in a combination of solvent where in the combination of solvents contain less than 5% of water. In some embodiments, the conversion of the compound of formula (III) to the compound of formula (I) is conducted in a solvent containing less than 2.5% of water. In some embodiments, the conversion of the compound of formula (III) to the compound of formula (I) is conducted in a combination of solvent where in the combination of solvents contain less than 2.5% of water.

In some embodiments, wherein the reaction is conducted in solvent comprising an amount of water, the reaction is a bi-phases reaction and optionally comprises a phase transfer catalyst.

In some embodiments, the solvent is selected from the group consisting of methyltetrahydrofuran (MeTHF), methyl isobutyl ketone (MIBK), methyl cyanide (MeCN) or acetonitrile (ACN), cyclopentyl methyl ether (CPME), dimethylacetamide (DMA), dimethylbenzylamine (DMBA), 4-dimethylaminopyridine (DMAP), toluene, and any combination thereof.

In some embodiments, the conversion of the compound of formula (III) to the compound of formula (I) is conducted in a reaction mixture comprising (i) MeTHF, MIBK, MeCN or ACN, CPME, DMA, or any combination thereof, and (ii) triethylamine.

In some embodiments, the conversion of the compound of formula (III) to the compound of formula (I) is conducted in a reaction mixture comprising (i) DMA, DMBA, DMAP, or any combination thereof, and (ii) sodium carbonate and/or potassium carbonate.

In some embodiments, the conversion of the compound of formula (III) to the compound of formula (I) is conducted in a reaction mixture comprising (i) DMA, DMBA, DMAP, or any combination thereof, and (ii) sodium hydroxide and/or potassium hydroxide.

In some embodiments, the conversion of the compound of formula (III) to the compound of formula (I) is conducted in a reaction mixture comprising CPME, sodium hydroxide and water.

In some embodiments, the conversion of the compound of formula (III) to the compound of formula (I) is conducted in a reaction mixture comprising MeTHF and water.

In some embodiments, the conversion of the compound of formula (III) to the compound of formula (I) is conducted in a reaction mixture comprising CPME, water and KHCO$_3$.

In some embodiments, the conversion of the compound of formula (III) to the compound of formula (I) is conducted in a reaction mixture comprising CPME, water and sodium hydroxide.

In some embodiments, the conversion of the compound of formula (III) to the compound of formula (I) is conducted in a reaction mixture comprising (i) THAB, and (ii) CPME, toluene, MeTHF, or any combination thereof.

In some embodiments, the conversion of the compound of formula (III) to the compound of formula (I) is conducted in a reaction mixture comprising toluene and water.

In some embodiments, the reaction mixture further contains a phase transfer catalyst (PTC) such as tetra alkyl ammonium bromide. In some embodiments, the alkyl is C1-C6. In some embodiments, the PTC is tetra hexyl ammonium bromide.

In some embodiments, the reaction mixture further contains a base. In some embodiments the base is non-organic base such as KHCO$_3$ and/or NaOH.

Tosylation may be performed in MeCN using trimethylamine or MCB using trimethylamine or MIBK or N-butyronitrile or MeTHF/water or isopropanol/MeTHF and the desired product could be isolated. In some embodiments, the solvent is methyl-tetrahydofuran (Me-THF) and/or cyclopentyl methyl ether (CPME). In some embodiments, the solvent is a mixture of water and methyl-tetrahydofuran (Me-THF) or cyclopentyl methyl ether (CPME).

In some embodiments, the conversion of the compound of formula (III) to the compound of formula (I) is conducted under homogeneous conditions in methyl-THF or in CPME (cyclopentyl methyl ether) in order to crystalize the pure compound.

In some embodiments, the conversion of the compound of formula (III) to the compound of formula (I) is conducted under heterogeneous conditions in water-MeTHF or water-CPME and tetrabutylammonium bromide (TBAB) or tetrahexylammonium bromide (THAB) as phase transfer catalyst. NaOH (4M or 8M) is used as base.

In some embodiments, the compound has the following structure:

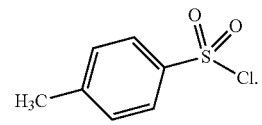

In some embodiments, the compound of formula (I) produced has the following structure:

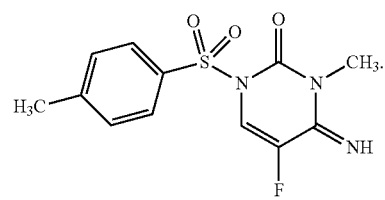 [SMILES: Cc1ccc(S(=O)(=O)n2cc(F)c(=N)n(C)c2=O)cc1]

In some embodiments the reaction is conducted in the presence of a solvent.

The present invention provides a process for preparing the compound having the structure:

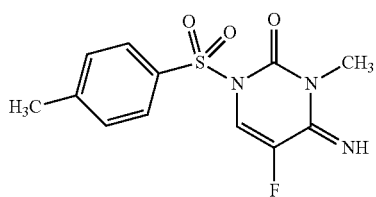

which comprises reacting compound (III) with sulfonating agent in the presence of a suitable solvent.

The present invention provides a process for preparing the compound having the structure:

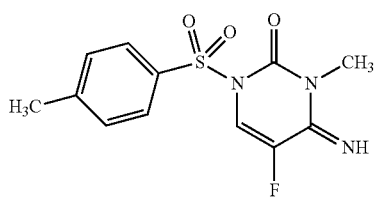

which comprises obtaining the compound of formula (II) by the process according to any embodiment of the present invention, or obtaining compound (III) according to any embodiment of the present invention.

In some embodiments, the process of producing the compound having the structure:

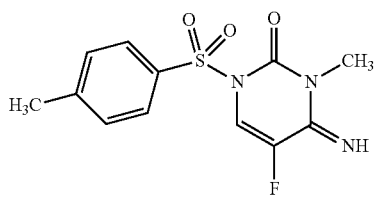

wherein any one of the compounds of formula (II) or (III) is an intermediate in the process.

In some embodiments, the process of producing the compound having the structure:

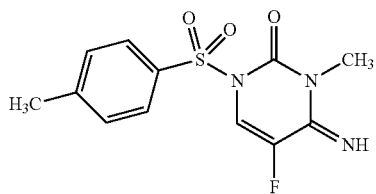

wherein any one of the compounds of formula (IV), (V), (VI), (VII) or (VIII) is an intermediate in the process.

In some embodiments, prior to conversion of the compound of formula (III) to the compound of formula (I) the N4 nitrogen is protected and deprotected following the reaction. In some embodiments, prior to conversion of the compound of formula (III) to the compound of formula (I) the N4 nitrogen (—NH2) is protected and deprotected following the reaction.

In some embodiments, a mixture comprising the compound of formula (I) is obtained by performing any one of the processes for tosylation described herein.

After the tosylation reaction ends, water may be added to the reaction mixture for washing. After water washings are completed, the product may be isolated.

The compound of the formula I is difficult to isolate after tosylation because solvates form. Addition of a suitable solvent prevents this problem. Suitable solvents are described herein. The tosylation step described herein is an improved process that allows for easier isolation and products of higher purity.

Processes for isolating the compound of formula (I) are described in more detail below.

(N) Isolation of Compound I

The present invention also provides a process for isolating the compound of formula (I) after conversion of the compound of formula (III) to the compound of formula (I).

The present invention provides a method for isolating (I) after conversion of the compound of formula (III) to the compound of formula (I), wherein the method comprises (i) adding co-solvent to the reaction solution (crystallization) or (ii) removing the reaction solvent prior to adding the co-solvent.

The present invention provides a method for isolating (I) after conversion of the compound of formula (III) to the compound of formula (I), wherein the method comprises separation of the residuals salts and the compound (I) from the reaction mixture.

In some embodiments, the reaction mixture comprises water which contains the residual salts.

In some embodiments, the separation of the residual salt is obtained by adding protic solvent. In some embodiments, by adding the protic solvent, both separation of the residual salts and precipitation of the compound of formula (I) is obtained.

In some embodiments, the separating the compound of formula (I) from the reaction mixture is obtained by extraction of the compound (I) and/or adding anti solvent.

Precipitating the compound of formula (I) can be obtained by reduction of the solubility of compound (1) in the solvent and/or adding anti solvent.

In some embodiments, the anti solvent is a protic solvent.

Protic solvent can be used for dissolving the salt and for precipitating the compound of formula (I).

In some embodiments, the reduction of solubility of the compound of formula (I) in the solvent is obtain by cooling the solvent or/and concentrating the volume of the solvent.

In some embodiments, the protic solvent is added to the reaction mixture of the tosylation. In some embodiments, the reaction solvent and the protic solvent form one phase. In some embodiments, the reaction solvent and the protic solvent forms two liquid phases.

In some embodiments, the protic solvent is water and/or alcohol. In some embodiments, the alcohol is C1-C5 alcohol. In some embodiments, the alcohol is methanol, isopropanol, ethanol, or any combination thereof.

The present invention also provides a process for isolating compound (I) comprising contacting compound (I) with a polar solvent or a mixture of polar solvents. The present invention provides a process for isolating compound I, the process comprising diluting the reaction mixture comprising compound I with a polar solvent. The present invention provides a process for isolating compound I, the process comprising diluting compound I with a polar solvent.

In some embodiments, the polar solvent is CPME (cyclopentyl methyl ether).

In some embodiments, the ratio of compound I to the polar solvent is 10:1 to 1:10 by weight. In some embodiments, the ratio of compound I to the polar solvent is 5:1 to 1:10 by weight. In some embodiments, the ratio of compound I to the polar solvent is 1:1 to 1:10 by weight. In some embodiments, the ratio of compound I to the polar solvent is 1:1 to 1:6 by weight. In some embodiments, the ratio of compound I to the polar solvent is 1:2 to 1:4 by weight. In some embodiments, the ratio of compound I to the polar solvent is 1:3 by weight.

In some embodiments, the ratio of compound I to CPME is 10:1 to 1:10 by weight. In some embodiments, the ratio of compound I to CPME is 5:1 to 1:10 by weight. In some embodiments, the ratio of compound I to CPME is 1:1 to 1:10 by weight. In some embodiments, the ratio of compound I to CPME is 1:1 to 1:6 by weight. In some embodiments, the ratio of compound I to CPME is 1:2 to 1:4 by weight. In some embodiments, the ratio of compound I to CPME is 1:3 by weight.

In some embodiments, the process for isolating the compound I further comprises adding water to the reaction mixture after conversion of the compound of formula (III) to the compound of formula (I) and prior to adding the polar solvent.

In some embodiments, the process for isolating the compound I further comprises adding an alcohol to the reaction mixture after conversion of the compound of formula (III) to the compound of formula (I). In some embodiments, the alcohol is methanol.

In some embodiments, the process for isolating compound I prepared in MeTHF as solvent, alcohol is added. In some embodiments, alcohol is methanol.

In some embodiments, the process for isolating compound I further comprises filtration after compound I is contacted with the polar solvent or the mixture of polar solvents. In some embodiments, the polar solvent is evaporated prior to filtration. In some embodiments, the polar solvent is partially evaporated prior to filtration. In some embodiments, the reaction mixture is cooled prior to filtration.

In some embodiments of any one of the processes described herein, the cyanoacyl derivative is cyanoacetic acid. In some embodiments, the cyanoacyl derivative is (alkyl-O)C(O)CH$_2$CN. In some embodiments, the cyanoacyl derivative is (alkyl-S)C(O)CH2CN. In some embodiment the cyanoacyl derivative is alkyl cyanoacetate. In some embodiment the cyanoacyl derivative is thio cyanoacetic acid. In some embodiment the cyanoacyl derivative is thio cyanoacetate. In some embodiment the cyanoacyl derivative is cyanoacetaldehyde. In some embodiment the cyanoacyl derivative is cyanoacetaldehyde dialkyl acetal.

In some embodiments of any one of the processes described herein, the alkyl-urea is methyl urea.

In some embodiments of any one of the processes described herein, Y is O and Z is F. In some embodiments, Y is S and Z is F.

In some embodiments of any of the processes described herein, the sulfolane is a cyclic sulfone, with the formula $(CH_2)_4SO_2$. It is also known as tetrahydrothiophene 1,1-dioxide or 1λ6-thiolane-1,1-dione.

In some embodiments of any of the disclosed processes, at least one step is carried out in the presence of at least one suitable solvent.

In some embodiments of any of the disclosed processes, at least two steps are carried out in the presence of at least one suitable solvent. In some embodiments of any of the disclosed processes, at least three steps are carried out in the presence of at least one suitable solvent. In some embodiments of any of the disclosed processes, at least one step is carried out neat in the presence of only the starting materials and reagents. In some embodiments of any of the disclosed processes, at least two steps are carried out neat in the presence of only the starting materials and reagents. In some embodiments of any of the disclosed processes, at least three steps are carried out neat in the presence of only the starting materials and reagents. In some embodiments of the above process, at least one of steps (i) and (ii) is carried out in the presence of at least one suitable solvent. In some embodiments of the above process, at least one of steps (i), (ii) and (iii) is carried out in the presence of at least one suitable solvent.

In some embodiments of any of the disclosed processes, the resulting intermediate compound of the formula (II) and/or (III) is isolated prior to proceeding to the next step In some embodiments of any of the disclosed processes, the resulting intermediate compound of the formula (II) and/or (III) is not isolated prior to proceeding to the next step. In some embodiments of any of the disclosed processes, the resulting intermediate compound of the formula (V) and/or (VI), is isolated prior to proceeding to the next step. In some embodiments of any of the disclosed processes, the resulting intermediate compound of the formula (V) and/or (VI), is not isolated prior to proceeding to the next step.

In some embodiments of any of the disclosed processes, the reaction of the alkyl urea and the trialkyl orthoformate in the presence of cyanoacetic acid or a cyanoacetate derivative includes at least three steps (a) condensation of the alkyl urea and the trialkyl orthoformate, (b) additional condensation with the cyanoacetic acid or the cyanoacetate derivative, and (c) cyclization (ring-closure) to obtain an alkyl cytosine.

In some embodiments of any of the disclosed processes, the reaction of the alkylurea and the trialkyl orthoformate is carried out in a suitable solvent. In some embodiments of any of the disclosed processes, the reaction of the cyanoacetic acid or a cyanoacetate derivative and the trialkyl orthoformate is carried out in a suitable solvent. In some embodiments of any of the disclosed processes, the cyclization reaction to form the compound of the formula (IV) from (V) or decarboxylation of compound (V) to form (VI) is carried out in a suitable solvent.

In some embodiments of any of the disclosed processes, the trialkyl orthoformate is trimethyl orthoformate. In some embodiments of any of the disclosed processes, the trialkyl orthoformate is triethyl orthoformate or tributyl orthoformate. In some embodiments of any of the disclosed processes, alkyl is methyl, ethyl, propyl or butyl. In some embodiments, alkyl is methyl. In some embodiments, In some embodiments of any of the disclosed processes, alkyl is ethyl. In some embodiments of any of the disclosed processes, the alkyl is substituted with phenyl.

In some embodiments of any of the disclosed processes, the alcohol which is obtained during the reaction with trialkyl orthoformate is removed. In some embodiments of any of the disclosed processes, the alcohol which is obtained during the reaction with trialkyl orthoformate is not removed during the reaction. In some embodiments of any of the disclosed processes, the alcohol which is obtained during the reaction with trialkyl orthoformate is not removed prior to the followed reaction.

The process described herein is advantageous in that it provides the desired product in a higher yield with less rigorous purification. Prior art includes addition of large amount of water. This invention describes better way for isolation. The process described herein is advantageous in that it provides the desired product in a higher yield with less time consuming, less costly and more environmentally efficient purification. The process described herein is advantageous in that it provides the desired product with reduced cost. The process described herein is advantageous in that it avoids the need for toxic reagents, which are not particularly desirable for industrial implementation due to the hazards associated with such reagents. The process described herein is also advantageous in that it may be performed in one-pot. The process described herein is also advantageous in that the use of a suitable solvent allows for a more efficient purification. The process described herein is also advantageous in that the use of a suitable solvent allows for a more efficient crystallization of the product.

The present reactions occur under reaction conditions sufficient to produce the desired compound. Such conditions, e.g. temperature, time, molarity, etc., may be varied by one of ordinary skill in the art based on the methods and protocols described herein.

Where a range is given in the specification it is understood that the range includes all integers and 0.1 units within that range, and any sub-range thereof. For example, a range of 77 to 90% is a disclosure of 77, 78, 79, 80, and 81% etc.

As used herein, "about" with regard to a stated number encompasses a range of +one percent to −one percent of the stated value. By way of example, about 100 mg/kg therefore includes 99, 99.1, 99.2, 99.3, 99.4, 99.5, 99.6, 99.7, 99.8, 99.9, 100, 100.1, 100.2, 100.3, 100.4, 100.5, 100.6, 100.7, 100.8, 100.9 and 101 mg/kg. Accordingly, about 100 mg/kg includes, in an embodiment, 100 mg/kg.

It is understood that where a parameter range is provided, all integers within that range, and tenths thereof, are also provided by the invention.

As used herein, "alkyl" is intended to include both branched and straight-chain saturated aliphatic hydrocarbon groups having the specified number of carbon atoms. Thus, $C_1$-$C_n$ as in "$C_1$-$C_n$ alkyl" is defined to include groups having 1, 2, . . . , n−1 or n carbons in a linear or branched arrangement, and specifically includes methyl, ethyl, propyl, butyl, pentyl, hexyl, heptyl, isopropyl, isobutyl, sec-butyl and so on. An embodiment can be $C_1$-$C_{12}$ alkyl, $C_2$-$C_{12}$ alkyl, $C_3$-$C_{12}$ alkyl, $C_4$-$C_{12}$ alkyl and so on. An embodiment can be $C_1$-$C_8$ alkyl, $C_2$-$C_8$ alkyl, $C_3$-$C_8$ alkyl, $C_4$-$C_8$ alkyl and so on. "Alkoxy" represents an alkyl group as described above attached through an oxygen bridge.

Each embodiment disclosed herein is contemplated as being applicable to each of the other disclosed embodiments. Thus, all combinations of the various elements described herein are within the scope of the invention.

This invention will be better understood by reference to the Experimental Details which follow, but those skilled in the art will readily appreciate that the specific experiments detailed are only illustrative of the invention as described more fully in the claims which follow thereafter.

WO 2015/103144 and WO 2015/103142 are each hereby incorporated by reference.

The invention is illustrated by the following examples without limiting it thereby.

Materials and Methods

One-Pot Formation of Compound (II)

Cyanoacetic acid (82.5 gr, 0.94 mol), N-methylurea (75 gr, 0.98 mol) and trimethyl orthoformate (118.5 gr, 1.09 mol) are mixed in DMF (300 gr) in a round bottom flask (fitted with Tr sensor and reflux condenser). The reaction mixture is heated to 85° C. (reflux of methanol) for 5 hours. The conversion is monitored by HPLC using XDB column for the formation of (V) or (VI) in the early stages of the reaction and then disappearance of (V) or (VI) and formation of (II) disappearance is monitoring only after addition of base. Optional monitoring also by GC (disappearance of n-methylurea and trimethyl orthoformate).

Formation of impurity (Va) was observed in HPLC.

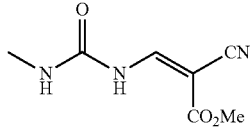
(Va)

HPLC chromatogram shows (Va) at R.T. of 7.3 and 7.4 min.

DABCO was added to reaction mixture at 80° C. and the reaction was heated to 90° C. and mixed for additional 1.5 hr. The conversion of linear (VI) to cyclic (II) was monitored by HPLC. The precipitate was filtered off and dried in oven to obtain the desired product as a yellow solid in 84% purity. The DMF mother liquor contains additional amount of product. The chemical yield is 38%. Re-slurry in acetone purifies the compound to 98%, however with loss of yield. Re-slurry in n-butanol is also optionally. Purity of 92% of product II is obtained. Isolated yield is 22%, with 20% loss of yield to butanol mother liquid. Optionally, if no precipitate is observed in DMF, the solution is cooled to 15 degrees and 300 mL acetonitrile is added and stirred for 1.5 hr. then precipitate is filtered off. Isolated yield 28%.

HPLC chromatogram of VI, precipitate (Synergi column). The peak of (II) appears at R.T. of 4.1 and 4.2 min.

Tosylation of Compound (III) (Homogeneous)

432 gr Me-THF was added to 2 L reactor and 40 gr of 93% (III) that contains 6.5% formic acid was added at 33° C. and mixed 39 gr Et$_3$N was added at 50° C. and mixed 15 minutes. 335 gr TsCl (solution 21.4%) was added to the reaction mixture over 30 minutes at 50° C.

Continue mixing until III<2% (HPLC norm).

Then 0.2 mol equiv. of Et$_3$N (7 gr) and 0.2 mol equiv. of TsCl (12 gr solution) were added gradually until 4% of (III) were present according to HPLC normalization and then moved to workup. 700 gr of water was added to the reaction mixture over 20 mins at 50° C. and then the mixture was heat to 60° C. followed by separation. To the organic phase add another 700 g of water, and separate phases. Evaporate part of Me-THF at vacuum 350 mbar at 51° C. while I is still soluble (solubility of I in Me-THF at 50° C. is 1:10). Add 750 gr MeOH and keep temperature at 60° C. until the entire reaction is clear. Mix at 600 rpm and cool down to 15° C. at 1° C./min. Filter the product in Buchner funnel and dry overnight at vacuum oven at 60° C. yield is 80%.

Procedure of (III) to (I) by Heterogeneous Tosylation

Procedure for Heterogeneous Tosylation Using THAB in Cyclopentyl Methyl Ether (CPME)

6 gr of (III) was added to 500 mL round bottom flask equipped with pH meter, dropping funnel and thermometer. 40 gr of CPME were added to the flask and mixed. The solution was heated to 50° C. 0.43 gr of TBAB were added to the flask during heating. 8.83 gr of TsCl were added to the reaction mixture in one portion during heating. NaOH (8M) was added dropwise to the reaction mixture using addition funnel. The pH was kept between 9-10. At any case, kept pH below 11. Buffer phosphate can be used. Continue dropwise addition of NaOH solution when pH stable on 9-10. Continue mixing until (III) is less than 3% (HPLC normalization). This step usually takes 1.5 hours and 8 mL of NaOH 8M is added. 130 gr of additional CPME was added and heated to 50° C. until the solution becomes clear. 100 gr of warm water were added at 50° C. and mix for few minutes, then phases were separated at 50° C. organic layer was washed with another portion of pre-heated water and phases separated.

Followed by partially evaporation of CPME until ratio of 1:3 (product vs. solvent) at vacuum of 30 mbar at 50° C. The mixture is cooled down to 15° C. at 1° C./min while stirring. the product was filtered off using Buchner funnel and dried overnight at vacuum oven at 70° C. 81% yield is obtained at 94% purity.

Procedure for the Tosylation of III to I in CPME, NaOH, Water and Phase Transfer Catalyst (PTC)

6 gr of wet 3-methyl-5-fluorocytosine (in purity of 58%) and 0.39 gr of TBAB were added to a 250 mL flask with 35 gr of CPME. NaOH was added to pH 6.7. The mixture was stirred at 50° C. and tosyl chloride (5.13 gr) in 10 gr CPME was added dropwise using addition funnel. After 90 minutes, another 0.2 mol equiv. of TsCl in CPME was added and after 2 hours CPME (160 gr) was added and then after phase separation, CPME was partially evaporated in vacuum. The product was filtered off.

Procedure for Heterogeneous Tosylation Using THAB in Toluene 6 gr of compound III was mixed in toluene (95 gr) and water containing potassium phosphate to pH 9.5-10. Then, tosyl chloride was added (1.1 mol equiv.) and 7 mol % of tetrahexylammonium bromide was added. NaOH 4M 12 mL was added to keep pH between 9.5 and 10 during 2.5 hours at 50° C. until 93% conversion was observed. At 50° C. the phases were separated, and hot water was added to the organic phase. The phases were separated, and solvent was evaporated to ratio of 1:5. Then, the solution was cooled down to 10° C. and the precipitate was filtered off. 7.8 gr of product was obtained, 65% isolated yield.

Procedure for Heterogeneous Tosylation Using THAB in MeTHF 6 gr compound III was mixed in toluene 150 gr, and 70 gr of water containing potassium phosphate to pH 9.5-10. then tosyl chloride was added (1.3 mol equiv.) and 7 mol % of tetrahexylammonium bromide. NaOH 4M 19 mL was added to keep pH between 7 and 8 during 8 hours at 50° C. until 93% conversion was observed. at 50° C. the phases were separated, and hot water was added to organic phase. The phases were separated, and solvent was evaporated to ratio of 1:5. Isopropanol 52 gr was added to organic phase and stirred at 50° C. and then cooled slowly to 10° C. the precipitate was filtered off. 9.8 gr of product was obtained, 70% isolated yield.

Procedure for Heterogeneous Tosylation Using KHCO$_3$ in CPME 5 gr compound III was mixed in CPME 40 gr, and 20 gr of water. then tosyl chloride was added (1.1 mol equiv.) and 5 mol % of tetrabutylammonium bromide. KHCO$_3$ 3 mol equiv. was added and the mixture was stirred during 2 hours at 50° C. until 50% conversion was observed. 40% of the desired product was observed and the product was not isolated.

Procedure for Heterogeneous Tosylation Using KHCO$_3$ in CPME 2 gr compound III was mixed in CPME 30 gr, and 20 gr of water. then tosyl chloride was added (2.4 mol equiv.) and 5 mol % of tetrabutylammonium bromide. KHCO$_3$ 2.4 mol equiv. was added and the mixture was stirred during 7 hours at 50° C. until 93% conversion was observed. at 50° C. the phases were separated, and hot water was added to organic phase. The phases were separated, and solvent was evaporated to ratio of 1:5. Isopropanol 10 gr was added to organic phase and stirred at 50° C. and then cooled slowly to 10° C. the precipitate was filtered off. 1.75 gr of product was obtained, 40% isolated yield.

Procedure for the Tosylation of III to I in CPME, KHCO$_3$ and Water 5 gr of 3-methyl-5-fluorocytosine, 6.1 of KHCO$_3$ and 0.33 gr of TBAB were added to a reactor with 40 gr of CPME and 20 gr of water. The mixture was stirred at 50° C. and tosyl chloride (4.23 gr) was added in several small portions. The reaction was stirred for 2 hours and sampled in HPLC. 40% of desired product was obtained in 50% conversion. The product was not isolated.

Procedure of (III) to (I) by Homogeneous Tosylation

Procedure for Mono-Phase Tosylation (Homogenous) in MeTHF 3 gr compound III was mixed in MeTHF (weight ratio of 1:16) and triethylamine was added (1.2 mol equiv.). then tosyl chloride was added (1.2 mol equiv.) and the mixture was stirred at room temperature for 3.5 hours until 98% conversion. 120 gr of water were added, and the precipitate was filtered off. 5.2 gr of product at 79% yield were obtained at purity of 90.8%.

Procedure for the Tosylation of III to I in MeTHF Using Triethylamine 20 gr of 3-methyl-5-fluorocytosine, 20 gr of triethylamine and 290 gr of MeTHF were added to a reactor. The mixture was heated to 50° C. and tosyl chloride (26.3 gr) was added in one portion. The reaction was stirred at 50° C. for 1 hour and then another portion of tosyl chloride was added. After 30 minutes, 360 gr of water were added and the phases were separated. The organic phase was washed three times with 365 gr of water (×3). 80 gr of the organic solvent was evaporated in vacuum and methanol was added (305 gr) at 55° C. The reactor was cooled to 5° C. and the product was filtered and dried in oven. 26 gr obtained as off-white solid. The product was obtained in 58% yield. 10% of product was identified in mother liquor.

Procedure for Mono-Phase Tosylation (Homogenous) in MIBK (Methyl Iso Butyl Ketone)

5 gr compound III was mixed in MIBK (weight ratio of 1:13) and triethylamine was added (1.6 mol equiv.). then tosyl chloride was added (1.35 mol equiv.) and the mixture was stirred at room temperature for 5 hours until 87% conversion. 70 gr of water were added and stirred for 1.5 hours and the precipitate was filtered off. 3.5 gr of product at 35% yield were obtained.

Procedure for Mono-Phase Tosylation (Homogenous) in MeCN 2.1 gr compound III was mixed in MeCN (weight ratio of 1:30) and triethylamine was added (2.6 mol equiv.). then tosyl chloride was added (1.3 mol equiv.) and the mixture was stirred at room temperature for 4 hours until 75% conversion. 50 gr of water were added and stirred for 1 hour and the precipitate was filtered off. 2.5 gr of product at 50% yield were obtained.

Procedure for the tosylation of III to I in MeCN using triethylamine 2.1 gr of compound III is mixed in MeCN (weight ratio of 1:30) and triethylamine is added (2.6 mol equiv.). Then tosyl chloride is added (1.3 mol equiv.) and the mixture is stirred at room temperature for 4 hours until 75% conversion. 50 gr of methanol are added and stirred for 1 hour and the precipitate is filtered off. 2.5 gr of product at 50% yield is obtained.

Procedure for Mono-Phase Tosylation (Homogenous) in CPME 5 gr compound III was mixed in CPME (weight ratio of 1:20) and triethylamine was added (1.3 mol equiv.). Then tosyl chloride was added (1.1 mol equiv.) and the mixture was stirred at 55° C. for 1 hour until 95% conversion. Water was added and the phases were separated. 50 gr of CPME were removed by vacuum distillation until crystals appear and the mixture was filtered off. The cake was dried in oven. 6.9 gr of product at 68% yield were obtained at purity of 97.2%.

Procedure for the Tosylation of III to I in DMA Using $K_2CO_3$ 92.6 gr of compound III, potassium carbonate (64.7 gr, 1.25 mol equiv.) and 250 gr DMA were heated to 45° C. Tosyl chloride (92.6 gr, 1.25 mol equiv.) was added at 20° C.

At 50° C., additional 65 gr DMA were added. After 3 hours the conversion was 90% according to HPLC and additional amount of TsCl and potassium carbonate were added. At reaction completion, the reaction was cooled to 25° C. and 500 gr of water were added. The reaction was heated to 32° C. to allow good stirring and the product was filtered off. The crude was washed with ethanol and water and dried under vacuum at 70° C. Compound I was obtained in 86% isolated yield and 97.9% purity.

Procedure for the Tosylation of III to I in DMA Using $K_2CO_3$ 92.6 gr of compound III, potassium carbonate (64.7 gr, 1.25 mol equiv.) and 250 gr DMA were heated to 45° C. Tosyl chloride (92.6 gr, 1.25 mol equiv.) was added at 20° C.

At 50° C., additional 65 gr of DMA were added. After 3 hours the conversion was 90% according to HPLC and additional amount of TsCl and potassium carbonate were added. At reaction completion, the reaction was cooled to 25° C. and 400 gr of water were added. The reaction was heated to 32° C. and the product was filtered off. The crude was washed with ethanol and dried under vacuum at 70° C. Compound I is obtained in 86% isolated yield and 97.9% purity.

Procedure for the Tosylation of III to I in DMA Using $Na_2CO_3$ 40 gr of compound III, sodium carbonate (30.7 gr, 1.2 mol equiv.) and 240 gr DMA were added to a reactor and mixed. The reactor was heated to 50° C. Tosyl chloride (55 gr, 1.15 mol equiv.) was added at 45° C.

After 2 hours the starting material reached full conversion according to HPLC and 100 gr cyclopentylmethyl ether (CPME) was added. 45-gr water was added at the same temperature and pH was adjusted to 8.5 using HCl 15%. CPME was partially distilled off under vacuum and the mixture was cooled down to 5° C. and filtered. The product was dried under vacuum at 70° C. Compound I was obtained in 98.7% purity and 92% isolated yield.

Procedure for the Tosylation of III to I in DMA Using Triethylamine 5 gr of 3-methyl-5-fluorocytosine, 4.2 gr of triethylamine were added to a reactor with 20 gr of DMA. The mixture was stirred at 50° C. and tosyl chloride (7.31 gr) was added in one portion. The reaction was stirred for 7 hours and then cooled down. The product was not isolated. Conversion of starting material was 62%. 28% desired product was obtained according to HPLC.

Procedure for the Tosylation of III to I in Water Using $Na_2CO_3$ and Dimethylbenzylamine 5 gr of compound III, N,N-dimethylbenzylamine (0.613 gr, 0.15 mol equiv.), sodium carbonate (3.84 gr, 1.2 mol equiv.) and 30 gr water and were added to a round bottom flask and mixed. The reaction was heated to 40° C. Tosyl chloride (6.87 gr, 1.15 mol equiv.) was added at 40° C.

After 5 hours 85% conversion was observed according to HPLC and the reaction was cooled and filtered. the desired product was obtained at purity of 93.6% in 68% yield.

Procedure for the Tosylation of III to I in Acetonitrile Using Triethylamine 5 gr of compound III (90% purity) and 50 gr acetonitrile were mixed. 3.8 gr triethylamine (1.2 mol equiv.) was added at room temperature followed by addition of tosyl chloride (6.6 gr, 1.1 mol equiv.). 40 gr of acetonitrile were added to allow better mixing. After 3 hours 125 gr of water were added and the product was filtered off and washed with cold water. The product was dried under vacuum at 70° C. Compound I was obtained in 97.6% purity.

Procedure for the Tosylation of III to I in Water Using Dimethylbenzylamine and KOH 6.87 gr of compound III, 0.4 gr N,N-dimethylbenzylamine, 2.03 gr potassium hydroxide (1.2 mol equiv.) were mixed at room temperature in 30 gr of water. Tosyl chloride (6.87 gr, 1.15 mol equiv.) was added and the reaction was stirred overnight. 6.5 gr of yellowish solid was filtered off in 62% yield and 86% purity.

Procedure for the Tosylation of III to I in Water Using Dimethylbenzylamine and NaOH 5 gr of 3-methyl-5-fluorocytosine, 0.408 gr of N,N-dimethylbenzylamine and 2.03 gr of sodium hydroxide are added to a reactor with 30 gr of water. The mixture is stirred at room temperature and tosyl chloride 6.87 gr is added in one portion. The reaction is stirred overnight and the product is filtered off. 6.5 gr of yellowish solid is obtained. The product is obtained in 86% purity, 62% yield.

Procedure for the Preparation of VII 20 gr N-methylurea were added to a flask containing 57 gr trimethyl orthoformate and heated to 80° C. The reaction was stirred for 7 hours and monitored by GC to detect disappearance of methylurea. The precipitate was filtered off and dried. 11 gr of product were obtained (26% yield). The product was identified in mass spectrometry at 265 nm as two isomers in ratio of 95:5.

Procedure for Preparation of VI Using VII 5 gr of VII was added to a flask containing 2.7 gr cyanoacetic acid in DMF (15 gr). The mixture was heated for 15 minutes to 45° C. and became clear. The temperature was increased gradually over 4 hours to 75° C. and additional 1 mol equiv. of cyanoacetic acid was added. The reaction was monitored by HPLC, during this time appearance of V was detected and then disappeared with the formation of product VI.

Procedure for Batch Fluorination of II to III 1 kg of compound II was inserted to a reactor and cooled to 0° C. 6.2 kg anhydrous HF was added and then cooled to −10° C. Fluorine (10% in nitrogen) bubbled into the reactor until full conversion of starting material. The temperature was raised to allow removal of the solvent and water were inserted followed by neutralization of remaining of acid in the mixture. Then water were evaporated until crystals were formed and filtered. The product was isolated at 60% yield.

Procedure of Fluorination of VI and Cyclization of VIII to III

To 350 gr Solution of compound VI (30% concentration) in DMF added water and then added 1 equiv. selectfluor at 5° C. during 45 minutes. After addition the reaction stirred at 25° C. and then at 85° C. for 2.5 hours. The solvent was removed under reduced pressure (azeotrope with water).

100 ml of MeOH was added, the formed precipitates were filtered off. MeOH was removed under reduced pressure. The compound VIII was measured in 19F-NMR (300 Mhz, DMSO-d6) −147 ppm.

LCMS of compound III (M+H) m/z 144.0568 is shown in FIG. 1.

Cyclization of VIII was taken place in the presence of $Na_2CO_3$. The desired product was obtained in less than 10% yield according to HPLC.

Procedure of IV to II

To 0.32 gr of IV at purity of 95.5% in 10 gr of DMF, ammonium chloride (1.0 eq) was added. The reaction mixture heated to 145 degrees for 6 hours, until full conversion was observed by HPLC. product II was obtained in 73% yield and was not isolated.

Formation of Compound (II) by Decarboxylation of Compound (IV)

Procedure for the Formation of Compound II by Decarboxylation of IV Using DABCO DMA TBAB 10 gr of compound IV in 20 gr of DMA and 1.29 gr of TBAB with 6.7 gr of DABCO were mixed and heated to 126° C. When reaction ended according to HPLC the mixture was cooled down and the product was filtered off. The product was dried in vacuum oven at 70° C. 51% yield and purity of 80% was obtained.

Procedure for the Formation of Compound II by Decarboxylation of IV Using DBU in DMSO 2.2 gr of compound IV in 3 gr of DMSO and 2.35 gr of DBU were mixed and heated to 130° C. After 3 hours 73% of desired product was obtained according to HPLC. The product was not isolated.

Procedure of IV to II Including Isolation of Product II.

To 21.7 gr of compound IV in 50 gr of DMF, 0.65 eq of ammonium chloride was added. The reaction heated to 145 degrees for 15 hours. After completion, the reaction mixture cooled down to 5 degrees. The precipitate filtered off. To the mother liquor, acetonitrile was added, cooled down. The formed precipitate filtered off and combined with the previous solid. The solid dried in vacuum oven at 75 degrees and 15.1 gr of compound II was obtained. In another example, NMP was used as solvent. 48% yield were obtained.

In another example, sulfolane was used as solvent, without ammonium chloride.

1 gr of compound IV in 5 ml of sulfolane, heated to 200 degrees for 2 hours. 95% conversion after 2 hr was observed in HPLC. precipitate was filtered (95% normalization), purification in ethanol-water gave 68% yield of compound II.

Procedure of Formation of Va 18.8 gr of ethylcyanoacetate, 19.6 gr (1.5 eq) of methylurea, and 1.5 eq of trimethylorthoformate 28.1 gr were mixed and refluxed for 7 hours. The product Va was not isolated. The obtained purity is 48% and the chemical yield is 94%.

11.1 gr of ethylcyanoacetate, 9.8 gr (1.5 eq) of methylurea, and 1.5 eq of trimethyl orthoformate 14 gr, was refluxed for 7 hours. After reaction completion by HPLC, the reaction mixture cooled down and MeOH added. The solid filtered off and dried in the oven to give the product in 93.4% purity and 53% isolated yield.

Procedure of the formation of (Va). the reaction was also conducted in DMF, DMA, xylene, MeCN, MeOH.

Reaction for the formation of compound V were also conducted in DMF, DMA, xylene, ACN, NBN, CPME, MCB, butanol, DMSO, Neat at temperature range of 65-100 degrees.

Procedure for Formation of (V) from (Va)

(1) 2 gr of (Va) in DMA, 3 eq of LiCl was added. the reaction mixture heated to 90 degrees for 3 hours. Product was not isolated Chemical yield=45%

The hydrolysis was also conducted under following conditions:

(2) DMF, LiCl
(3) DMSO, LiCl
(4) LiCl, DMF/water
(5) DABCO, DMF
(6) DMF, NaOH
(7) DMF/HCl
(8) DMA/DABCO
(9) ACN, DABCO 7.4 gr of (Va) in DMF, 1 eq of DABCO was added, heated to 90 degrees for 2 hours to provide a yield of compound II of 16%.

Procedure for the Cyclization of Va into IVa 11 gr of 92.2% of Va in 56 gr of MeOH and 10 ml of Methanolic NaOMe was heated to 56 degrees for 2 hours 30 min. After reaction completion and disappearance of V, MeOH was evaporated, then neutralization with 2 N HCl, the formed precipitate was filtered off, dried in the oven at 65° C., to obtain 8.57 gr of white solid of 99.3% purity. Isolated yield=77%

Procedure of the Formation of Tert Butyl Ester Form of Va

N-methylurea (10 g, 135 mmol, 1.0 eq.), trimethyl orthoformate (14.8 ml, 135 mmol, 1.0 eq.) and t-butylcyanoacetate (19.0 mml, 135 mmol, 1.0 eq.) were placed in round bottom flask equipped with reflux condenser. The reaction mixture was stirred for 6 h at 70° C. and then 12 h at room temperature. The obtained solid was filtered, washed three times with MTBE and dried to give 18.6 g of the product as a white powder. Full conversion was observed after 6 h with a yield of 80% and purity of 98%.

Procedure for the Hydrolysis of Tertbutyl Ester Form of Va into Compound V 10 g of starting material [225] (44.4 mmol, 1.0 eq.) was suspended in 27 ml of 5.8M HCl in 1,4-Dioxane (155 mmol, 3.5 eq.). The suspension was stirred for 20 h at room temperature. The suspension was then filtered off and washed with: 1,4-dioxane×1, hexane×1, DCM×3. The obtained product was then dried to give 7.66 g of white powder. Full conversion was observed after 20 h with a yield of 89.5% and purity of 98%.

Procedure for the Decarboxylation of V into VI and then Cyclization into II

In a two-necked round bottomed flask equipped with thermometer and reflux condenser, 0.5 g of V (3.0 mmol, 1.0 eq.) dissolved in dry DMF (5 ml). Catalytic amount of $Cu_2O$ (0.05 eq.) was added followed by addition of 0.5 ml of DMSO. The reaction mixture was stirred under argon at 80° C. Full conversion to compound VI was observed after 24 hours. A sample was taken for Q-HPLC.

To the reaction DBU (0.1 eq.) was added and the reaction mixture was stirred for additional 5 h at this some temperature. LCMS analysis was performed—reaction was not completed. 0.1 eq. of DBU was added and the reaction was continued for 12 h. After this time HPLC showed full conversion to compound II. A sample was taken for Q-HPLC. Solvent was concentrated and to obtained oily residue DCM was slowly added to precipitate the product. The solid was washed twice with DCM and then with diethyl ether and then dried. Full conversion was observed after 36 h with a yield of 50% and purity of 97.5%.

Decarboxylation of compound V which has been synthesized via tert-butyl ester in presence of catalyst ($Cu_2O$) leads to good yield (81%) according to Q-HPLC and 50% yield calculated by weight of obtained solid. In the mother liquid some amount of the product is still present (60% acc. to HPLC)

Hydrolysis of Tert-Butyl Ester Derivative of Compound V:

1 gr of tert-butyl (Z)-2-cyano-3-(3-methylureido)acrylate was mixed in 10 gr 1,4-dioxane and 1.49 gr of HCl conc. was added. The reaction was heated to 65° C. and monitored in HPLC until full conversion of starting material. During the reaction a solid was obtained. The solution was cooled to 5° C. and the product was filtered off and dried in oven. The product was obtained as two isomers of compound V in yield of 43%.

Procedure for the Formation of Compound V

Cyanoacetic acid 116.1 gr, N-methylurea 100 gr (1 eq), and trimethyl orthoformate (1 eq, 142.6 gr) are mixed in a 1 L reactor. The mixture is heated to reflux temperature of methanol (~65° C.) and held for 5 hr. after 1 hour 30 min of reflux, MeOH was added. The reaction mixture cooled to 10 degrees and the precipitate filtered off, and washed with MeOH. The solid dried in the oven.

The solid was re-slurry in cold water (150 mL) for 1 hour, filtered off and washed with methanol; dried under vacuum to yield 34 gr of compound V with purity of 93%/isolated yield 15%.

Procedure for the Cyclization of Ethylester Form of Va into IVa 3.6 gr of Va in 20 gr of ethanol, sodium ethoxide was added. The reaction mixture stirred at reflux for 3.5 hours. After reaction completion, the solvent was removed under vacuum. 40 gr of water was added and the solution neutralized with 32% HCl. The solution cooled down and the obtained solid was filtered off and dried in vacuum oven to yield the desired product in 89% purity and 74% isolated yield.

Procedure of Formation of Ethylester Form of Va and then into IV and then into II

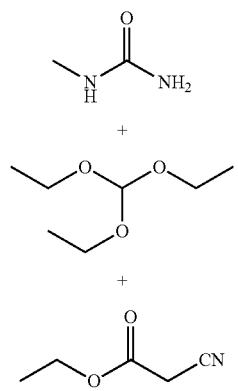

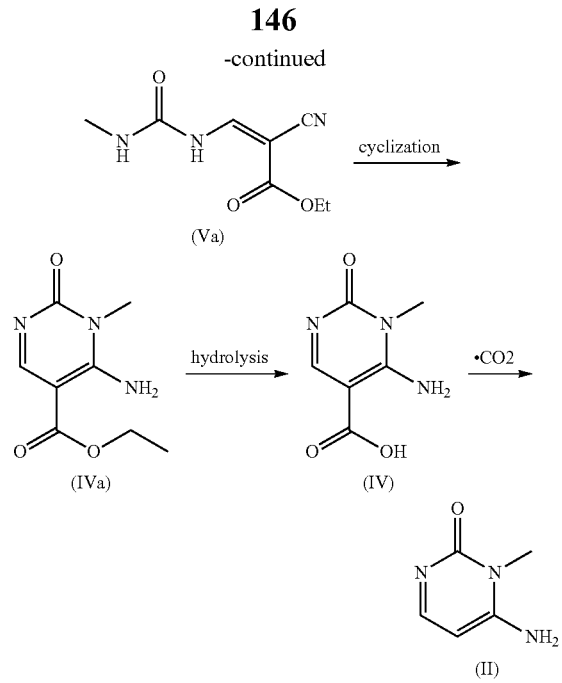

Formation of Va

Mixture of Ethyl cyanoacetate 20 gr, Trimethylorthoformate 1.5 eq, and n-methylurea 1.3 eq was heated at reflux for 7 hours to yield Va.

Formation of IVa 80 gr of ethanol was added to the reaction mixture of Va followed by 11.2 gr of sodium ethoxide. The reaction stirred at reflux for 5 hours to yield IVa.

Formation of Compound IV 60 gr of water was added to the reaction mixture of XXIII, heated to 78 degrees for 9 hours. After reaction completion, the solution cooled down to r.t., acidified with 32% HCl to pH 2. The solid filtered off and dried in the oven to yield 22.2 gr of 92.2% compound IV. (total yield from ethyl cyanoacetate 69%)

Formation of Compound II 50 gr of DMF was added to 27.8 gr of 92.2% compound IV followed by 0.65 eq of $NH_4Cl$. The reaction mixture heated to 145 degrees for 18 hours. Cooled down and the solid filtered off to yield 15.1 gr of compound II in purity of 74% (contains SM and probably residues of solvent).

Overall yield 51% for all steps.

Procedure of Formation of IX and then Formation of V

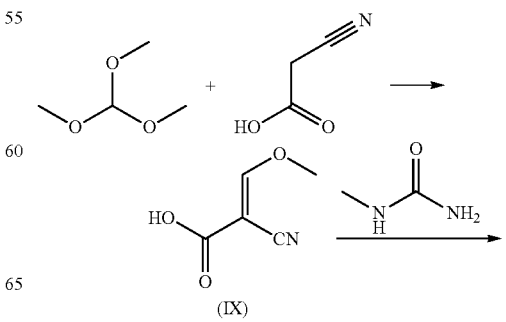

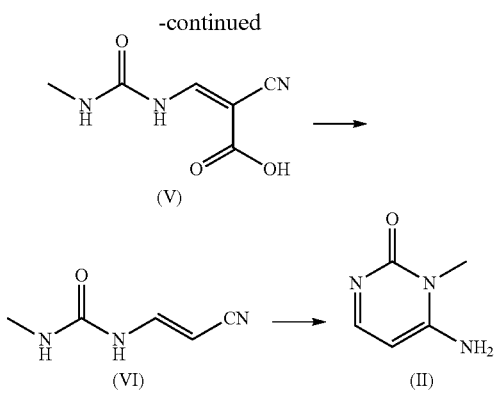

Formation of IX (Methyl Derivative)

5.74 gr of cyanoacetic acid and 1.3 eq of trimethylorthoformate in 10 gr of DMA was heated to 55 degrees for 5 hours 30 min to yield IX.

Formation of V and the Decarboxylation to VI 5 gr of methylurea was added to reaction mixture of IX. Heated to 55 degrees for 4 hours. After reaction completion the temperature increase to 77 degrees and stirred for 8 hours to yield VI Formation of II 2.1 gr of DBU was added to the reaction mixture of VI, heated to 45 degrees for 5 hours. After reaction completion, the mixture cooled down, the solid filtered off and dried in vacuum oven to yield 3.6 gr of compound II.

Procedure for the Cyclization of Compound V into Compound IV

To 7.1 gr of compound V in a mixture of Ethanol/Me-THF 1.2 eq of sodium ethoxide was added. The reaction mixture heated to reflux and stirred for 7 hours. After reaction completion and cooling down, water was added. Acidifying using 32% HCl to pH 2. The obtained solid was filtered off and dried in vacuum oven.

Procedure of SR Ester into V

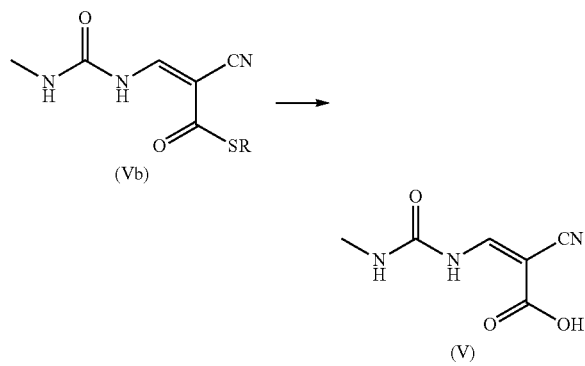

wherein R is ethyl or tertbutyl.

R=ethyl

AgCF$_3$CO$_2$ was added to Vb in THF:water at r.t., the reaction mixture heated to 70 degrees for 23 hours. HPLC process control after 19 h: mixture of starting material (2.73%+2.74%) and acid compound V as two isomers cis and trans (31.63%+42.42%). The reaction was worked-up and the acid was isolated by precipitation with MeOH. Yield >100%. Product contaminated with Ag salts.

R=t-butyl

AgCF$_3$CO$_2$ was added to SM in THF:water at r.t., the reaction mixture heated to 70 degrees overnight. HPLC process control after 17 h: starting material (6.04%+9.58%) and acid compound V as isomers mixture (33.18%+44.53%). After reaction completion, the acid was isolated by precipitation with MeOH. HPLC: acid compound V as one main isomer (71.17%) contaminated with starting material (11.25%+6.80%)

Procedure for One-Pot Formation of IV Via Formation of Va, Cyclization into IVa and Hydrolysis Triethylorthoformate (157 gr, 1.061 mol), ethylcyanoacetate (80 gr, 0.707 mol) and methylurea (78 gr, 1.061 mol) were added into cyclopentyl methyl ether (240 gr) in 1 L reactor during 5 minutes. The reactor was heated to 85° C. and stirred for 5-7 hours until ethylcyanoacetate was less than 0.5% in GC. The reactor was cooled to room temperature and compound Va was observed in GC as 93%.

For the cyclization, sodium ethoxide (65 gr) was added followed by MeOH (48 gr) and then the reactor was heated to 80° C. After 2-3 hours the intermediate Va was disappeared and product IVa and IV were observed in ratio of 66:25. Due to presence of methanol, 6% of methyl ester of IVa was also observed. For the hydrolysis, water (450 gr including 5.2 gr of tetrabutylammonium bromide) were added while cooling to 50° C. The pH of the reaction was monitored and kept at pH=13 using sodium hydroxide peals (10 gr) during stirring at 50° C. After 1.5 hours the reaction was monitored in HPLC and less than 2% of compound IVa was observed. 100 gr of water were added, and the organic phase was separated at 50° C. The water phase was cooled to room temperature and acidified to pH=5 using HCl 32% (130 gr). The water phase was cooled to 10° C. and stirred overnight. Precipitated was formed, filtered and washed in cold water. The product was dried in vacuum oven at 75° C. 108 gr were obtained in purity of 93.1%. isolated yield for three steps is 84%.

Procedure for the Formation of II from IV Using DABCO in DMF 10 gr of compound IV, 6.46 gr of DABCO (1.02 mol equiv.) were mixed in DMF (36 gr) and heated to 130° C. After 3 hours the reaction was cooled to 5° C. and the product (4.9 gr) was filtered off. Another crop of 0.76 gr of product was obtained from mother liquor by addition of acetonitrile and cooling overnight.

Compound II was obtained in 89% purity and 70% yield.

Procedure for the Formation of Compound II by Decarboxylation of IV Using Ammonium Chloride in DMA 10 gr of compound IV was mixed in 20 gr DMA and tetrabutylammonium bromide (0.8 gr, 5 mol %). Ammonium chloride (2.67 gr, 1 mol equiv.) was added and the reaction was heated to 150° C. Thick slurry was observed, and some amount of DMA was added. After 8 hours the reaction was cooled to 5° C. and the product was filtered off and dried at 110° C. in oven. Compound II was obtained in 74% isolated yield and purity of 64%.

Procedure for the Formation of Compound II by Decarboxylation of IV Using DABCO in Ethylene Glycol 3.2 gr of compound IV was mixed in 10 gr ethylene glycol and 2.27 gr DABCO. The reaction was heated to 110° C. After 3 hours the starting material reached 97% conversion. 84% of desired product was observed in HPLC. The product was not isolated.

Procedure for the Formation of Compound II by Decarboxylation of IV Using TsOH in DMA and TBAB 1 gr of compound IV was mixed in 5 gr DMA and 1.05 gr p-Toluenesulfonic acid monohydrate. 0.24 gr of TBAB was added and the mixture was heated to 130° C. A brownish slurry was obtained. After 4 hours full conversion of starting material was obtained. The product was observed in 62% selectivity and was not isolated.

Procedure for the Formation of Compound II by Decarboxylation of IV Using MsOH in DMA 2 gr of compound IV was mixed in 6 gr DMA and methanesulfonic acid (5.45 gr, 5 mol equiv.) was added. The reaction was heated to 140° C. and the color changed to dark brown. After 8 hours the reaction was cooled to 25° C. and the product was filtered off after mixing in 50 degrees in acetonitrile and cooling to 5° C. 4.1 gr of desired product was obtained (purity 18%, 52% yield).

DISCUSSION

There is a need to develop an improved synthetic process for producing 5-(fluoro-4-imino-3-methyl)-1-tosyl-3,4-dihydro-pyrimidine-(1h)-one.

There is a need to develop an improved synthetic process for producing 6-amino-1-methylpyrimidin-2(1H)-one and 6-amino fluoro-1-methylpyrimidin-2(1H)-one which are useful in synthesizing 5-(fluoro-4-imino-3-methyl)-1-tosyl-3,4-dihydro-pyrimidine-(1h)-one.

The claimed process is an improvement over the processes described in WO2015/103144 and/or WO2015/103142 for synthesizing 5-(fluoro-4-imino-3-methyl)-1-tosyl-3,4-dihydro-pyrimidine-(1h)-one.

The present invention provides an efficient pathway for synthesis of compound I without using the alkylation reaction as described in WO2015/103144 and/or WO2015/103142.

The process is designed to solve problem of non-selective alkylation step described in the previous process. The alkyl group on nitrogen 3 is present prior to cyclization of cytosine ring by using alkylurea and avoiding alkylation as last step of the synthesis. Further, the starting materials of the described routes are simple and inexpensive.

REFERENCES

The synthesis of cytosine is described in A. Bendich, H. Getler, G. B. Brown, J. Biol. Chem. 1949, 177, 565.

WO 2015/103144, published Jul. 9, 2015 (Adama Makhteshim Ltd.)

WO 2015/103142, published Jul. 9, 2015 (Adama Makhteshim Ltd.)

CN 103992278, published Aug. 20, 2014 (Nanyang Normal University)

CN 101597264, published Dec. 9, 2009 (Shanghai Puredu Bio-Tech Co., Ltd.)

JP 58-185569, published Oct. 29, 1983 (YODOGAWA SEIYAKU KK)

JP 58-162579, published Sep. 27, 2983 (YODOGAWA SEIYAKU KK)

Whitehead, C. W. et al. J. Am. Chem. Soc., 1953, 75 (3), pp 671-675.

Whitehead, C. W. et al. J. Am. Chem. Soc., 1955, 77 (22), pp 5867-5872.

What is claimed is:

1. A process for preparing a compound having the formula (I):

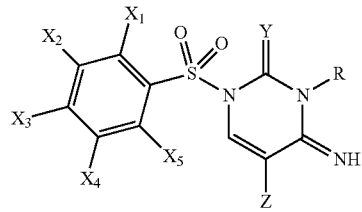

wherein
R is alkyl or alkylaryl;
each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, a halogen, —SH, —OH, —NH$_2$, —NO$_2$, —CN or CF$_3$;
Y is O or S;
and Z is a halogen,
comprising reacting an alkyl-urea or thiourea of the formula RNH(C=Y) NH$_2$ with a trialkyl orthoformate in the presence of a cyanoacyl derivative having the formula R'C(O)CH$_2$CN, wherein R' is OH, O—R" or S—R", wherein R" is alkyl, or with a cyanoacetaldehyde dialkyl acetal, under conditions sufficient to obtain the compound of formula (III),

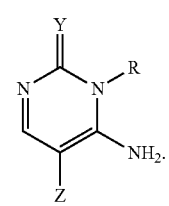

2. The process of claim 1, wherein the compound of formula (III) is prepared by reacting the compound of formula (II),

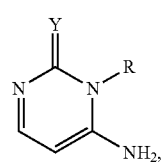

with a halogenating agent under conditions sufficient to obtain the compound of formula (III) having the structure

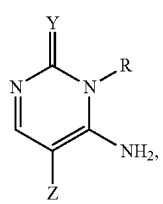

and/or wherein the compound of formula (III) is reacted with a compound having the following structure:

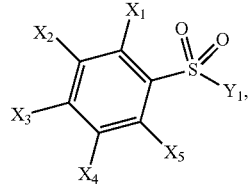

wherein $Y_1$ is halogen, imidazole, or

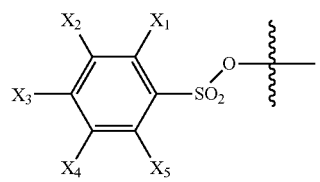

under conditions sufficient to obtain the compound of formula (I).

3. The process of claim 1, wherein the process comprises the steps of:

(i) reacting an alkyl-urea of the formula RNH(C=Y)NH$_2$ with a trialkyl orthoformate in the presence of cyanoacetic acid; and (ii) adding a base to the reaction mixture under conditions sufficient to obtain the compound of formula (II),

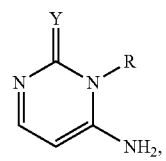

(II)

wherein at least one of steps (i) and (ii) is carried out in the presence of at least one suitable solvent.

4. The process of claim 3, comprising the following steps:

(i) reacting an alkyl-urea of the formula RNH(C=Y)NH$_2$ with a trialkyl orthoformate in the presence of cyanoacetic acid to form the compound of formula (V),

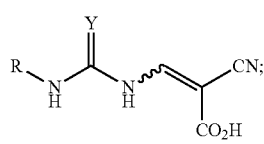

(V)

(iia) adding a base to the reaction mixture of step (i) under conditions sufficient to obtain the compound of formula (IV),

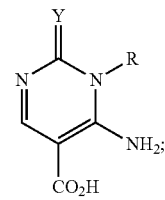

(IV)

(iib) heating the product obtained in step (iia) under conditions sufficient to obtain the compound of formula (II),

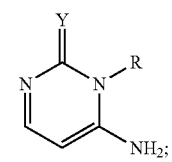

(II)

and (iii) reacting the compound of formula (II) with a halogenating agent under conditions sufficient to obtain the compound of formula (III),

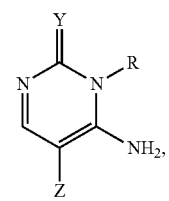

(III)

wherein at least one of steps (i), (iia) and (iib) is carried out in the presence of at least one suitable solvent, or comprising the following steps:

(ia) reacting an alkyl-urea of the formula RNH(C=Y)NH$_2$ with a trialkyl orthoformate in the presence of cyanoacetic acid to form the compound of formula (V),

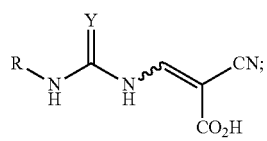

(V)

(ib) heating the product obtained in step (ia) under conditions sufficient to obtain the compound of formula (VI),

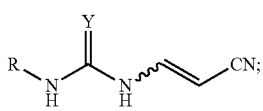

(VI)

(ii) adding a base to the reaction mixture of step (ib) under conditions sufficient to obtain the compound of formula (II),

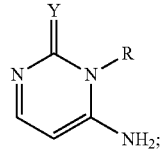
(II)

and (iii) reacting the compound of formula (II) with a halogenating agent under conditions sufficient to obtain the compound of formula (III),

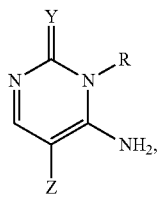
(III)

wherein at least one of steps (ia), (ib), (ic) and (ii) is carried out in the presence of at least one suitable solvent.

5. The process of claim 1 for preparing a compound having the formula (I) comprising the steps of:
(i) reacting an alkyl-urea of the formula RNH(C=Y)NH$_2$ with a trialkyl orthoformate in the presence of a cyanoacetaldehyde dialkyl acetal; and
(ii) adding a base to the reaction mixture under conditions sufficient to obtain the compound of formula (II),

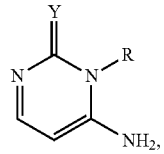
(II)

wherein at least one of steps (i) and (ii) is carried out in the presence of at least one suitable solvent.

6. The process of claim 1 for preparing a compound having the formula (I) comprising reacting the compound of formula (VIII) with

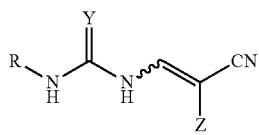
(VIII)

with a base under conditions sufficient to obtain the compound of formula (III),

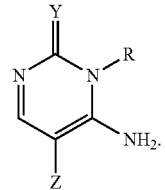
(III)

7. The process of claim 1, wherein the compound of formula (I) produced has the structure:

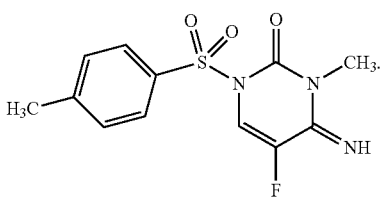 [SMILES: Cc1ccc(S(=O)(=O)n2cc(F)c(=N)n(C)c2=O)cc1]

8. A process for preparing a compound having the structure (I) according to claim 1:

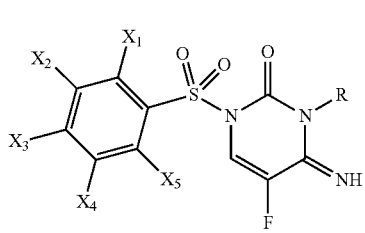
(I)

wherein

R is alkyl or alkylaryl;

each of $X_1$, $X_2$, $X_3$, $X_4$ and $X_5$ is, independently, H, alkyl, alkenyl, alkynyl, alkoxy, haloalkyl, haloalkoxy, alkylthio, haloalkylthio, amino, alkylamino, dialkylamino, alkoxycarbonyl, alkyl carbonyl, hydroxyalkyl, ester, acid halogen, —SH, —OH, —NH$_2$, —NO$_2$, —CN or CF$_3$;

Y is O or S;

and Z is a halogen, comprising reacting the compound of formula (III) having the structure:

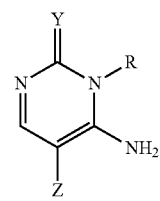
(III)

with a compound having the following structure in the presence of a base,

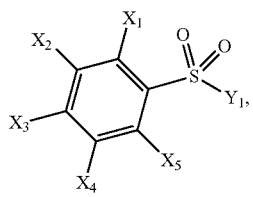

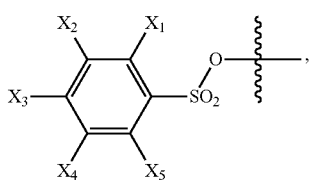

wherein $Y_1$ is halogen, imidazole, or under conditions sufficient to obtain the compound of formula (I).

9. A method for isolating (I) as defined according to claim 1 after conversion of the compound of formula (III) to the compound of formula (I), wherein the method comprises separation of residual salts and the compound of formula (I) in the reaction mixture.

10. A process for isolating compound (I) as defined according to claim 1 comprising contacting compound (I) with a polar solvent or a mixture of polar solvents.

11. The process of claim 1, wherein the alkyl-urea has the formula $RNH(C=Y)NH_2$, wherein R is alkyl or alkylaryl, and the cyanoacyl derivative has the formula $R'C(O)CH_2CN$, wherein R' is O—R" or S—R", wherein R" is alkyl.

12. The process of claim 11, comprising the following steps:

(ia) reacting an alkyl-urea of the formula $RNH(C=Y)NH_2$ with a trialkyl orthoformate in the presence of a cyanoacyl derivative having the formula $R'C(O)CH_2CN$, wherein R' is O—R" or S—R", wherein R" is alkyl, to obtain compound of the formula (Va) or (Vb),

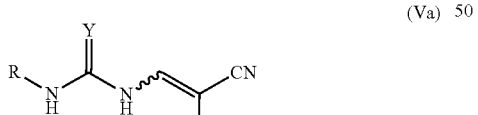

(Va)

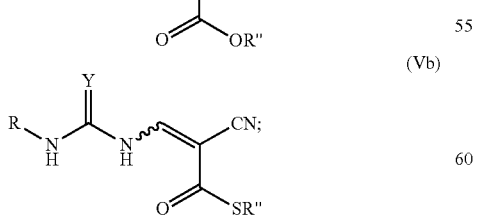

(Vb)

(ib) acidic hydrolysis of the product of step (ia) to form the corresponding acid to form the compound of formula (V),

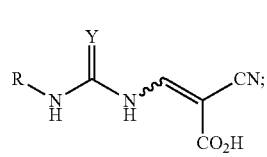

(V)

(iia) adding a base to the acid product of step (ib) under conditions sufficient to obtain the compound of formula (IV),

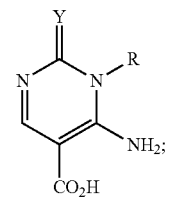

(IV)

(iib) heating the product obtained in step (iia) under conditions sufficient to obtain the compound of formula (II),

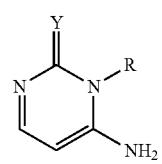

(II)

and (iii) reacting the compound of formula (II) with a halogenating agent under conditions sufficient to obtain the compound of formula (III),

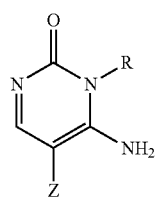

(III)

wherein at least one of steps (ia), (ib), (iia) and (iib) is carried out in the presence of at least one suitable solvent.

13. The process of claim 11, comprising the following steps:

(ia) reacting trialkyl orthoformate in the presence of a cyanoacyl derivative having the formula $R'C(O)CH_2CN$, wherein R' is O—R" or S—R", wherein R" is alkyl, to obtain compound of the formula (Va) or (Vb), an alkyl-urea of the formula $RNH(C=Y)NH_2$ with a (Va)

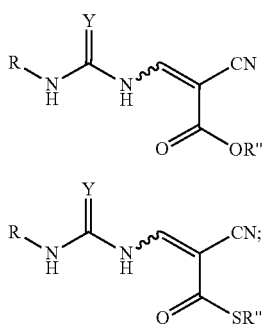

(Vb)

(ib) acidic hydrolysis of the product of step (ia) to form the corresponding acid to form the compound of formula (V), (V)

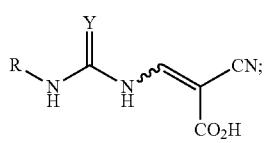

(ic) heating the product obtained in step (ib) under conditions sufficient to obtain the compound of formula (VI), (VI)

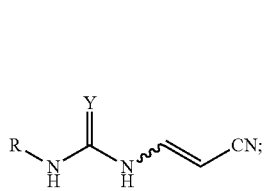

(ii) adding a base to the reaction mixture of step (ic) under conditions sufficient to obtain the compound of formula (II), (II)

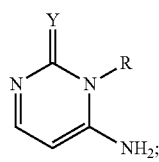

and (iii) reacting the compound of formula (II) with a halogenating agent under conditions sufficient to obtain the compound of formula (III), (III)

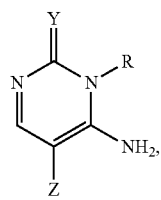

wherein at least one of steps (ia), (ib), (ic) and (ii) is carried out in the presence of at least one suitable solvent.

14. The process of claim 11, comprising the following steps:

reacting an alkyl-urea of the formula $RNH(C=Y)NH_2$ with a trialkyl orthoformate in the presence of a cyanoacyl derivative having the formula $R'C(O)CH_2CN$, wherein R' is O—R" or S—R", wherein R" is alkyl, to obtain compound of the formula (Va) or (Vb), (Va)

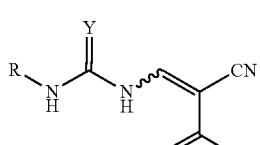

(Vb)

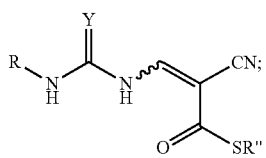

(iia) adding a base to the acid product of step (i) under conditions sufficient to obtain the compound of formula (IVa) or (IVb), (IVa)

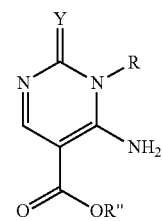

(IVb)

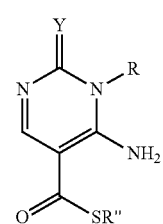

(iib) acidic hydrolysis of the product of step (iia) to the corresponding acid to form the compound of formula (IV), (IV)

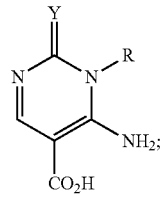

(iic) heating the product obtained in step (iib) under conditions sufficient to obtain the compound of formula (II),

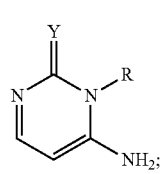
(II)
and
(iii) reacting the compound of formula (II) with a halogenating agent under conditions sufficient to obtain the compound of formula (III),
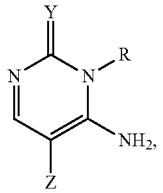
(III)
wherein at least one of steps (i), (iia), (iib) and (iic) is carried out in the presence of at least one suitable solvent.
* * * * *